United States Patent
Miyazaki

(10) Patent No.: US 9,263,983 B2
(45) Date of Patent: Feb. 16, 2016

(54) VIBRATION GENERATING APPARATUS

(71) Applicant: NIDEC SEIMITSU CORPORATION, Ueda, Nagano (JP)

(72) Inventor: Masahiko Miyazaki, Ueda (JP)

(73) Assignee: NIDEC SEIMITSU CORPORATION, Ueda-shi (JP)

( * ) Notice: Subject to any disclaimer, the term of this patent is extended or adjusted under 35 U.S.C. 154(b) by 0 days.

(21) Appl. No.: 14/547,829

(22) Filed: Nov. 19, 2014

(65) Prior Publication Data

US 2015/0115847 A1   Apr. 30, 2015

Related U.S. Application Data

(63) Continuation of application No. 13/190,783, filed on Jul. 26, 2011, now Pat. No. 8,917,486.

(30) Foreign Application Priority Data

| Jul. 27, 2010 | (JP) | 2010-167714 |
| Nov. 16, 2010 | (JP) | 2010-255579 |
| Jul. 7, 2011 | (JP) | 2011-150975 |

(51) Int. Cl.
| H02H 7/09 | (2006.01) |
| F16M 11/00 | (2006.01) |
| H02P 25/02 | (2006.01) |
| B06B 1/02 | (2006.01) |

(Continued)

(52) U.S. Cl.
CPC ............ *H02P 25/027* (2013.01); *B06B 1/0207* (2013.01); *B06B 1/045* (2013.01); *H02K 33/00* (2013.01); *H02K 33/16* (2013.01); *B06B 2201/30* (2013.01); *B06B 2201/70* (2013.01)

(58) Field of Classification Search
CPC ........... H02H 7/09; F16F 13/264; F16F 15/02
USPC ................................ 361/33; 267/136, 140.14
See application file for complete search history.

(56) References Cited

U.S. PATENT DOCUMENTS

| 5,146,776 A | 9/1992 | Twerdochlib et al. |
| 5,931,285 A | 8/1999 | Madsen et al. |

(Continued)

FOREIGN PATENT DOCUMENTS

| CN | 101055014 A | 10/2007 |
| JP | 2008-521597 A | 6/2008 |
| WO | 2006/071449 A1 | 7/2006 |

*Primary Examiner* — Eduardo Colon Santana
*Assistant Examiner* — Gabriel Agared
(74) *Attorney, Agent, or Firm* — Westerman, Hattori, Daniels & Adrian, LLP

(57) ABSTRACT

A vibration generating apparatus with high yield, low cost, and can exhibit vibration tactile haptic effects even with variation in the natural frequency of a mechanical vibrator, including a damping system having a damping ratio $\zeta<1$ to support a mechanical vibrator to a fastening part, and a magnetizing unit generating a dynamic magnetic field to vibrate the mechanical vibrator by non-contact, the mechanical vibrator generating a beat vibration by making the frequency of a drive voltage applied to the magnetizing unit, from a drive start or middle of drive, to be a non-resonant frequency out of a damped natural frequency of the mechanical vibrator, wherein the apparatus comprises a forced vibration control unit controlling to stop application of the drive voltage, in a beat wave defining an amplitude of the beat vibration, at a second valley part after a first peak part from the side of the drive start.

8 Claims, 46 Drawing Sheets

(51) Int. Cl.
    *B06B 1/04*     (2006.01)
    *H02K 33/16*     (2006.01)
    *H02K 33/00*     (2006.01)

(56) References Cited

U.S. PATENT DOCUMENTS

| | | | |
|---|---|---|---|
| 6,257,063 | B1 | 7/2001 | Uhlig |
| 6,323,943 | B1 | 11/2001 | Maruyama et al. |
| 6,470,753 | B2 | 10/2002 | Maruyama |
| 6,757,620 | B1 | 6/2004 | Yoon et al. |
| 6,843,128 | B2 | 1/2005 | Chen et al. |
| 9,074,963 | B2 * | 7/2015 | Rose ................ G01H 11/08 |
| 2001/0032514 | A1 | 10/2001 | Maruyama |
| 2005/0126849 | A1 | 6/2005 | Pearson et al. |
| 2007/0241489 | A1 | 10/2007 | Mizushima et al. |
| 2008/0079400 | A1 * | 4/2008 | Lacaze ................ H02K 3/28 |
| | | | 322/20 |
| 2009/0066187 | A1 | 3/2009 | Kudo |
| 2010/0228523 | A1 * | 9/2010 | Kajitani ............ G06F 3/0433 |
| | | | 702/176 |

\* cited by examiner

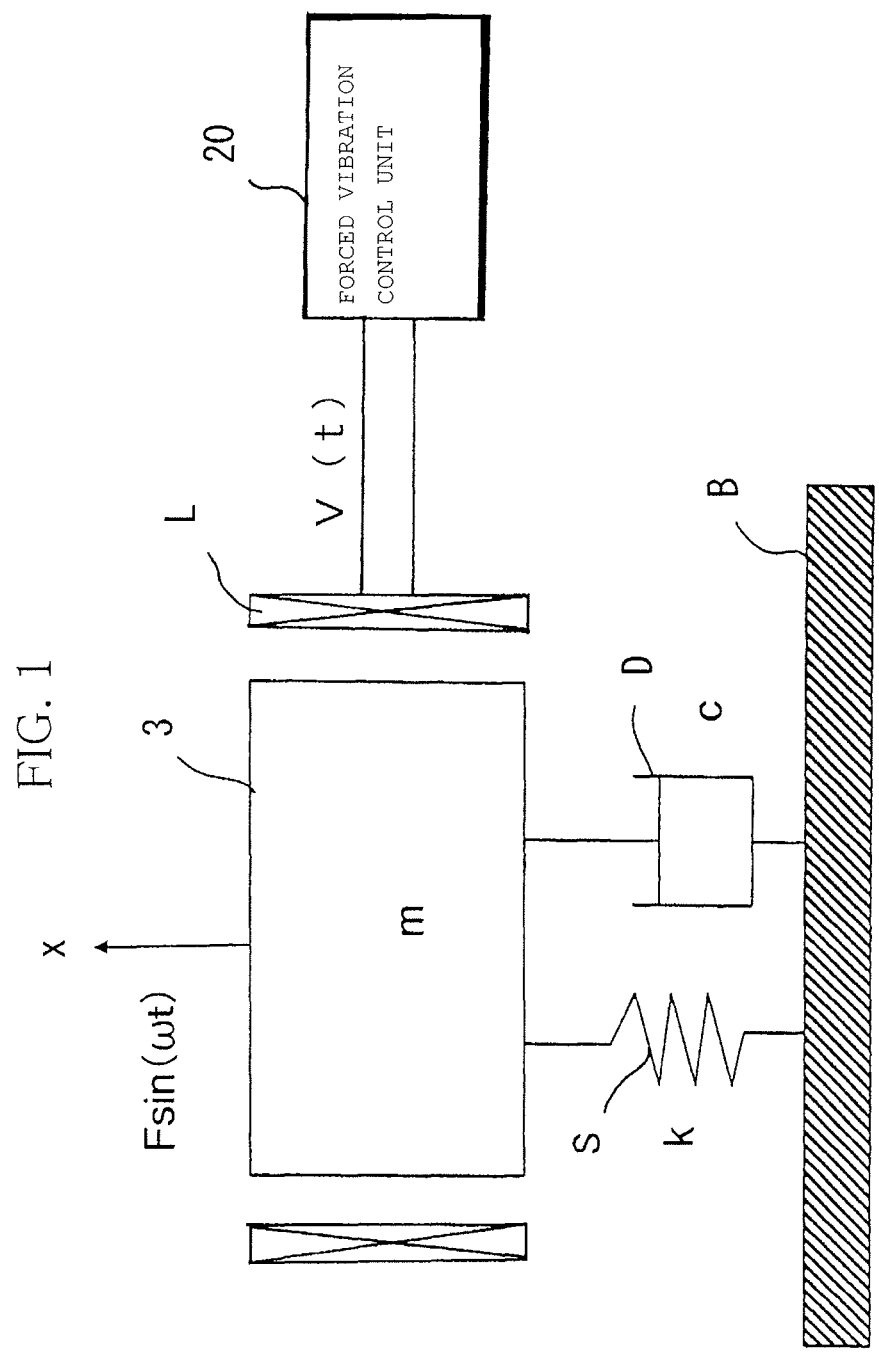

$f = f_0/3$

DRIVE FREQUENCY: 157Hz 1 CYCLE - 188Hz 5 CYCLES

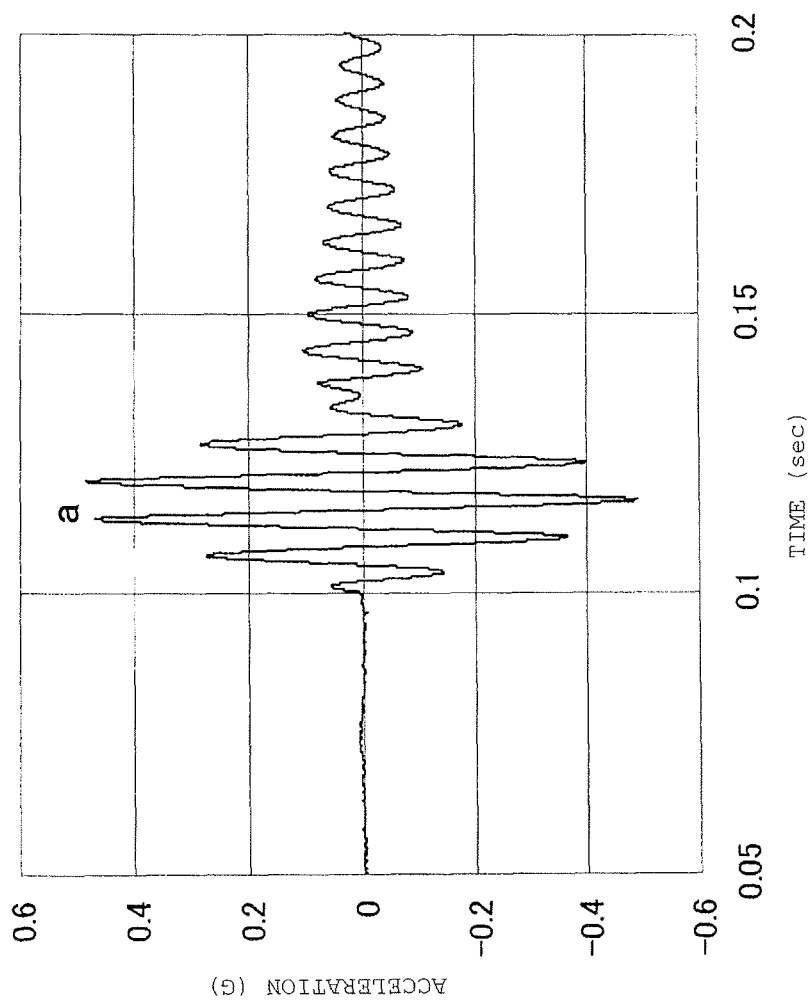

VIBRATION GENERATING APPARATUS

CROSS-REFERENCE TO RELATED APPLICATION

This application is a Continuation of U.S. application Ser. No. 13/190,783 filed Jul. 26, 2014, which claims priority to Japanese Application Nos. 2010-167714, 2010-255579 and 2011-150975 filed on Jul. 27, 2010, Nov. 16, 2010 and Jul. 7, 2011, the entire contents of which are incorporated herein by reference.

BACKGROUND OF THE INVENTION

1. Field of the Invention

The present invention relates to a vibration generating apparatus which can be built into a mobile phone, touch panel, or other device, more particularly relates to a vibration generating apparatus which exhibits a vibration tactile haptic effects of instantaneous vibration.

2. Description of the Related Art

A vibration generating apparatus giving the vibration tactile haptic effects disclosed in Japanese Patent Publication (A) No. 2008-521597 employs a resonant forced vibration system. A signal generator generates an excitation use actuator signal of a first frequency the same as the natural frequency of the resonance actuator and excites the resonance actuator in the resonance state so as to sharply increase the acceleration instantaneously. After this, the signal generator generates a damping use actuator signal of a second frequency shifted from the first frequency by a 180 degree phase (waveform inverted) and dampens the resonance actuator to cause instantaneously damping.

As related art, there is Japanese Patent Publication (A) No. 2008-521597 (0033, FIG. 1)

The above resonance actuator is made to operate in a resonance mode using a forced vibration frequency the same as its natural frequency (resonant frequency), so while instantaneous excitation is easy in the excitation process which rapidly increases the acceleration, in the damping process for damping the once high acceleration resonance actuator, since the resonance actuator will have quite of a bit of variation in natural frequency for each specimen, even if the phase of the damping use actuator signal completely shifts by 180 degrees from the excitation use actuator signal, in reality there is no guarantee of a complete 180 degree shift with respect to the phase of the vibration and displacement of the resonance actuator. Due to this advanced phase difference or retarded phase difference which occurs unavoidably due to variations in the natural frequency, depending on the timing of the end of application of the damping use actuator signal, incomplete stopping of the mechanical vibrator or restart after stopping will be induced, so the free damping period remains longer until entering the insensitive zone and the sharpness of the damping becomes poor.

SUMMARY OF THE INVENTION

The present invention was made to solve the above problem and has as its object the provision of a vibration generating apparatus which can exhibit a vibration tactile haptic effects with a good feel of damping of the mechanical vibrator.

According to the present invention, there is provided a vibration generating apparatus including a damping system having a damping ratio $\zeta<1$ to support a mechanical vibrator with respect to a fastening part through a spring element, and a magnetizing unit generating a dynamic magnetic field to vibrate the mechanical vibrator by non-contact, the mechanical vibrator generating a beat vibration by making the frequency "f" of a drive voltage applied to the magnetizing unit, from a drive start or middle of drive, to be a non-resonant frequency out of a damped natural frequency "$f_d$" of the mechanical vibrator, wherein: the vibration generating apparatus comprises a forced vibration control unit controlling to stop application of the drive voltage, in a beat wave defining an amplitude of the beat vibration, at a second valley part after a first peak part from the side of the drive start.

In this way, the present invention is a device accompanied with generation of a beat vibration, so after the first peak part in which the vibration strengthens, a second valley part where the vibration weakens naturally arrives. The forced vibration control unit controls the stopping of application of drive voltage in the second valley part, so even without the natural damping time becoming longer, the sharpness of stopping the vibration can be improved and the vibration tactile haptic effects can be sufficiently exhibited. A beat vibration occurs with a drive voltage of the non-resonant frequency, so even if there is considerable variation in the natural frequency of the mechanical vibrator, this causes no problems and therefore it is possible to provide a high yield, low cost vibration generating apparatus. Further, the frequency "f" of the drive voltage may be a frequency lower than or a frequency higher than the damped natural frequency "$f_d$". Further, the number of cycles of the frequency of the drive voltage can be selected to be larger or smaller, so even with the instantaneous vibration of the vibration tactile haptic effects, diversification of the modes of vibration and in turn coding such as Morse coding in accordance with the modes of vibration becomes possible.

The forced vibration control unit preferably suppresses amplitude of the drive voltage before stopping application of the drive voltage at the second valley part. It is possible to weaken the excitation action in the excitation period in the damping dominant period from the first peak part to the second valley part, so as a result the damping action becomes relatively strong and the sharpness of the stopping of the vibration becomes even better. From another viewpoint, the forced vibration control unit preferably suppresses the amplitude of the drive voltage in the damping dominant period from the first peak part to the second valley part compared with the amplitude of the drive voltage in the excitation dominant period from the first valley part to the first peak part at the vibration start side.

The drive voltage which is applied to the magnetizing unit may be a sine wave, alternating square wave, or other bipolar waveform which swings from the zero level to positive or negative, but may also be a repeated waveform of a unipolar voltage which swings between the zero level and positive and between the zero level and negative. In a unipolar waveform drive, the amplitude zero periods are periodically applied, so from the first peak part to the second valley part, a natural damping period of the damping ratio $\zeta$ is also added as a damping action and the sharpness of stopping of vibration becomes better. Further, with a unipolar waveform drive, compared with a bipolar waveform drive, the power source voltage is used at a single pole side and the voltage amplitude can be doubled, so it is possible to increase the power in the excitation dominant period up to the first peak part.

If considering the ultimate limits of the beat vibration phenomenon, when the forced vibration control unit sets the frequency of the drive voltage so that the beat period of the beat wave of the beat vibration and the period of the basic wave of the beat vibration become substantially equal, a biased vibration phenomenon occurs in which acceleration strong in one direction (biased acceleration) is manifested.

As an extreme mode of $f_d<f$, it is possible to make the frequency "f" is substantially 3 times the damped natural frequency "$f_d$" and where the drive voltage which is applied to the magnetizing unit is an independent wave comprised of a first sine half wave, a second sine half wave of an opposite phase to the first sine half wave, and a third sine half wave of an opposite phase to the second sine half wave. It is possible to generate vibration having a remarkable biased acceleration in the displacement direction occurring by the second sine half wave and to provide a perceptive vibrating device which has a one-direction indicating property and a vector property. To make this effect more pronounced, the frequency of the first sine half wave and the third sine half wave is made not more than 3 times the damped natural frequency $f_d$. Conversely, it is preferable to make the frequency of the second sine half wave at least 3 times the damped natural frequency $f_d$ and possible, further, to make the waveheight value of the second sine half wave at least the waveheight values of the first sine half wave and third sine half wave.

Conversely, as an extreme mode of $f_d>f$, it is preferable to make the frequency "f" substantially ⅓ of the damped natural frequency $f_d$ and to make the drive voltage which is applied to the magnetizing unit a sine half wave. In this case as well, it is possible to provide a perceptive vibration device which has a one-direction indicating property or vector property.

In this regard, the above vibration generating apparatus is a beat vibration generating apparatus from the start, so in the excitation dominant period from the drive start to the first peak part, an excitation period and a damping period alternately appear, so the startup power becomes insufficient compared with a resonance system by the amount of inclusion of the damping periods. Therefore, the forced vibration control unit is characterized by not making the frequency of the drive signal a non-resonant frequency from the drive start. It first makes the frequency of the drive voltage a resonant frequency matching the damped natural frequency and switches to a non-resonant frequency after a certain period. Even if a damping system, a certain period from drive start becomes a resonance state. After acceleration reliably increases, a non-resonant beat vibration is switched to. After an excitation dominant period in which an excitation period and damping period are alternately repeated, a first peak part is reached, then a damping dominant period in which a damping period and excitation period are repeated is entered and a second valley part is reached whereupon the device stops. Since this is a resonance system before a non-resonance system, the startup power can be sufficiently secured. Further, after the beat vibration is switched to, the first peak part automatically arrives. There is also a limit effect which can suppress excessive vibration amplitude. It is therefore possible to prevent breakdown of the mechanical vibrator.

In the initial drive period, resonant drive is given priority to so as to suppress energy loss and speed the startup of vibration, but if this resonant vibration is too long, even if the vibration switches to non-resonant vibration then falls to the second valley part, the energy obtained by resonant vibration remains and zero ends up being greatly deviated from. To prevent this, it is preferable to make the number of cycles of the damped natural frequency (resonant frequency) smaller than the number of cycles of the non-resonant frequency. It is possible to suppress separation of the second valley part from zero and possible to ensure sharpness in stopping of vibration.

In a vibration generating apparatus compatible with the above vibration mode of a vibration generating apparatus, the mechanical vibrator has a ring-shaped permanent magnet which is magnetized in a thickness direction spanning a first end face and a second end face, the spring element is a suspension spring unit for supporting the ring-shaped permanent magnet displaceably in the thickness direction with respect to the fastening part, the electromagnetic coil passes through a center hole of the ring-shaped permanent magnet and is supported at the fastening part, a core is provided passing through the inside of the electromagnetic coil, the electromagnetic coil has a first toroidal coil and an adjoining coaxial second toroidal coil with opposite magnetization polarities, and provision is made of a first ring-shaped pole piece mated with the first end face and having an inner circumferential edge surrounding an outer circumference surface of the first toroidal coil and a second ring-shaped pole piece mated with the second end face and having an inner circumferential edge surrounding an outer circumference surface of the second toroidal coil.

By making the magnetization direction of the electromagnetic coil and the magnetized direction of the ring-shaped permanent magnet substantially parallel, depending on the winding directions of the two coil windings, the direction of feed of power to the two coils, and the serial structure or parallel structure of the two coils, the external terminals of the two coils will become the same magnetic poles and the internal terminals will become the same magnetic poles, so reciprocating motion will result from the magnetic attraction force and repulsion force with respect to the ring-shaped permanent magnet, the magnetic flux from the two magnetic poles of the ring-shaped permanent magnet concentrate at the inner circumferential edges of the first and second ring-shaped pole pieces, pass through the two toroidal coils, and form short-circuit magnetic paths through the core, so a reciprocating action acts due to the electromagnetic force and the startup power is strengthened. Further, the outer circumference magnetic flux of the ring-shaped permanent magnet also forms a closed circuit, so it is possible to suppress leakage magnetic flux.

Summarizing the advantageous effects of the present invention, it is possible to design a vibration generating apparatus which utilizes a beat vibration, so it is possible to provide a vibration generating apparatus which is high in yield, low in cost, and able to exhibit a vibration tactile haptic effects even if there are variations in the natural frequency of the mechanical vibrator.

BRIEF DESCRIPTION OF THE DRAWINGS

These and other objects and features of the present invention will become clearer from the following description of the preferred embodiments given with reference to the attached drawings, wherein:

FIG. 1 is a conceptual view showing a vibration generating apparatus according to an embodiment of the present invention;

FIG. 2A is a perspective view showing a vibration linear actuator used for the same vibration generating apparatus, while

FIG. 4A is a conceptual view showing the relationship between a state running current to a first and second toroidal coil in the same vibration linear actuator vibration generating apparatus and a vibrating direction of a mechanical vibrator, while

FIG. 17A is a graph showing the trend in the total energy E for a 1.5-cycle drive of a drive voltage V(t) in the same vibration generating apparatus, while

FIG. 18A is a graph showing the trends in the velocity "v" and the total energy E for a 1.5-cycle drive of a drive voltage V(t) of 471 Hz in the same vibration generating apparatus, while

FIG. 19A is a graph showing the trend in the total energy E for a deformed wave of 1.5 cycles of a drive voltage V(t) in the same vibration generating apparatus, while

FIG. 20A is a graph showing the trends in the velocity "v" and the total energy E for a deformed wave of 1.5 cycles of a drive voltage V(t) in the same vibration generating apparatus, while

FIG. 21A is a graph showing the trend in the total energy E for another 1.5-cycle deformed wave of a drive voltage V(t) in the same vibration generating apparatus, while

FIG. 22A is a graph showing the trends in the velocity "v" and total energy E for another 1.5-cycle deformed wave of the drive voltage V(t) in the same vibration generating apparatus, while

FIG. 23A is a graph showing the trend in displacement "x" for a 0.5-cycle deformed wave of the drive voltage V(t) in the same vibration generating apparatus, while

FIG. 25A is a graph showing a 0.5-cycle sine deformed wave of the drive voltage V(t) in the same vibration generating apparatus and the trend in the total energy E for this waveform, while

FIG. 26A is a graph showing the trends in the velocity "v" and total energy E for a 0.5-cycle sine deformed wave of a drive voltage V (5) in the same vibration generating apparatus, while

FIG. 46 is a graph showing the acceleration "a" in the case of drive by a frequency "f" of 157 Hz for 1 cycle and then by a non-resonant frequency of 129.5 Hz for 4 cycles in the same vibration generating apparatus.

DESCRIPTION OF THE PREFERRED EMBODIMENTS

Next, embodiments of the present invention will be explained based on the attached figures. The vibration generating apparatus of the present embodiment, as conceptually shown in FIG. 1, has a vibration linear actuator of damping system forced vibration which uses a spring element S of a spring constant "k" and a damper D of an attenuation coefficient "c" in parallel to support a mechanical vibrator 3 having a permanent magnet of a mass "m" at a fastening part B. The vibration linear actuator includes an electromagnetic coil L which generates a dynamic magnetic field for giving a sine wave external force F sin (ωt) causing the mechanical vibrator 3 to reciprocatively vibrate in a non-contact manner. The vibration generating apparatus further has a forced vibration controller 20 which generates a drive voltage V(t) of an alternating current which is supplied to the electromagnetic coil L. Here, F is a constant, ω is the forced (input) angular frequency, and f=2π/ω is the forced (input) frequency. As the damper D, an air damper, magnetic fluid damper, magnetic damper which uses relative movement of the mechanical vibrator 3 of the permanent magnet and the electromagnetic coil L to inhibit relative movement by the reverse electromotive force generated at the electromagnetic coil L, etc. are included. The displacement and velocity of the mechanical vibrator 3 are small, so in general the resistance force of the damper can be approximated as proportional to the velocity. The motion equation of this damping system forced vibration is given by the following equation:

$$m \cdot d^2x/dt^2 + c \cdot dx/dt + kx = F \cdot \sin(\omega t) \quad (1)$$

where, "x" is the vibration (response) displacement of the mechanical vibrator 3, "t" is the time, and, in this example, m=1.40×10$^{-3}$ (kg), k=1360 (N/m), and c=4.00×10$^{-2}$.

Figure 2A:
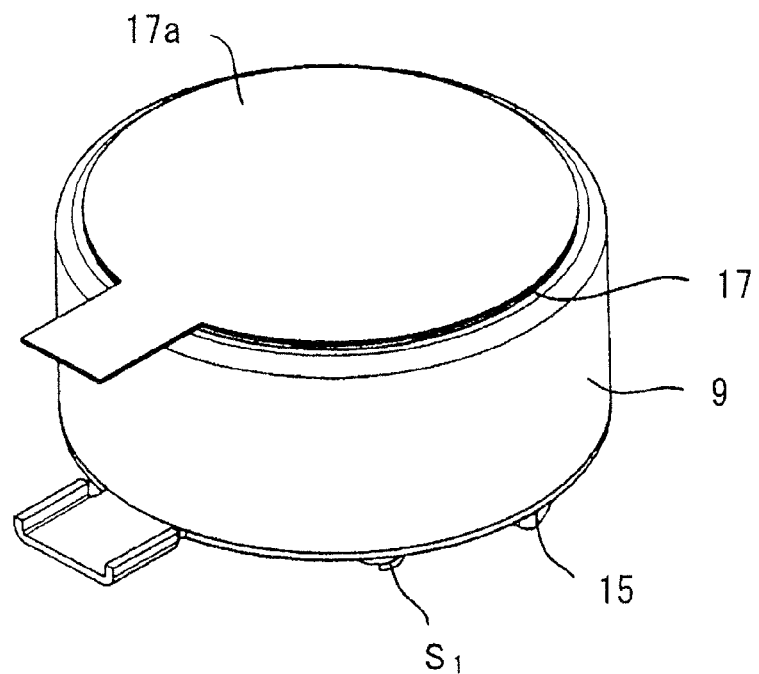
Figure 2B:
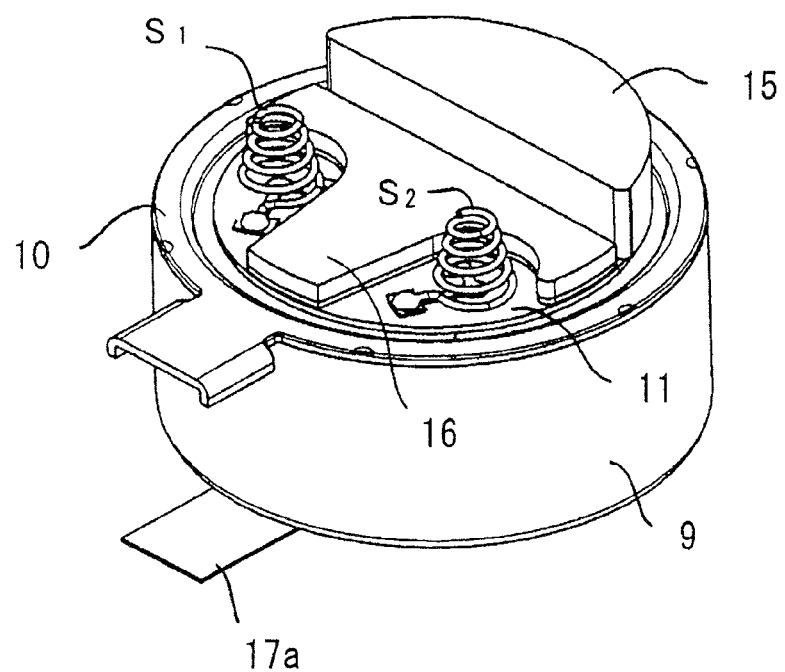
FIG. 2B is a perspective view showing an inverted state of the same vibration linear actuator.
Figure 3:
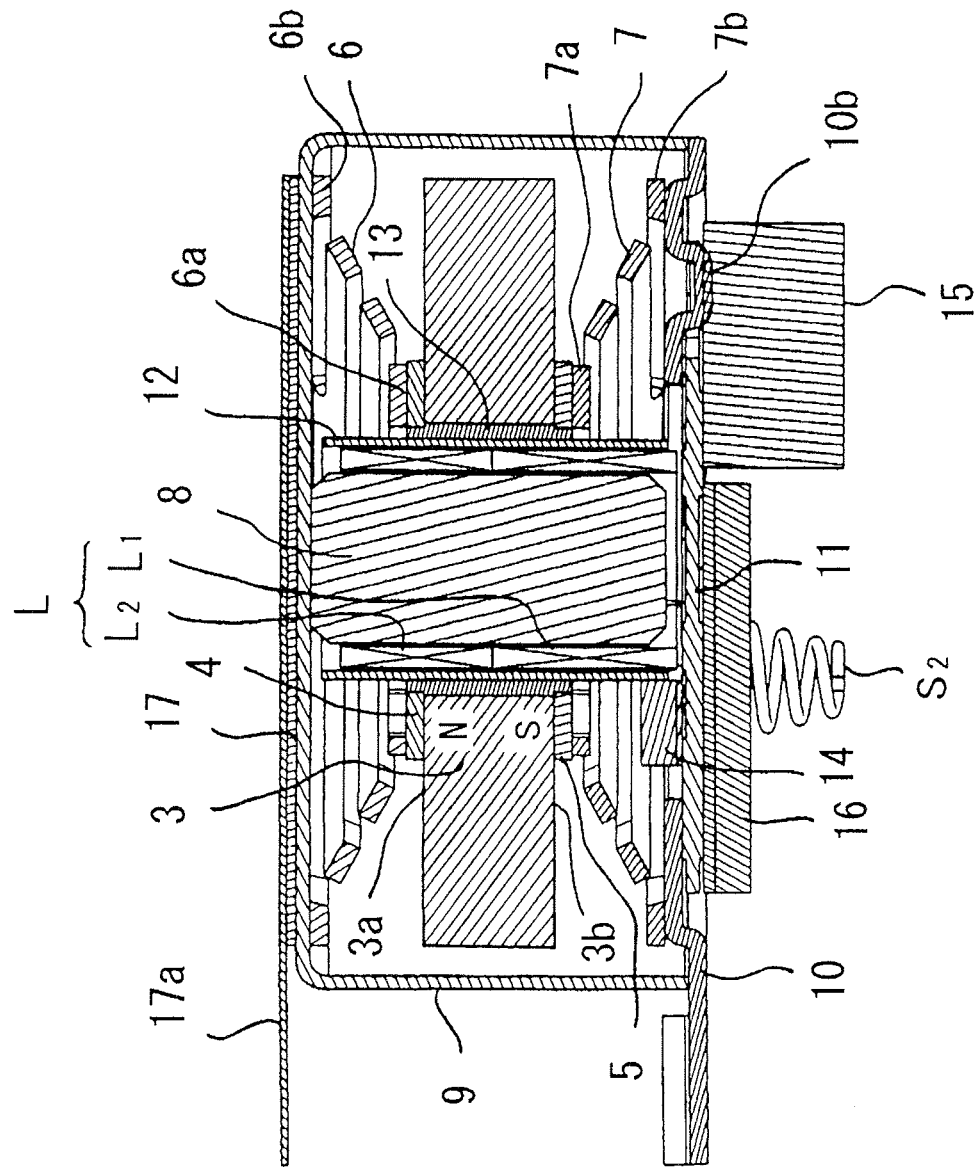
FIG. 3 is a longitudinal cross-sectional view of the same vibration linear actuator.

Next, the specific structure of the vibration linear actuator used in the present embodiment will be explained. As shown in FIG. 2 and FIG. 3, this vibration linear actuator is provided with a mechanical vibrator 3 of a ring-shaped permanent magnet magnetized in the thickness direction spanning a first end face 3a and a second end face 3b to obtain two poles at its two end faces (axial anisotropy), a ring-shaped first pole piece plate 4 which is fastened by adhesive material to an inner circumference side of the first end face 3a and a second ring-shaped pole piece plate 5 which is fastened by adhesive material to an inner circumference side of the second end face 3b, a spiral shaped first plate spring 6 having an inner circumference side hanging part 6a which is fastened to the first pole piece plate 4 at by spot welding, bonding, or another means and having an outer circumference side hanging part 6b which is fastened to a bottom surface of a tubular case 9, a spiral shaped second plate spring 7 having n inner circumference side hanging part 7a which is fastened to the second pole piece plate 5 and having an outer circumference side hanging part 7b which is fastened to the end plate 10 fastened to the open side of the tubular case 9, a cylindrical core (iron core) 8 which passes through a center hole of the mechanical vibrator 3 and is fastened to the bottom surface of the tubular case 9, a tubular electromagnetic coil L which is provided on a printed circuit board 11 attached to a back surface of the end plate 10 and is inserted from the through hole of the end plate 10 over the cylindrical core 8, a resin protective tube 12 which is provided on the printed circuit board 11 and is inserted over the electromagnetic coil L, magnetic fluid 13 which is filled in the space sandwiched between the first pole piece plate 4 and second pole piece plate 5 between the inner circumference surface of the mechanical vibrator 3 and the outer circumference surface of the protective tube 12, a rubber damper 14 which is adhered to the printed circuit board 11 and which buffers collision of the inner circumference hanging part 7a of the second plate spring 7 with the printed circuit board 11, a pair of spiral shaped spring terminals $S_1$, $S_2$ which are connected to the back surface of the printed circuit board 11, a soft half-moon shape conductive rubber piece 15 which is bonded to the back surface of the printed circuit board 11 across a notch and contacts a conductive projection 10b of the end plate 10, a hard, substantially T-shaped rubber sheet 16 which is bonded to the back surface of the printed circuit board 11 for tight storage at a storage space (not shown) of the vibration linear actuator itself, and two-sided tape 17 with peeling paper 17a bonded to the tubular case 9.

The columnar core (iron core) 8 may be comprised of laminated iron sheets. The outer circumferential sides of the first end face 3a and the second end face 3b form an outside closed magnetic path. The outer circumferential side of the first end face 3a is not covered by the ring-shaped first pole piece plate 4. Further, the outer circumferential side of the second end face 3b is not covered by the ring-shaped second pole piece plate 5.

The electromagnetic coil L of this example is comprised of the cylindrical shaped bottom stage toroidal coil $L_1$ on the printed circuit board 11 and a reversely wound series top stage toroidal coil $L_2$ stacked coaxially with the same. A first winding end sticking out from an end face of the bottom stage toroidal coil $L_1$ is soldered to a first coil connection pattern on the printed circuit board 11, while a second winding end which is passed from the top stage toroidal coil $L_2$ through the inner circumferential side of the bottom stage toroidal coil $L_1$ and sticks out from the end face of the bottom stage toroidal coil $L_1$ is soldered to a second coil connection pattern on the printed circuit board 11. Further, the inner circumferential edge of the first pole piece plate 4 and the inner circumferential edge of the second pole piece plate 5 stick out from the inner circumferential surface of the ring-shaped permanent magnet of the mechanical vibrator 3 and approach the outer circumferential surface of the electromagnetic coil L.

In the vibration linear actuator of the present example, the magnetized direction of the mechanical vibrator 3 of the ring-shaped permanent magnet is substantially parallel with the direction of the cylindrical core 8 inside the electromagnetic coil L. The magnetic flux emitted from the first end face 3a or second end face 3b of the mechanical vibrator 3 of the ring-shaped permanent magnet runs through the first pole piece plate 4 and second pole piece plate 5 and jumps from the inner circumference edges to the outer circumferential surface of the cylindrical core 8 then passes through the inside of the cylindrical core 8, so the magnetic fluid 13 present in the gap between the outer circumference surface of the protective tube 12 and the inner circumference surface of the mechanical vibrator 3 becomes a sealed state by the above magnetic flux. It is possible to prevent leakage of the magnetic fluid 13 without regard as to the posture of the vibration linear actuator. Further, due to the buffer layer provided by this magnetic fluid 13, even if an impact force is applied, it is possible to effectively suppress collision of the vibration linear actuator with the electromagnetic coil L and possible to prevent damage to the electromagnetic coil L. Even if not using the magnetic fluid 13 and covering the protective tube 12 only over the electromagnetic coil L, it is also possible to prevent damage to the electromagnetic coil L from collision of the vibration linear actuator. Since there is the protective tube 12, it is possible to make the cap with the ring-shaped permanent magnet 3 very small and contribute to smaller size of the vibration linear actuator. Further, since the cap is small, it is not necessary to use high viscosity magnetic fluid 13 with distinctive low temperature characteristics. It is enough to use low viscosity, inexpensive magnetic fluid 13 with good low temperature characteristics. Note that, this protective tube 12 is preferably made of material with lubricity. It may be a metal material or plastic material of course and also may be a heat shrinkable tube.

Figure 4A:
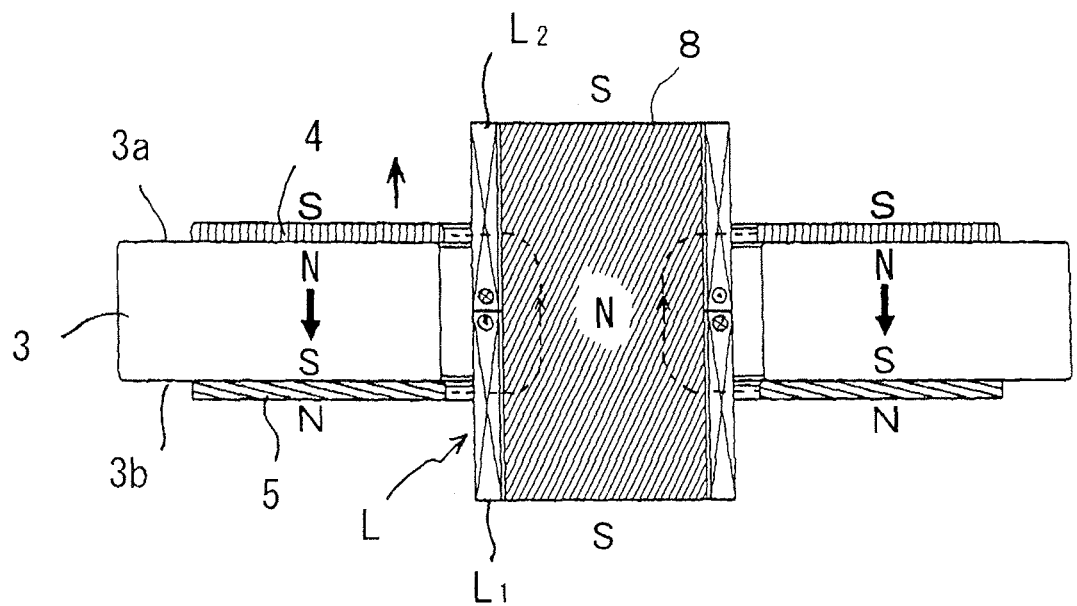
Figure 4B:
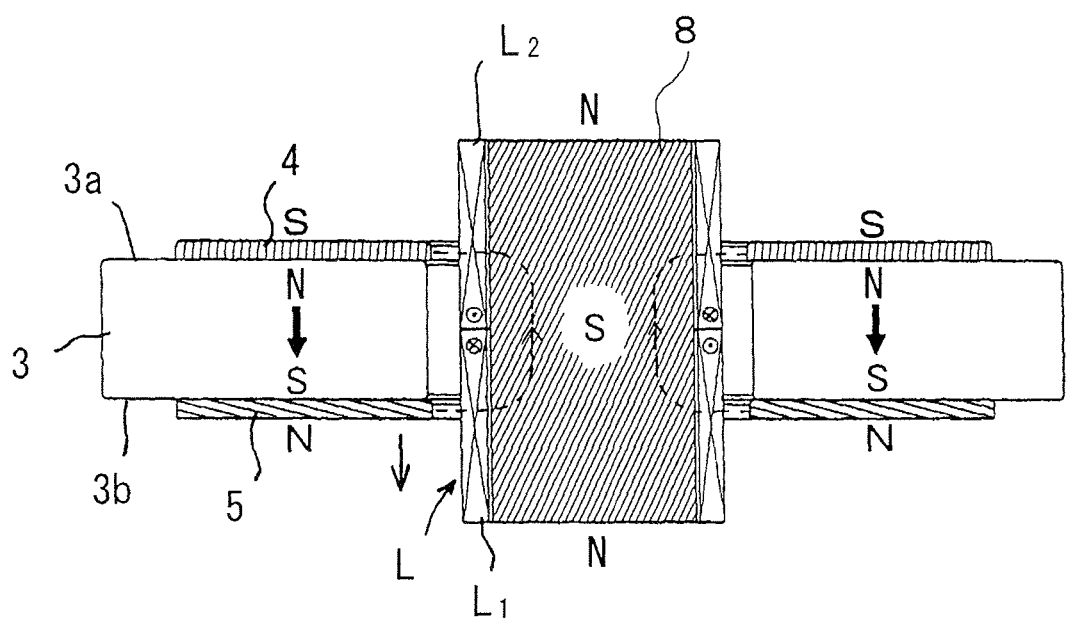
FIG. 4B is a conceptual view showing the relationship between a state running current to the opposite direction from FIG. 4A and the vibrating direction of the mechanical vibrator.

Aside from the magnetic attraction force and repulsion force due to the two ends being the same alternating polarities of the mechanical vibrator 3 of the permanent magnet and the electromagnetic coil (electromagnet) L, since the bottom stage toroidal coil $L_1$ and the top stage toroidal coil $L_2$ are in series while being reversely wound, as shown in FIG. 4A, the magnetic flux from the inner circumferential surface of the second pole piece plate 5 to the core 8 and the current which flows through the bottom stage toroidal coil $L_1$ are used to generate an upward direction electromagnetic force, while the magnetic flux from the core 8 to the inner circumferential edge of the first pole piece plate 4 and the current which flows through the top stage toroidal coil $L_2$ are used to generate an upward direction electromagnetic force. Further, as shown in FIG. 4B, if the current which flows through the bottom stage toroidal coil $L_1$ and the top stage toroidal coil $L_2$ becomes the opposite direction, the magnetic flux from the inner circumferential edge of the second pole piece plate 5 to the core 8 and the current which flows through the bottom stage toroidal coil $L_1$ are used to generate a downward direction electromagnetic force, while the magnetic flux from the core 8 to the inner circumferential edge of the first pole piece plate 4 and the current which flows through the top stage toroidal coil $L_2$ are used to generate a downward direction electromagnetic force. For this reason, the magnetic attraction force and the repulsion force and electromagnetic force are used for reciprocative vibration of the mechanical vibrator 3.

The magnetization direction of the electromagnetic coil L and the magnetized direction of the mechanical vibrator 3 are substantially parallel and the outside end sides of the bottom stage toroidal coil $L_1$ and the reversely wound top stage toroidal coil $L_2$ serially connected to the same are the same magnetic poles and the inside ends are the same magnetic poles, so the mechanical vibrator 3 reciprocatively vibrates due to the magnetic attraction force and repulsion force. Along with alternation of the coil current, a reciprocatively vibrating magnetic field is generated for reciprocative drive of the mechanical vibrator 3 in the thickness direction. At the mechanical vibrator 3 magnetized in the thickness direction, the magnetic circuit becomes a closed loop and can suppress leakage magnetic flux, so this contributes to improvement of the vibration strength or lower power consumption. Further, since the magnetic circuit is a closed loop, if cutting the coil current, the vibration inertia causes a reverse electromotive force to be generated in the electromagnetic coil L. As a reaction, a braking force acts on the mechanical vibrator 3 and a shorter time for vibration attenuation can be realized.

Next, the drive system of the vibration linear actuator, that is, the signal form of the drive voltage V(t) which is supplied to the electromagnetic coil L will be explained. Here, the value of the natural frequency $f_o$ of the vibration linear actuator is 157 Hz. This natural frequency $f_o$ is the natural frequency ($=(k/m)^{1/2}$) of the nondamping system minus the damper D, but in fact the damped natural frequency $f_d$ of the damping system is in general given by the following equation at $\zeta<1$ if using a damping ratio $\zeta(=c/2(mk)^{1/2})$ having a damper D such as the above vibration linear actuator.

$$f_d = f_o(1-\zeta^2)^{1/2} \quad (2)$$

$$\zeta = \frac{1}{2}Q \quad (3)$$

Here, the Q value is actually measured as about 25, but is preferably 15 to 40 or so. The damping ratio $\zeta$ is calculated to be 0.02. The difference between the damped natural frequency $f_d$ of the damping system and the natural frequency $f_o$ of the non-damping system is at most only about 0.2%, so the damped natural frequency $f_d$ is substantially equal to the non-damped natural frequency $f_o$. These are very close at $f_d \approx f_o = 157$ Hz. The vibration linear actuator of the present embodiment includes a very small air damper, since the mechanical vibrator 3 is reciprocatively vibrating in the tubular case 9, a very small mechanical wear damper using a first plate spring 6 and second plate spring 7, a viscosity damper using the magnetic fluid 13, a magnetic damper using the reverse electromotive force of the magnetic coil L, etc., so of course the damping ratio ($\zeta>0$), so extremely strong viscous material ($\zeta \geq 1$) etc. is not used as a damper for the purpose of increasing the $\zeta$ over 1 to make the vibration rapidly attenuate. In this example, with $\zeta<1$, natural damping, a state is shown of alternating gradually reducing attenuation while swinging to the opposite side passing through the displacement origin of vibration displacement.

Further, when $\zeta<1$, the general solution of the equation (1) is given by the following equation as the sum of the free vibration solution and forced vibration of the damping system:

$$x = \exp(-\zeta \omega_o t)\{C_1 \cos(\omega_d t) + C_2 \sin(\omega_d t)\} + C \sin(\omega t - \phi) \quad (4)$$

where, $C_1$, $C_2$ are constants determined under the initial conditions, $\omega$ is the angular frequency of forced vibration, $\omega_o$ is the natural angular frequency, and $\omega_d$ is the natural angular frequency of damping.

$$C = F/m\{(\omega_o^2-\omega^2)^2+(2\zeta\omega_o\omega)^2\}^{1/2} > 0$$

where, $\tan \phi = 2\zeta\omega_o \omega(\omega_o^2-\omega^2)$

Further, the initial conditions of this example are $x(0)=0$ and $dx/dt|_{t=0}=0$, so $$C_1 = C \sin \phi$$

$$C_2 = C(\zeta\omega_o \sin\phi - \omega \cos\phi)/\omega_d$$

Here, if using $\tan \theta = C_1/C_2$ and combining the three waves of equation (4), it is possible to rewrite the equation to the following:

$$x = [C^2+(C_1^2+C_2^2)\exp(-2\zeta\omega_o t)+ 2C(C_1^2+C_2^2)^{1/2}\exp(-\zeta\omega_o t)\cos\{(\omega-\omega_d)t-(\theta+\phi)\}]^{1/2}$$

$$\times \sin\{(\omega+\omega_d)t/2+(\theta-\phi)/2+\alpha(t)\} \quad (5)$$

where, $\tan\{\alpha(t)\} = K(t) \cdot \tan\{(\omega-\omega_d)t/2-(\theta+\phi)/2\}$ $$K(t) = \{\sin\theta - \sin\phi \cdot \exp(-\zeta\omega_o t)\} \div \{\sin\theta + \sin\phi \cdot \exp(-\zeta\omega_o t)\} \quad (6)$$

Figure 5:
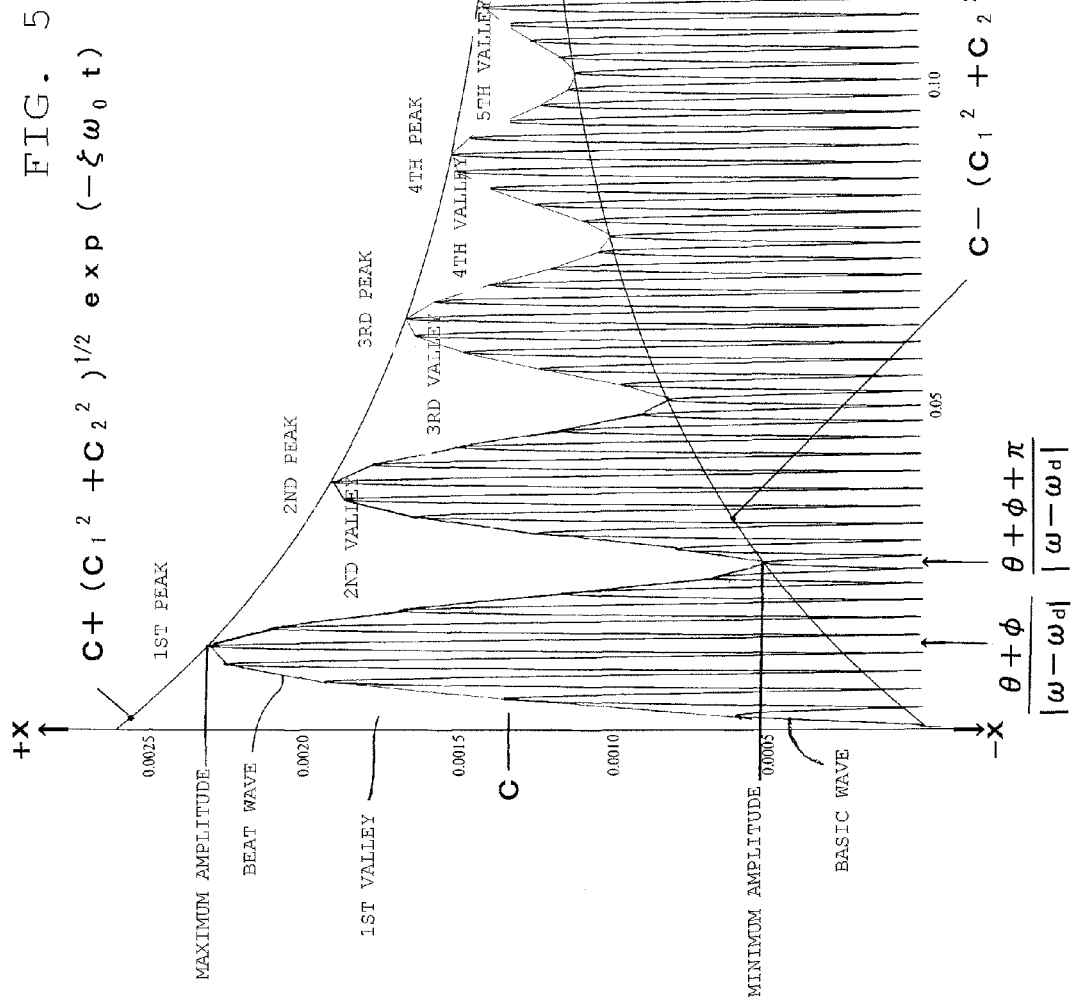
FIG. 5 is a graph showing an −x side basic wave folded back to the +x side for a beat vibration phenomenon which the same vibration generating apparatus causes.

Note that, $K(0) = \cot\{(\theta+\phi)/2\} \tan\{(\theta-\phi)/2\}<1$, $\alpha(0)=(\phi-\theta)/2$, $K(\infty)=1$, $\alpha(\infty)=(\omega-\omega_d)t/2-(\theta+\phi)/2$ The state of the vibration phenomenon of this response displacement "x" is the "beat vibration" as shown in FIG. 5. FIG. 5 shows the beat vibration in the case of a drive voltage V(t) of a frequency "f" of 196.25 Hz. In equation (5), the term of the ½ power including the low frequency wave $\cos\{(\omega-\omega_d)t-(\theta+\phi)\}$ is the beat wave. It is the response amplitude of $\sin\{(\omega+\omega_d)t/2+(\theta-\phi)/2+\alpha(t)\}$ of the high frequency basic wave. This response amplitude shows the periodic change at the beat period $T_B = 2\pi/|\omega-\omega_d|$. From the point where the low frequency wave takes +1, the peak envelope connecting the peak parts in the beat wave is given by $\{C+(C_1^2+C_2^2)^{1/2}\exp(-\zeta\omega_o t)\}$ gradually approaching the gradual approximation line of x=C from the top. Further, from the point where the low frequency wave becomes −1, the valley envelope connecting the valley points of the valley parts among the beat wave is given by $\{C-(C_1^2+C_2^2)^{1/2}\exp(-\zeta\omega_o t)\}$ gradually approaching the gradual approximation line of x=C from the bottom. At $t \to \infty$, a steady state is reached where the response amplitude converges to C and only the forced vibration component $\{C \cdot \sin(\omega t - \phi)\}$ of "f" remains. The transitory state up to this steady state (transition state) is the beat vibration phenomenon. At the drive start t=0, the beat wave includes the initial phase $(\theta+\phi)$, so the beat wave, at the first valley part, in the strict sense does not start from the amplitude 0, but the phase of the basic wave starts from zero. At this beat vibration process, the peak of the first peak part, that is, the peak of $t=(\theta+\phi)/|\omega-\omega_d|$, becomes the maximum amplitude, while the valley of the second valley part, that is, the point of time of $t=(\theta+\phi+\pi)/|\omega-\omega_d|$, becomes the minimum amplitude except for the time of start of vibration. Therefore, in order for the vibration generating apparatus of this example to exhibit a vibration haptic effects, if stopping the drive at the second valley part, the difference (amplitude difference) is the difference between the maximum amplitude and minimum amplitude and becomes maximum. Further, the natural damping time until stopping still can be minimized, so the sharpness of stopping of vibration becomes good.

Note that, as clear from equation (6), the phase $\alpha(t)$ of the time function, as shown by equation (6), starts from $\alpha(0)=(\phi-\theta)/2$ and changes together with time so as to converge to $\alpha(\infty)=(\omega-\omega_d)t/2-(\theta+\phi)/2$, so the frequency of the basic wave (displacement "x") is gradually pulled in to the forced vibration number $\omega$ side from the average frequency $\{(\omega+\omega_d)t/2\}$ of the time of vibration start and in the steady state becomes the forced vibration number $\{(\omega+\omega_d)t/2+(\omega-\omega_d)t/2\}=\omega$.

Here, if assuming $\theta+\phi=0$ or suitably setting the damping ratio $\zeta$, drive frequency "f", or other parameter so as to approximate $\theta+\phi=0$, when $f<f_d$, for example, when f=130.83 Hz at $f_o$=157 Hz, the beat vibration $f_B=(f_d-f)$ is 26.17 Hz. The point of time from drive start (t=0) to the valley point of the second valley part of the beat wave is about 0.038 second after the point of time after the beat period $T_B(=1/(f_d-f))$. At this minimum amplitude, it is best to stop the drive voltage V(t). At the valley part of the beat wave, the amplitude of the displacement "x" converges by a time average and a trend in which the strain energy of the spring element S (first plate spring 6 and second plate spring 7) decreases is guaranteed. In the non-drive period after that, this becomes weak residual vibration where the remaining energy is consumed by natural damping by the damping ratio $\zeta$ and the time until stopping vibration can be shortened.

Conversely, when $f_d < f$, for example, when f=196.25 Hz at $f_o$=157 Hz, the beat vibration $f_B$ is 39.25 Hz. The point of time from drive start (t=0) to the valley point of the second valley part of the beat wave is about 0.025 second after the point of time after the beat period $T_B$=1/(f−$f_d$). Again, it is best to stop the drive voltage V(t) at the minimum amplitude. It is possible to shorten the time until stopping vibration.

The time until the valley point of the second valley part, for convenience, is 0.038 second, 0.025 second, or another time of the beat period $T_B$(=1/($f_d$−f)). A timer function for counting on the order of 1/1000 of this may be provided at the forced vibration controller 20, but the cycles of the drive voltage V(t) themselves are so-called clock signals, so measuring the drive time from drive start to drive stop by the number of cycles of the drive frequency "f" is convenient in terms of configuration and software. Therefore, if designating the number of cycles of the period (1/f) of the drive voltage V(t) as "n", the following stands:

$$n/f = 1/f_B = 1/|f_d - f| \qquad (7)$$

Here, assuming $f_d = f_o$,
when $f_o < f$, $$f = nf_o/(n-1) \qquad (8)$$

when $f < f_o$, $$f = nf_o/(n+1) \qquad (9)$$

where "n" is not limited to a natural number and may be a multiple of 0.5.

The case where $f_o$=157 Hz and $f_o < f$ is shown in Table 1.

TABLE 1

| No. of forced vibration cycles | Forced vibration frequency (Hz) | Drive time (ms) |
|---|---|---|
| 12 | 171.27 | 70.06 |
| 11 | 172.70 | 63.69 |
| 10 | 174.44 | 57.32 |
| 9 | 176.63 | 50.96 |
| 8 | 179.43 | 44.59 |
| 7 | 183.17 | 38.22 |
| 6 | 188.40 | 31.85 |
| 5 | 196.25 | 25.48 |
| 4 | 209.33 | 19.11 |
| 3 | 235.50 | 12.74 |
| 2 | 314.00 | 6.37 |
| 1.5 | 471.00 | 3.18 |

The case where $f_o$=157 Hz and $f < f_o$ is shown in Table 2.

TABLE 2

| No. of forced vibration cycles | Forced vibration frequency (Hz) | Drive time (ms) |
|---|---|---|
| 12 | 144.92 | 82.80 |
| 11 | 143.92 | 76.43 |
| 10 | 142.73 | 70.06 |
| 9 | 141.30 | 63.69 |
| 8 | 139.56 | 57.32 |
| 7 | 137.38 | 50.96 |
| 6 | 134.57 | 44.59 |
| 5 | 130.83 | 38.22 |
| 4 | 125.60 | 31.85 |
| 3 | 117.75 | 25.48 |
| 2 | 104.67 | 19.11 |
| 1 | 78.50 | 12.74 |
| 0.5 | 52.30 | 9.56 |

Now, as one feature of the drive system of the present example, the frequency "f" of the alternating drive voltage V(t) supplied to the electromagnetic coil L is not made to match the natural frequency ($f_o$=157 Hz) of the mechanical vibrator 3. The frequency is set to a completely separate non-resonant frequency to make the beat vibration appear. If dynamically analyzing this beat vibration, as explained later, an excitation action and damping action are alternately repeated.

(Bipolar Sine Wave Continuous Drive System)

Figure 6:
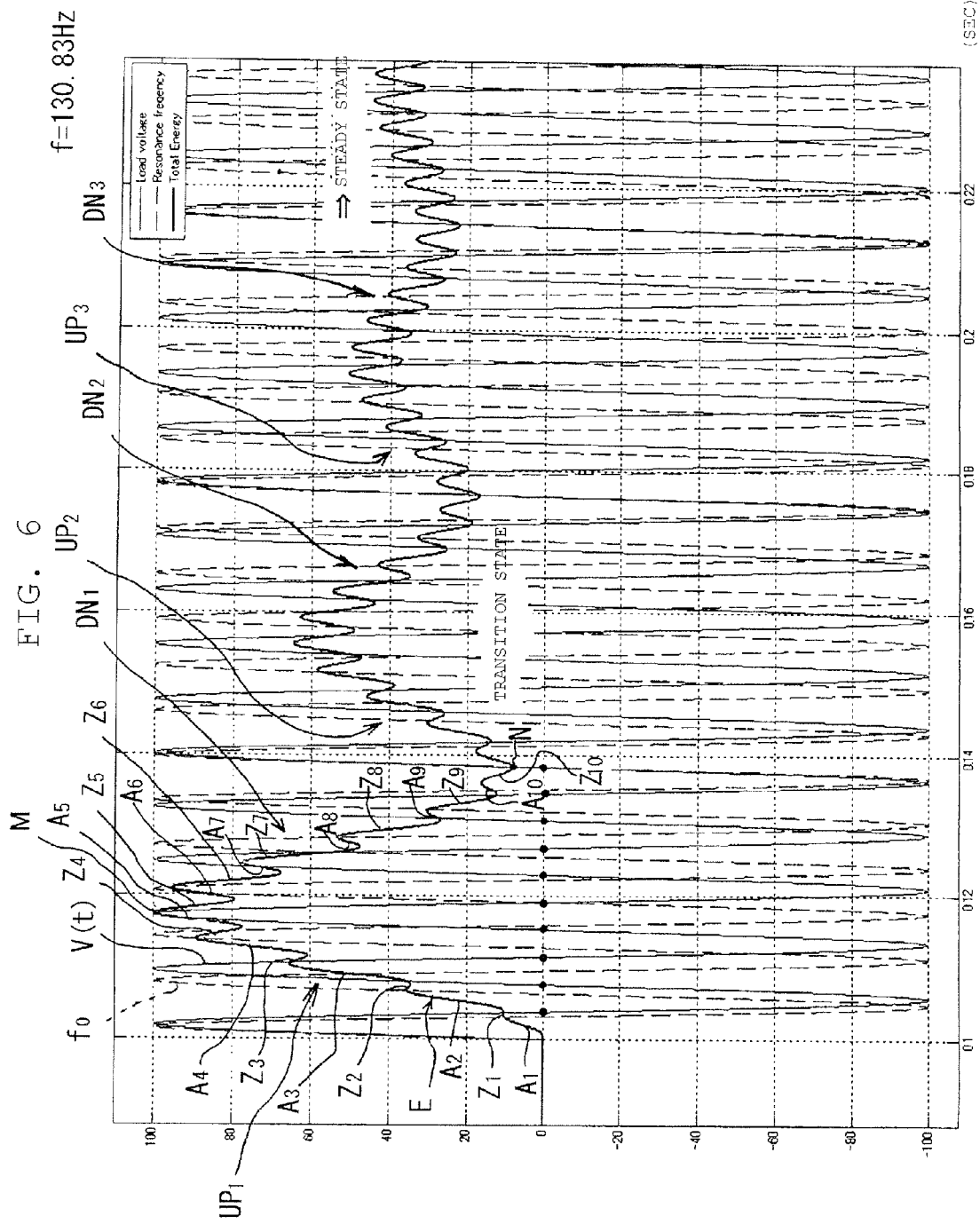
FIG. 6 is a graph showing a curve of the trend in the total energy E of a mechanical vibrator in the case of a frequency "f" of the drive voltage V of 130.83 Hz in the same vibration generating apparatus.

FIG. 6 shows the curve of the trend of the total energy E of the mechanical vibrator 3, in the case of a frequency "f" of the drive voltage V(t) shown by the fine line of 130.83 Hz, by the bold line. Note that, the broken line shows the resonance state of the natural frequency ($f_o$=157 Hz) virtually superposed. The ordinate shows the maximum value of the voltage (V) of the drive voltage V(t), the total energy E, and the displacement "x" all as 100%. FIG. 6 shows the transition state of the beat vibration from drive start to transition to a steady state stronger by exactly a frequency component (f) of the forced vibration. Note that, the total energy E(t) of the mechanical vibrator 3 is the sum of the kinetic energy T(t) of the mechanical vibrator 3 and the strain energy U(t) of the spring element S (first plate spring 6 and second plate spring 7):

$$E(t) = T(t) + U(t) = m(dx/dt)^2/2 + kx^2/2 \qquad (10)$$

In the drive method of FIG. 6, the mechanical vibrator 3 is forcibly rocked by non-contact by a frequency (f=130.83 Hz) close to 20% slower than the natural frequency ($f_o$=157 Hz), so as clear from the total energy E trend, a period of an excitation action where the sine wave external force F·sin(ωt) by the dynamic magnetic force generated by the electromagnetic coil L acts in the vibration direction of the mechanical vibrator 3 (excitation period A) and a period of a damping action where that force acts in the opposite direction from the vibration direction of the mechanical vibrator 3 (damping period Z) alternately appear. Each excitation period A corresponds to an energy rising process in terms of total energy E, while each damping period Z corresponds to an energy falling process in terms of total energy E. As explained later, so long as the drive voltage V(t) continues as a sine wave of a predetermined amplitude at the forced vibration frequency (f), the excitation periods A appear in the descending order of time while the damping periods Z conversely appear in the ascending order of time, so an excitation dominant period UP where the time of the excitation periods A is ¼ cycle of the forced vibration frequency (f) or more and the time of the damping periods Z is ¼ of the forced vibration frequency (f) or less and, after this excitation dominant period UP, a damping dominant period DN where the time of the excitation periods A is ¼ cycle of the forced vibration frequency (f) or less and the time of the damping periods Z is ¼ cycle of the forced vibration frequency (f) or more are alternately repeated. The higher order periodicity of the alternate repetition of this excitation dominant period UP and damping dominant period DN corresponds to the beat period $T_B$ of the displacement "x" and corresponds to the time from one valley part to another valley part of the beat wave. After a considerable time passes, the periodic spikes of the excitation dominant period UP and the damping dominant period DN become gentler and flatter, the total energy E converges to a constant value ($kC^2/2$), and a steady state where only the forced vibration component (f=130.83 Hz) remains is settled down to. Further, in order for the vibration generating apparatus of this example to exhibit a vibration tactile haptic effects, at the start of the damping dominant period DN, a self braking action is applied, then the drive voltage V(t) is stopped.

The maximum value (maxima) M of the total energy E at FIG. 6 appears at the point of time when the final excitation period $A_5$ of the initial excitation dominant period $UP_1$ ends, the peak of the first peak part of the beat wave, that is, at the cycles (1/f) of the drive voltage V(t), at the end point of about 2.25 cycles. The minimum value (minima) N of the total energy E, not including the start, appears at the point of time when the final damping period $Z_{10}$ at the initial damping dominant period $DN_1$ ends, the valley point of the second valley part of the beat wave, that is, the point of time of the 5 cycles of the cycles (1/f) of the drive voltage V(t), further, the point of time of the 6 cycles of the cycles (1/$f_0$) of the natural frequency $f_0$, at the number of cycles of the displacement "x", the point of time of 5.5 cycles. This minimum value N is about 8% of the maximum value M, so if stopping the drive of the drive voltage V(t) for a drive time of 5 cycles (38.22 ms), the mechanical vibrator 3 then stops after a short period of natural damping from this minimum value N. Note that, the case of stopping the drive at the end of the initial damping dominant period $DN_1$ can be detected as the one strongest beat tactilely. The case of stopping the drive at the end of the second damping dominant period $DN_2$ can be detected as two beats tactilely.

Figure 7:
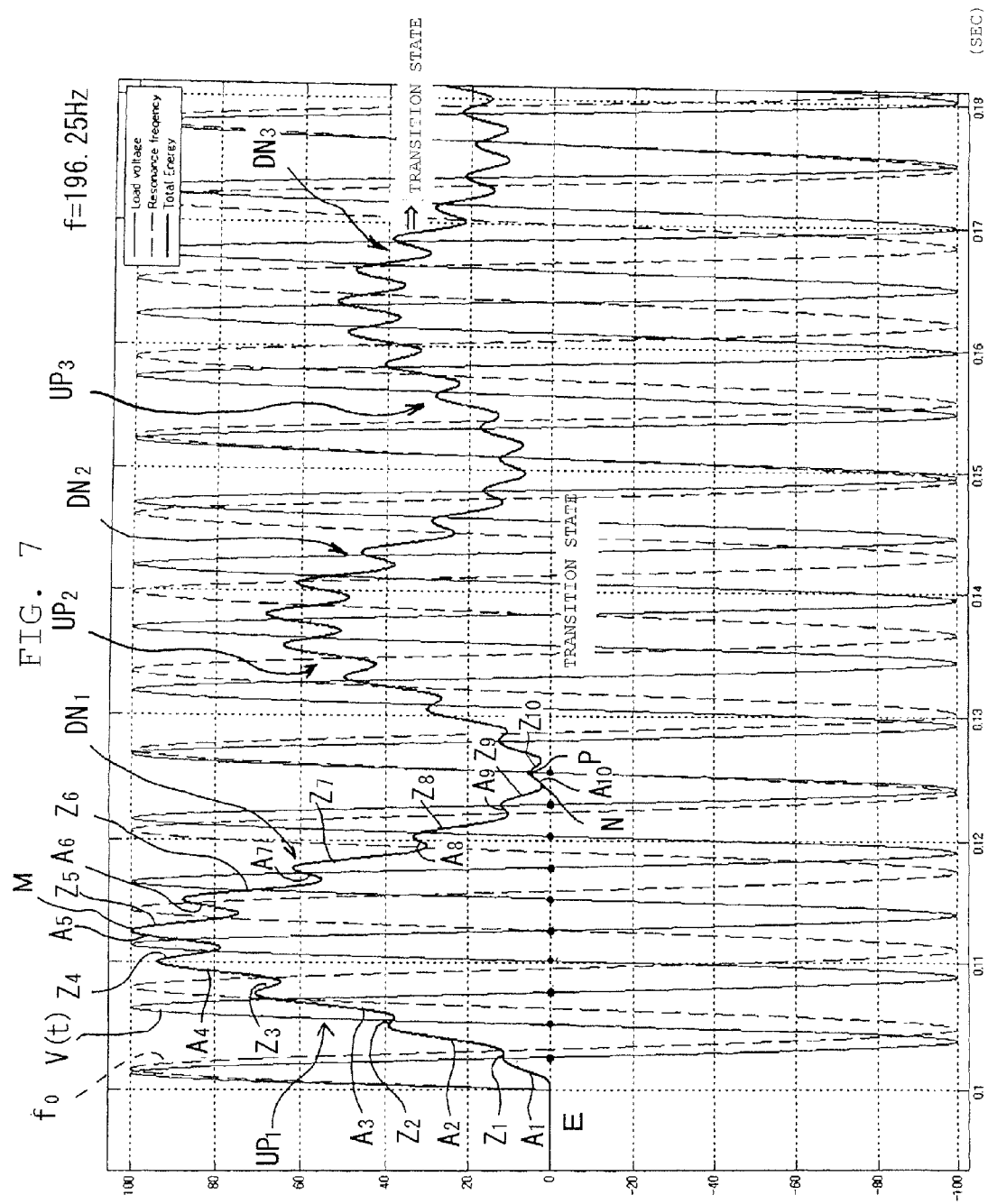
FIG. 7 is a graph showing a curve of the trend in the total energy E of a mechanical vibrator in the case of a frequency "f" of the drive voltage V of 196.25 Hz in the same vibration generating apparatus.

FIG. 7 shows the curve of the trend of the total energy E of the mechanical vibrator 3, in the case of a frequency "f" of the drive voltage V(t) shown by the fine line of 196.25 Hz, by the bold line. Note that, the broken line shows the resonance state of the natural frequency ($f_o$=157 Hz) virtually superposed. The ordinate shows the maximum value of the voltage (V) of the drive voltage V(t), the total energy E, and the displacement "x" all as 100%. In this drive system as well, the figure shows the transition state of the beat vibration from drive start to transition to a steady state stronger by exactly a forced frequency component "f". This time, the mechanical vibrator 3 is forcibly rocked by non-contact by a frequency (f=196.25 Hz) 20% or more greater than the natural frequency ($f_o$=157 Hz). Again, a period of an excitation action where the sine wave external force F·sin (ωt) by the vibrating magnetic field of the electromagnetic coil L acts in the vibration direction of the mechanical vibrator 3 (excitation period A) and a period of a damping action where that force acts in the opposite direction from the vibration direction (damping period Z) alternately appear. Each excitation period A corresponds to an energy rising process in terms of total energy E, while each damping period Z corresponds to an energy falling process in terms of total energy E. As explained later, so long as the drive voltage V(t) continues as the sine wave of a predetermined amplitude at the forced vibration frequency (f), the excitation periods A appear in a descending order of time and the damping periods Z conversely appear in an ascending order of time, so an excitation dominant period UP where the time of the excitation periods A is ¼ cycle of the forced vibration frequency (f) or more and the time of the damping periods Z is ¼ of the forced vibration frequency (f) or less and, after the excitation dominant period UP passes, a damping dominant period DN where the time of the excitation periods A is ¼ cycle of the forced vibration frequency (f) or less and the time of the damping periods Z is ¼ cycle of the forced vibration frequency (f) or more are alternately repeated. The higher order periodicity of the alternate repetition of this excitation dominant period UP and damping dominant period DN corresponds to the beat period $T_B$ and corresponds to the time from one valley part to another valley part of the beat wave. After a considerable time passes, the periodic spikes of the excitation dominant period UP and the damping dominant period DN become gentler and flatter, the total energy E converges to a constant value ($kC^2/2$), and a steady state where only the forced vibration component (f=196.25 Hz) remains is settled down to. Further, in order for the vibration generating apparatus of this example to exhibit a vibration tactile haptic effects, at the start of the damping dominant period DN, a self braking action is applied, then the drive voltage V(t) is stopped.

The maximum value (maxima) M of the total energy E at FIG. 7 appears at the point of time when the final excitation period $A_5$ of the initial excitation dominant period $UP_1$ ends, the peak of the first peak part of the beat wave, that is, at the frequency (f=196.25 Hz) of the drive voltage V(t), the point of time of about 2.5 cycles. The minimum value (minima) N of the total energy E, not including the start, appears at the point of time when the final damping period $Z_9$ of the initial damping dominant period $DN_1$ ends, but in this initial damping dominant period $DN_1$, after the final damping period $Z_9$, the final excitation period $A_{10}$ is entered. The point of time of the end of this final excitation period $A_{10}$ becomes the completion of the 5 cycles and shows the minimum maxima P slightly higher than the minimum value (minima) N. As explained later, the excitation period $A_{10}$ is involved since the drive voltage is high in the damping period $Z_9$ due to the fine vibration, so the phase advances too much and the next excitation period $A_{10}$ arrives early. The maxima P of this minimum is about 5% of the maximum value M, so if stopping the drive of the drive voltage V(t) at the drive time 5 cycles (25.48 ms), the vibration then naturally attenuates from the maxima P. This stopping point is also the point of time of 4 cycles of the cycles (1/$f_0$) of the natural frequency $f_0$. Note that, it is also possible not to stop the drive voltage V(t) at the maxima P of the minimum, but to stop the drive voltage V(t) at the minimum value (minima) N right before 5 cycles end. The minimum value (minima) N is about 3% of the maximum value M, so at this point of time, the insensitive zone is entered, so it is not necessary to wait for natural damping. Note that, the case of stopping the drive at the end of the initial damping dominant period $DN_1$ can be detected as the one strongest beat tactilely. The case of stopping the drive at the end of the second damping dominant period $DN_2$ can be detected as two beats tactilely.

At FIG. 6, at a natural frequency $f_o$ of 6 cycles and a drive time of the drive voltage V(t) of 5 cycles, the initial vibration phenomenon of the displacement "x" appears as an alternating repetition of the excitation periods A and the damping periods Z, causes a beat vibration, and shows when the final damping period $Z_{10}$ of the initial damping dominant period $DN_1$ ends at the minimum value (minima) N. If expressing the cross point (zero cross point) where the polarity of the ± bipolar drive voltage V(t) of the input switches as the symbol "|", expressing the turning point (peak) where the direction of vibration of the displacement "x" as the response inverts as the symbol "·", expressing the drive start as "<", and expressing the stopping of vibration as ">", the initial beat vibration up to the initial damping dominant period $DN_1$ of FIG. 6 becomes a center peak projecting mode in the curve of the total energy E and can be expressed as <$A_1$·$Z_1$|$A_2$·$Z_2$|$A_3$·$Z_3$|$A_4$·$Z_4$|$A_5$·$Z_5$|$A_6$·$Z_6$|$A_7$·$Z_7$|$A_8$·$Z_8$|$A_9$·$Z_9$|$A_{10}$·$Z_{10}$>. Note that, $A_5$·$Z_5$ shows the half cycle (½f) part at the peak of the center peak projections. The times of the fifth excitation period $A_5$ and the fifth damping period $Z_5$ are generally ¼ cycles (¼f). The period from the first excitation period $A_1$ to the fifth excitation period $A_5$ is the initial excitation dominant period $UP_1$, while the period from the fifth damping period $Z_5$ to the 10th damping period $Z_{10}$ is the initial damping dominant period $DN_1$. At any half cycle of this drive system, as expressed by |A·Z|, at an excitation period A, the mechanical vibrator 3 decelerates and vibration cannot be increased. A turn is caused at this point, so the damping period Z is entered. This is referred to below as "excitation turning".

On the other hand, in FIG. 7, at a natural frequency $f_o$ of 4 cycles and a drive time of the drive voltage V(t) of 5 cycles, the beat phenomenon of the displacement "x" ends at the final damping period $Z_9$ of the initial damping dominant period $DN_1$. The initial vibration phenomenon up to the initial damping dominant period $DN_1$ of FIG. 7 is a curve of the total energy E of a center peak projecting mode and may be expressed as $<A_1|Z_1 \cdot A_2|Z_2 \cdot A_3|Z_3 \cdot A_4|Z_4 \cdot A_5|Z_5 \cdot A_6|Z_6 \cdot A_7|Z_7 \cdot A_8|Z_8 \cdot A_9|Z_9>$. At any half cycle of this drive system, the braking on the mechanical vibrator 3 at the damping period Z becomes too strong and vibration swings back in the opposite direction, so an excitation period A is entered. This will be referred to below as the "damping turning". The period from the first excitation period $A_1$ to the fifth excitation period $A_5$ is the initial excitation dominant period $UP_1$, while the period from the fifth damping period $Z_5$ to the ninth damping period $Z_9$ is the initial damping dominant period $DN_1$. However, the end point of the ninth damping period $Z_9$ is not the active cross point of the drive voltage V(t), but is the passive turning point of the displacement "x". This turning point appears somewhat earlier than the end point of the 5 cycles and does not match it. In the ninth damping period $Z_9$, the vibration is already dampened to slight vibration, but compared with this, the amplitude value of the drive voltage V(t) is high, so the damping action is too strong, so the turning point of the displacement "x" quickly arrives and as a result the next excitation period $A_{10}$ is entered before the end point of the 5 cycles. It is also possible to stop the drive voltage V(t) at a point of time of the minimum value N before the end point of the 5 cycles, but as explained later, at the final damping period $Z_9$ of the initial damping dominant period $DN_1$, it is preferable to suppress the amplitude value of the drive voltage V(t) in advance and make the point of time of the minimum value N make a soft landing at the displacement origin zero of the end point of the 5 cycles. Note that, the point of time of the minimum value N of FIG. 6 is not the turning point of the displacement "x", but is the cross point of the drive voltage V(t), so does not appear before the end point of the 5 cycles.

Now, returning to the basics here, we will further analyze an excitation period A in the transitory state of the damping system non-resonance type forced vibration and the vibration phenomenon of the damping period Z (beat vibration). First, to explain the behavior of the total energy E(t), if finding the rate of change of energy, dE/dt, from equation (10), $$dE/dt = dx/dt \cdot (m \cdot d^2x/dt^2 + kx) \tag{11}$$

The term inside the parentheses at the right side can be rewritten using the equation of motion of equation (1) to obtain $$dF/dt = (F \cdot \sin(\omega t) - c \cdot dx/dt) dx/dt \tag{12}$$

When the total energy E(t) takes its extreme value (maxima or minima), dE/dt=0, so the following stand:

$$dx/dt = 0 \tag{13}$$

or $$dx/dt = (F/c)\sin(\omega t) \tag{14}$$

Here, if assuming that $dx/dt \neq 0$ and solving the differential equation (14), $$x = (-F/c\omega)\cos(\omega t) \tag{15}$$

but with a damping system non-resonance type forced vibration, the displacement "x" is not a cosine function of the angular frequency ω, so the equation (13) is determined as the solution. Therefore, one extreme value is the time of the turning point (peak) of the displacement "x". Further, if entering equation (13) into equation (12), the result becomes $$\sin(\omega t) = 0 \tag{16}$$

The other extreme value is the time of the zero cross point, that is, the cross point of the drive voltage V(t).

In this way, at the time of the cross point of the drive voltage V alternating in polarities and at the time of the turning point of the displacement "x", an extreme value of the total energy E is taken. An extreme value includes a maxima and minima, so there are two cases. As explained later, when $f_o < f$, the initial vibration period becomes "damping turning" as shown by $<A_1|Z_1 \cdot A_2|Z_2$, turns during the damping action which occurs by alternation of the drive voltage V, and becomes a self exciting action, so the time of the cross point of the drive voltage V(t) becomes the maxima of the total energy E and the time of the turning point of the displacement "x" becomes the minima of the total energy E. Conversely, when $f < f_o$, the initial vibration period becomes "excitation turning" as shown by $<A_1 \cdot Z_1|A_2 \cdot Z_2$, turns during the excitation action which occurs by alternation of the drive voltage V(t), and becomes a self damping action, so the time of the turning point of the displacement "x" becomes the maxima of the total energy E and the time of the cross point of the drive voltage V(t) becomes the minima of the total energy E.

Figure 8:
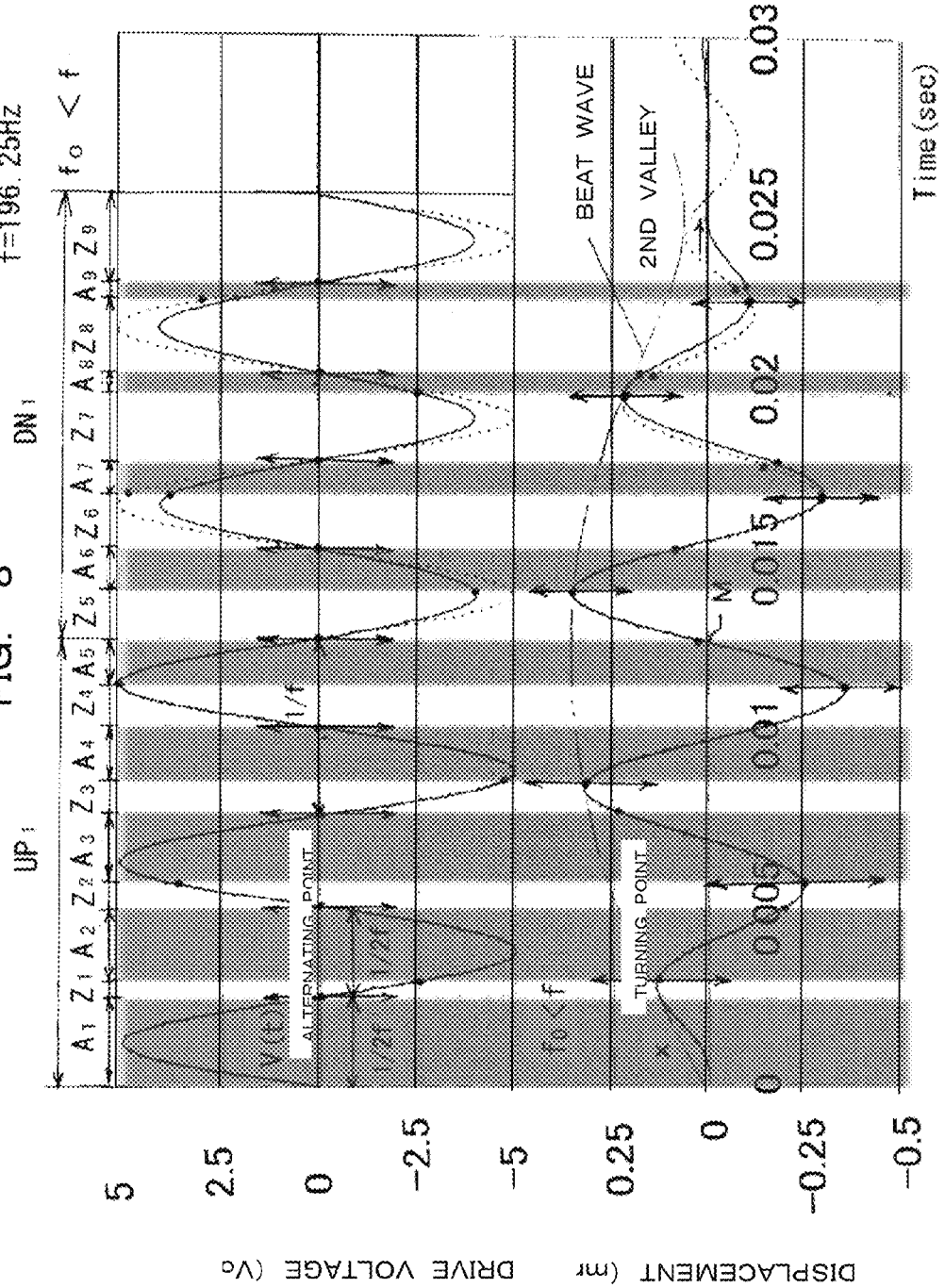
FIG. 8 is a graph showing curves of the trends in displacement "x" of a mechanical vibrator and a 5-cycle drive in the cases of an amplitude 5V and amplitudes 5V and 4V by a drive voltage V(t) of a frequency "f" of 196.25 Hz in the same vibration generating apparatus.

First, as an example of $f_o < f$, the broken line of FIG. 8 shows the curve of the trend of displacement "x" of the mechanical vibrator 3 in the case of a 5-cycle drive of an amplitude 5V by a drive voltage V(t) of a frequency "f" ($= 2\pi/\omega$) of 196.25 Hz, while the solid line of FIG. 8 shows the curve of the trend of displacement "x" of the mechanical vibrator 3 in the case of a 2.5-cycle drive of an amplitude 5V and then a 2.5-cycle drive of an amplitude 4V by a drive voltage V(t) of a frequency "f" ($= 2\pi/\omega$) of 196.25 Hz. Note that, the natural frequency ($f_d \approx f_o$) is 157 Hz. The phase of the displacement "x" is somewhat delayed from the phase of the drive voltage V(t), but the frequency "f" ($= 196.25$ Hz) of the drive voltage V(t) is faster than the natural frequency ($f_o = 157$ Hz), so there is a further delay. At the initial cross point of the drive voltage V(t), kinetic energy still remains. Due to the remaining force, the displacement "x" is in the process of increasing in the initial vibration direction. When this cross point is past, a self damping action comes into play and the initial damping period $Z_1$ is entered. After the displacement "x" decelerates to the initial turning point (peak), at the second excitation period $A_2$, the displacement "x" inverts to a return process, passes through the displacement origin, and in reaction increases in the opposite direction. In this return process in the opposite direction, the second cross point arrives and the second damping period $Z_2$ is entered. In the second excitation period $A_2$ for exactly the return process, the strength increases compared with the first excitation period $A_1$, so the second damping period $Z_2$ becomes longer than the first damping period $Z_1$. The third excitation period $A_3$ becomes shorter than the second excitation period $A_2$, but the amplitude increases, so vibration in the opposite direction becomes larger. Finally, the fifth damping period $Z_5$ becomes substantially the same in time as the fifth excitation period $A_5$, so the amplitude no longer increases and the damping dominant period $DN_1$ is entered. The period of the first excitation period $A_1$ is a half period (½f) of the drive voltage V(t). At the turning point of the displacement "x" (peak), the reciprocating magnetic field applied relatively to the mechanical vibrator 3 becomes reverse in direction and becomes the end point of the first damping period $Z_1$. The next half period (½f) is the sum of the first damping period $Z_1$ and the second excitation period $A_2$. As clear from FIG. 8, the excitation periods $A_1$ to $A_9$ become a descending order in excitation time (phase difference of 180° to about 30°), while conversely the damping periods $Z_1$ to $Z_9$ become an ascending order in damping time (phase difference of about 30° to 180°), the excitation time of the initial excitation period $A_1$ becomes a half period (½f), by phase difference, 180°, and the sum of the damping time of the damping period $Z_i$ and the excitation period of the next excitation period $A_{i+1}$ is the half period (½f), by phase difference, 180°. Note that, the maximum value M of the displacement "x" appears at 2.5 cycles of the drive voltage V(f).

As clear from FIG. 8, the point of time of the maximum value M is 2.5 cycles of the drive voltage V(t), but at the 2.5 cycles of the damping dominant period $DN_1$, a difference is seen between the amplitude 5V of the broken line and the amplitude 4V of the solid line. At the latter 2.5 cycles of the damping dominant period $DN_1$, with continuous driving reduced from the amplitude 5V to the amplitude 4V, the forced vibration force of the forced vibration frequency "f" weakens somewhat. The free vibrating ability of the natural frequency $f_o$ is restored somewhat, so the phase becomes somewhat retarded. At the damping turning, the damping action weakens. The turning point is delayed and the damping period becomes reliably longer by that amount. The next excitation period becomes shorter and the excitation action weakens relatively, so more energy is consumed than the case of an amplitude 5V drive. The reduction in voltage right before stopping vibration in the damping dominant period $DN_1$ has the effect of retarding the phase of the displacement "x" and an energy consumption effect by reduction of the excitation force. To obtain a sharp vibration tactile haptic effects, shortening the braking time is an urgent task. Rapidly stopping the mechanical vibrator 3 in the damping dominant period $DN_1$ means the velocity of the displacement origin becoming zero. The 5V of the broken line at the point of time of completion of 5 cycles still has velocity. Residual vibration lingers on by natural damping, but at the 4V drive of the solid line, the peak is made to soft land at the displacement origin. There is almost no residual vibration. Note that the mode of drop of the amplitude voltage need not be step like and may also be continuous damping.

Figure 9:
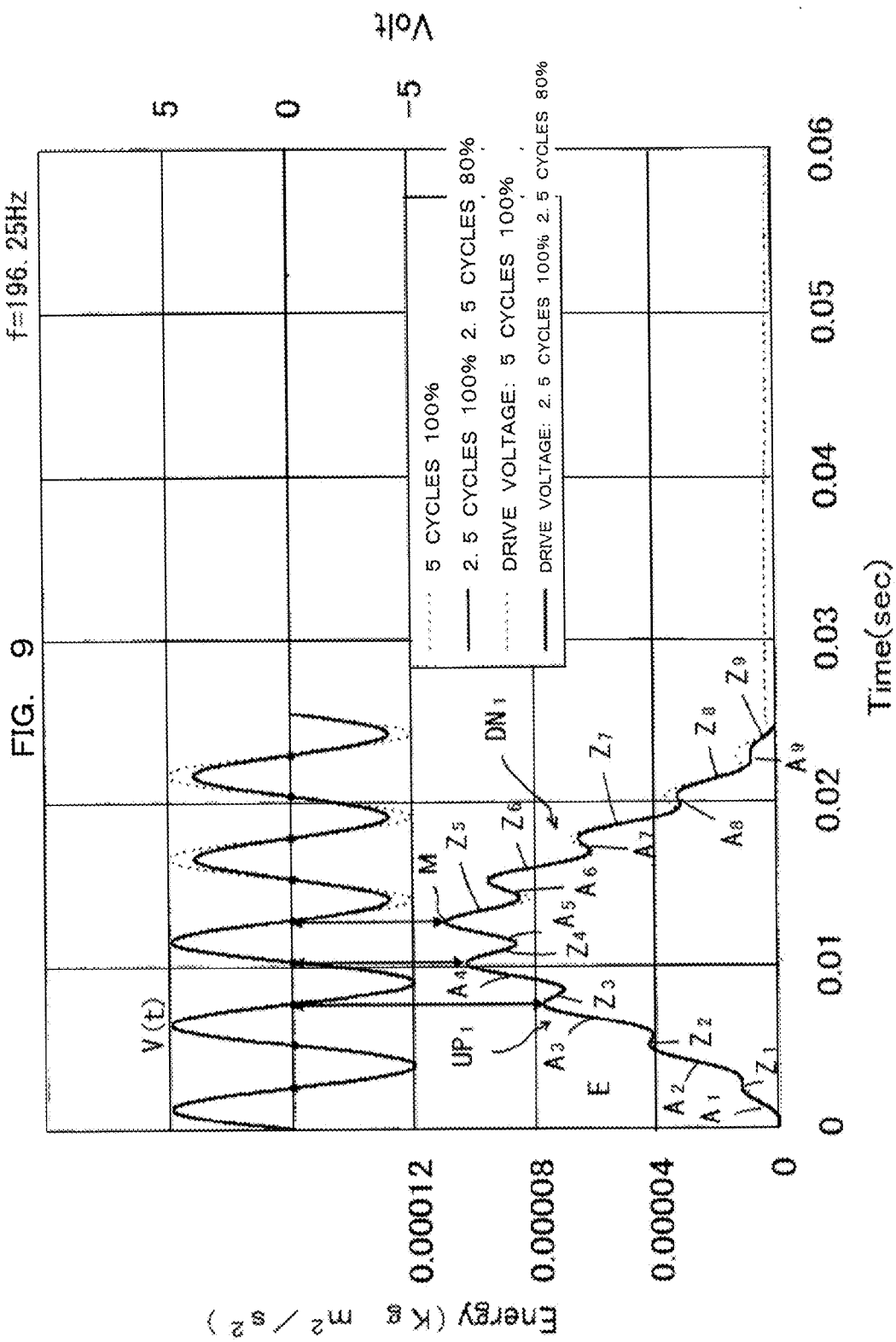
FIG. 9 is a graph showing curves of the trends in the total energy E of a mechanical vibrator and a 5-cycle drive in the cases of an amplitude 5V and amplitudes 5V and 4V by a drive voltage V(t) of a frequency "f" of 196.25 Hz in the same vibration generating apparatus.

The broken line of FIG. 9 shows the curve of the trend of the total energy E of the mechanical vibrator 3a in the case of 5-cycle drive of an amplitude 5V by a drive voltage V(t) of a frequency "f" of 196.25 Hz, while the solid line of FIG. 9 shows the curve of the trend of the total energy of the mechanical vibrator 3 in the case of 2.5-cycle drive of an amplitude 5V by a drive voltage V(t) of a frequency "f" of 196.25 Hz then the 2.5-cycle drive of the amplitude 4V. Note that, the natural frequency ($f_d \approx f_o$) is 157 Hz. As clear from FIG. 9, the cross point (zero cross point) of the drive voltage V(t) and the maxima of the total energy E correspond. The point of time of the maximum value M is the time of the end of 2.5 cycles, but a difference is seen between the amplitude 5V and the amplitude 4V during the 2.5 cycles of the subsequent damping dominant period $DN_1$. With an amplitude 4V, the damping action at each damping period Z is somewhat weak, the excitation action at each excitation period A is also weak, and overall, in the damping dominant period $DN_1$, the damping action becomes strong. At the end point, in the case of 5V, the natural damping becomes more protracted, while in the case of 4V, the value quickly converges to zero.

While not taken up in the drawings, at 2.5 cycles of the damping dominant period $DN_1$, it was tried to raise the amplitude of the drive voltage V(t) to 6V, but the forced vibration force of the forced vibration frequency "f" is strengthened somewhat and, by that amount, the free vibrating ability of the natural frequency $f_o$ is weakened somewhat, so the phase is advanced somewhat, the turning point becomes earlier and the damping period becomes shorter by the amount by which the damping action becomes stronger, the next excitation period becomes longer relatively, the excitation action becomes stronger, and energy builds up more than the case of amplitude 5V drive, resulting in the reverse effect. Further, there are also other inconveniences. The drive voltage V(t) at the excitation dominant period $UP_1$ causes rapid excitation as the maximum voltage (usually 5V) so far as allowed by the vibration generating apparatus, so unless there is a separate voltage boosting circuit, voltage of the maximum voltage or more cannot be supplied at the damping dominant period $DN_1$. On the other hand, in 2.5 cycles of the damping dominant period $DN_1$, it was attempted to further lower the amplitude of the drive voltage V to 3V, but if the voltage is too low, the damping action becomes extremely weak, so the damping period becomes long, "damping turning" does not occur, but alternation results giving "excitation turning", weak excitation dominant period ends up being switched to, and zero is approached slower than the case of 5V. Therefore, when making the amplitude value of the drive voltage V(t) constant over 2.5 cycles of the damping dominant period $DN_1$, there is an optimal value. In this example, it is preferably 4V or 80% of the amplitude value of the excitation dominant period $UP_1$. Note that, this value is needless to say substantially accompanied with some margin. About 70% is also possible.

Figure 10:
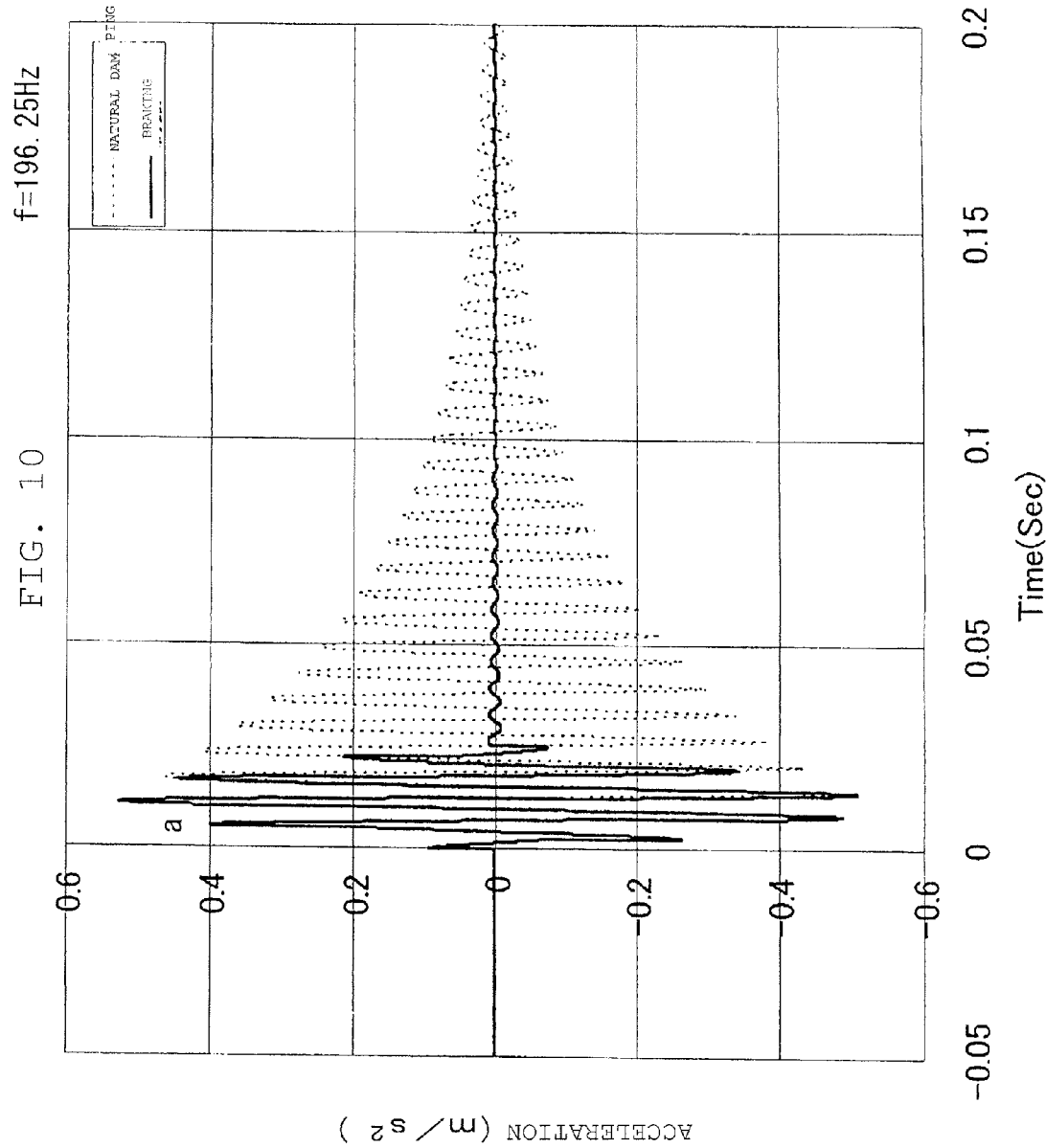
FIG. 10 is a graph showing curves of the trends in acceleration in the cases of a 5-cycle drive of an amplitude 5V and amplitudes 5V and 4V by a drive voltage V(t) of a frequency "f" of 196.25 Hz in the same vibration generating apparatus.

The solid line of FIG. 10 shows the trend in acceleration at the time of a 5-cycle drive of an amplitude 5V by a drive voltage V(t) of a frequency "f" of 196.25 Hz, while the broken line of FIG. 10 shows the acceleration when making the drive voltage V(t) zero after 2.5 cycles to set natural damping. The drive voltage V(t), at the time of the 2.5-cycle, corresponds to the maxima M of the total energy E, but here, if stopping the drive voltage V(t), as shown by the broken line, the residual vibration at the natural damping will end up becoming considerably protracted, so as the 5-cycle drive, stopping the drive voltage V at the end period of the damping dominant period $DN_1$ causes the vibrator to stop far faster. A sharp vibration haptic effects can be exhibited. The envelope of the acceleration vibration is sensed as one beat. Note that, zero acceleration corresponds to the inflection point of the displacement "x".

Figure 11:
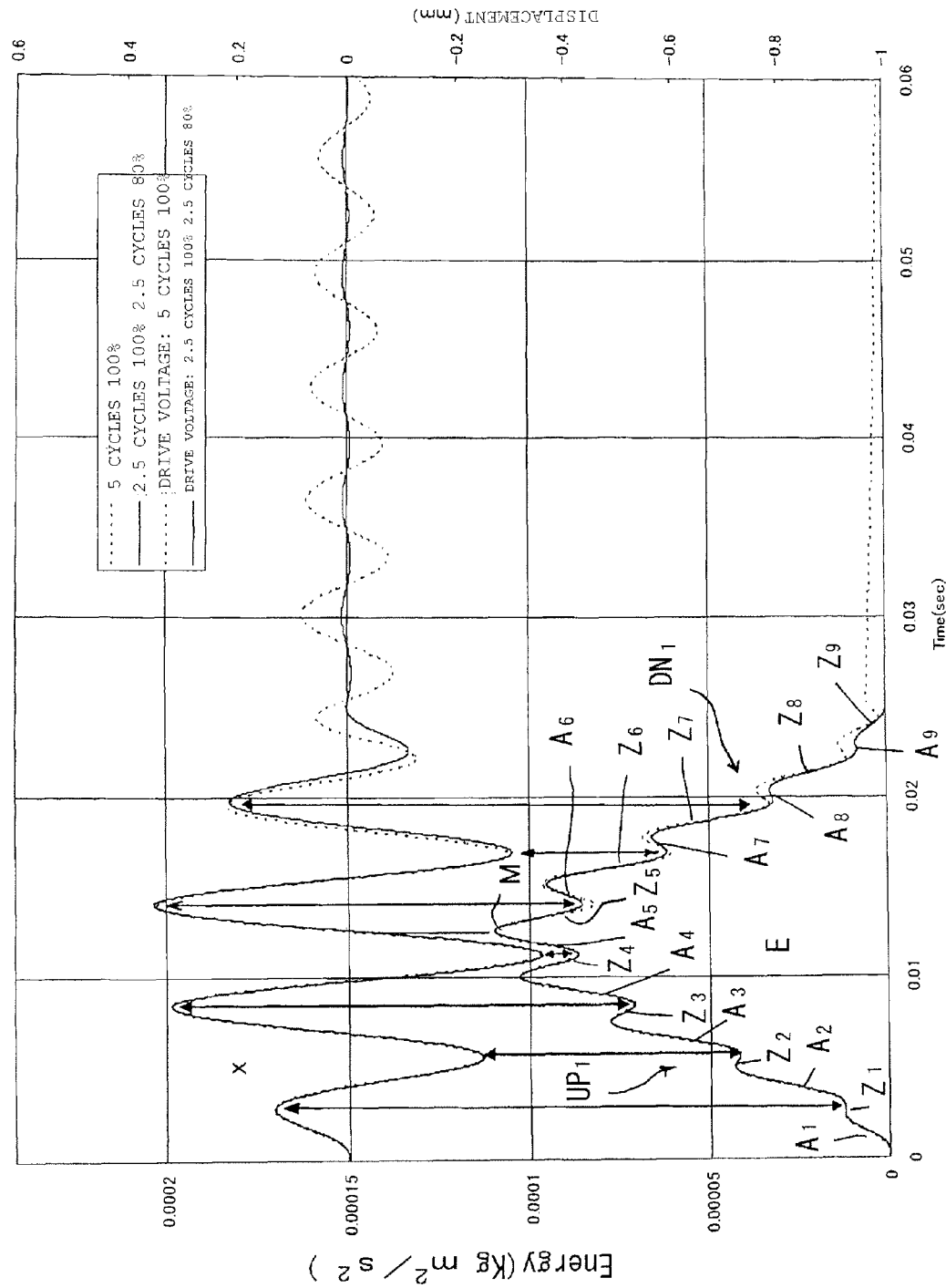
FIG. 11 is a graph showing curves of the trends in a displacement "x" of a mechanical vibrator and a total energy E of the mechanical vibrator in the cases of a 5-cycle drive of an amplitude 5V and amplitudes 5V and 4V by a drive voltage V(t) of a frequency "f" of 196.25 Hz in the same vibration generating apparatus.

The broken lines of FIG. 11 shows the curves of the trends of the displacement "x" and the total energy E of the mechanical vibrator 3 in the case of a 5-cycle drive of an amplitude 5V by a drive voltage V(t) of a frequency "f" of 196.25 Hz, while the solid lines of FIG. 11 shows the curves of the trends of the displacement "x" and the total energy E of the mechanical vibrator 3 in the case of a 2.5-cycle drive of an amplitude 5V by a drive voltage V(t) of a frequency "f" of 196.25 Hz then a 2.5-cycle drive of an amplitude 4V. Note that the natural frequency ($f_d \approx f_o$) is 157 Hz. As clear from FIG. 11, the turning point (dx/dt=0) of the displacement "x" and the minima (dE/dt=0, $d^2E/dt^2$<0) of the total energy E correspond. The point of time of the maximum value M is the time of the end of the 2.5 cycles. Regarding the difference of the amplitude 5V and the amplitude 4V at the subsequent 2.5 cycles of the damping dominant period $DN_1$, a similar trend is seen for the total energy E as FIG. 8, but with the curve of the displacement "x", the state of extension of the natural attenuation of the amplitude 5V may be glimpsed. If the amplitude of the drive voltage V(t) at the excitation period A in the damping dominant period $DN_1$ is large, the excitation action is strong, so the displacement "x" ends up being increased. If looking closely at the 5V displacement (broken line) and 4V displacement (solid line), the 4V displacement (solid line) is lower in voltage value, so the phase is somewhat delayed, but the excitation action at the excitation period A can be weakened, so as a result, the vibration converges to the still point.

Figure 12:
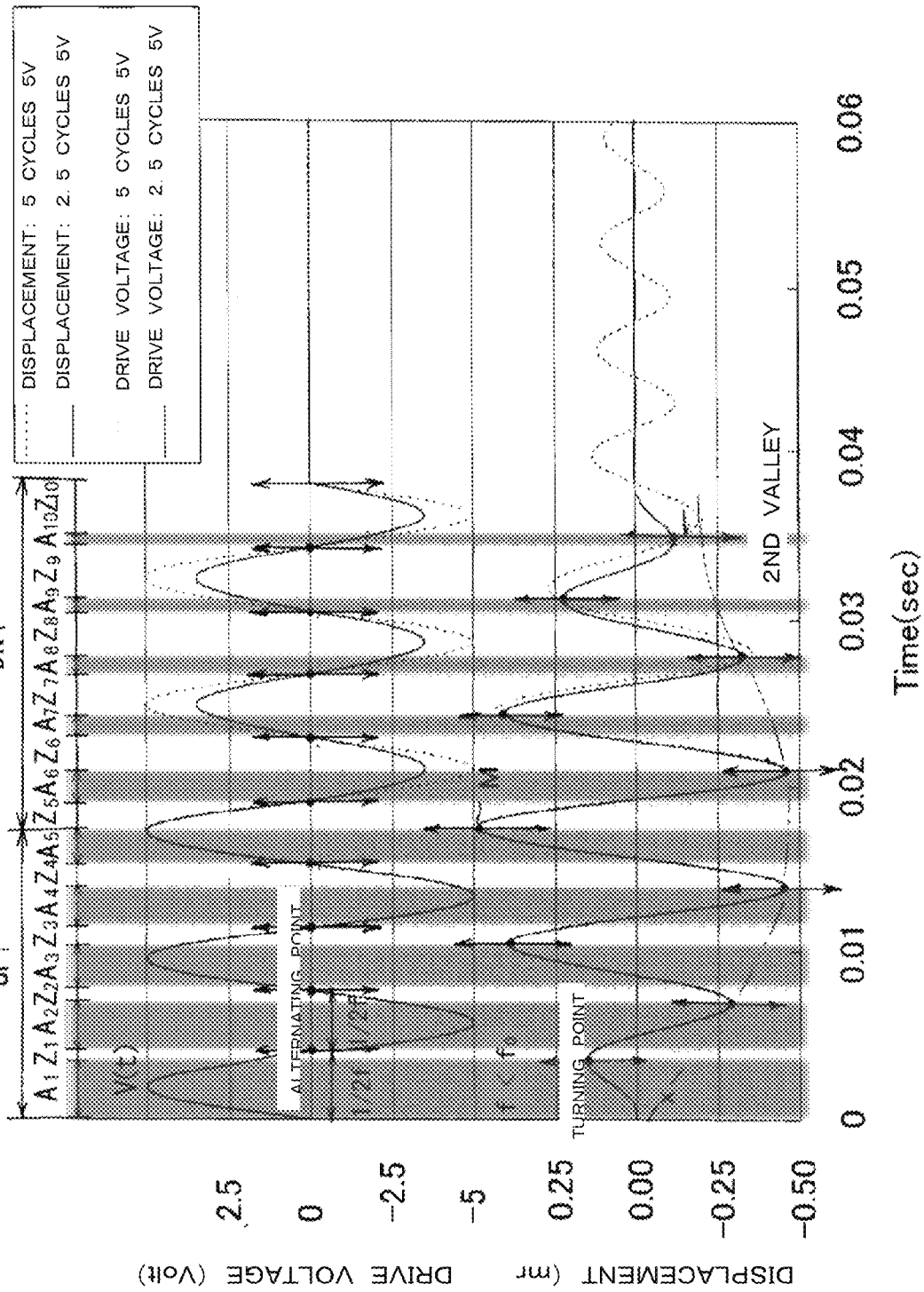
FIG. 12 is a graph showing curves of the trends in the displacement "x" of a mechanical vibrator in the cases of a 5-cycle drive of an amplitude 5V and amplitudes 5V and 3.5V by a drive voltage V(t) of a frequency "f" of 130.83 Hz in the same vibration generating apparatus.

This time, as one example of $f<f_o$, the broken line of FIG. 12 shows a curve of the trend of the displacement "x" of the mechanical vibrator 3 in the case of a 5-cycle drive of the amplitude 5V at a drive voltage V(t) of a frequency "f" of 130.83 Hz, while the solid line shows a curve of the trend of the displacement "x" of the mechanical vibrator 3 in the case of a 2.5-cycle drive of the amplitude 5V at a drive voltage V(t) of a frequency "f" of 130.83 Hz and then a 2.5-cycle drive of the amplitude 3.5V. Note that the natural frequency ($f_d \approx f_o$) is 157 Hz. The phase of the displacement "x" is somewhat retarded from the phase of the drive voltage V(t), but the frequency "f" (=130.83 Hz) of the drive voltage V(t) is retarded from the natural frequency ($f_o$=157 Hz), so before the initial cross point of the drive voltage V(t), the displacement "x" reaches the turning point (peak) in the process of increasing vibration in the initial vibration direction. It changes from the turning point to the damping period $Z_1$, becomes a return process, then reaches the initial cross point and becomes the second excitation period $A_2$. The displacement "x" passes the displacement origin from the return point then increases in swing in the opposite direction. In the process of increasing in the opposite direction, the second turning point is switched to, so the second damping period $Z_2$ is entered, but in the second excitation period $A_2$, the strength increases by exactly the return process, so the second damping period $Z_2$ becomes longer than the first damping period $Z_1$. For this reason, the third excitation period $A_3$ becomes shorter than the second excitation period $A_2$, but the amplitude increases, so the swing in the opposite direction becomes greater. Finally, the fifth damping period $Z_5$ becomes substantially the same in time as the fifth excitation period $A_5$, so the amplitude no longer increases and the damping dominant period $DN_1$ is entered. At the turning point of the displacement "x" (peak), the mechanical vibrator 3 itself becomes reverse in direction from the reciprocating magnetic field and reaches the start point of the damping period Z. At the zero point (cross point) of the drive voltage V(t), the reciprocating magnetic field which is applied to the mechanical vibrator 3 becomes reverse and reaches the end point of the damping period Z. Further, as clear from FIG. 12, the excitation period $A_1$ to $A_{10}$ become a descending order in excitation time (phase difference of about 160° to about 20°). If compared with the case of FIG. 8, the excitation period of the first excitation period $A_1$ is less than a half period (½f). The sum of the excitation period of the i-th excitation period $A_i$ and the damping time of the damping period $Z_i$ is a half period (½f). Note that, the maximum value M of the displacement "x" appears at 2.25 cycles.

As clear from FIG. 12, in the damping dominant period $DN_1$ after 2.25 cycles, a difference appears between the amplitude 5V of the broken line and the amplitude 3.5V of the solid line. With continuous drive reducing the amplitude from the amplitude 5V to the amplitude 3.5V at the latter 2.75 cycles of the damping dominant period $DN_1$, the forced vibration force of the forced vibration frequency "f" weakens somewhat. The free vibrating ability at the natural frequency $f_o$ is restored somewhat to that extent, so the phase advances somewhat. At excitation turning, the excitation action weakens. The turning point becomes earlier and the excitation period becomes shorter by that amount. Further, the next damping period becomes longer relatively, so the energy is consumed more than the case of an amplitude 5V drive. The drop in voltage right before stopping the drive has the effect of advancing the phase of the displacement "x" and an energy consumption effect by the attenuation of the excitation force. Rapid stopping of the mechanical vibrator 3 in the damping dominant period $DN_1$ means the velocity at the displacement origin is zero, but at the broken line of 5V at the point of time of completion of the 5 cycles, there is still velocity. Residual vibration of natural damping lingers on, but at 3.5V of the solid line, the velocity also becomes substantially zero.

In the latter 2.5 cycles, the amplitude of the drive voltage V(t) was made 6V, but the damping action in each damping period Z is strong. The excitation action in each excitation period A is also strong. Overall, in the damping dominant period $DN_1$, the damping action becomes weak. In the end period, the amplitude approaches zero slower than the case of 5V. Further, in the latter 2.5 cycles of the damping dominant period $DN_1$, an amplitude of the drive voltage V(t) of 3V was experimented with, but the damping action in each damping period Z is extremely weak, the excitation action in each excitation period A is extremely weak, and overall the damping action becomes weak in the damping dominant period $DN_1$. In the end period, the amplitude approaches zero slower than the case of 5V. Therefore, when fixing the amplitude value of the drive voltage V(t) over the latter 2.5 cycles, there is an optimal value. In this example, 70% of the amplitude value of the excitation dominant period $UP_1$, 3.5V, is desirable. Note that, this value is substantially accompanied with some latitude of course. In the damping dominant period $DN_1$, it is preferable to reduce the voltage to 70%.

Figure 13:
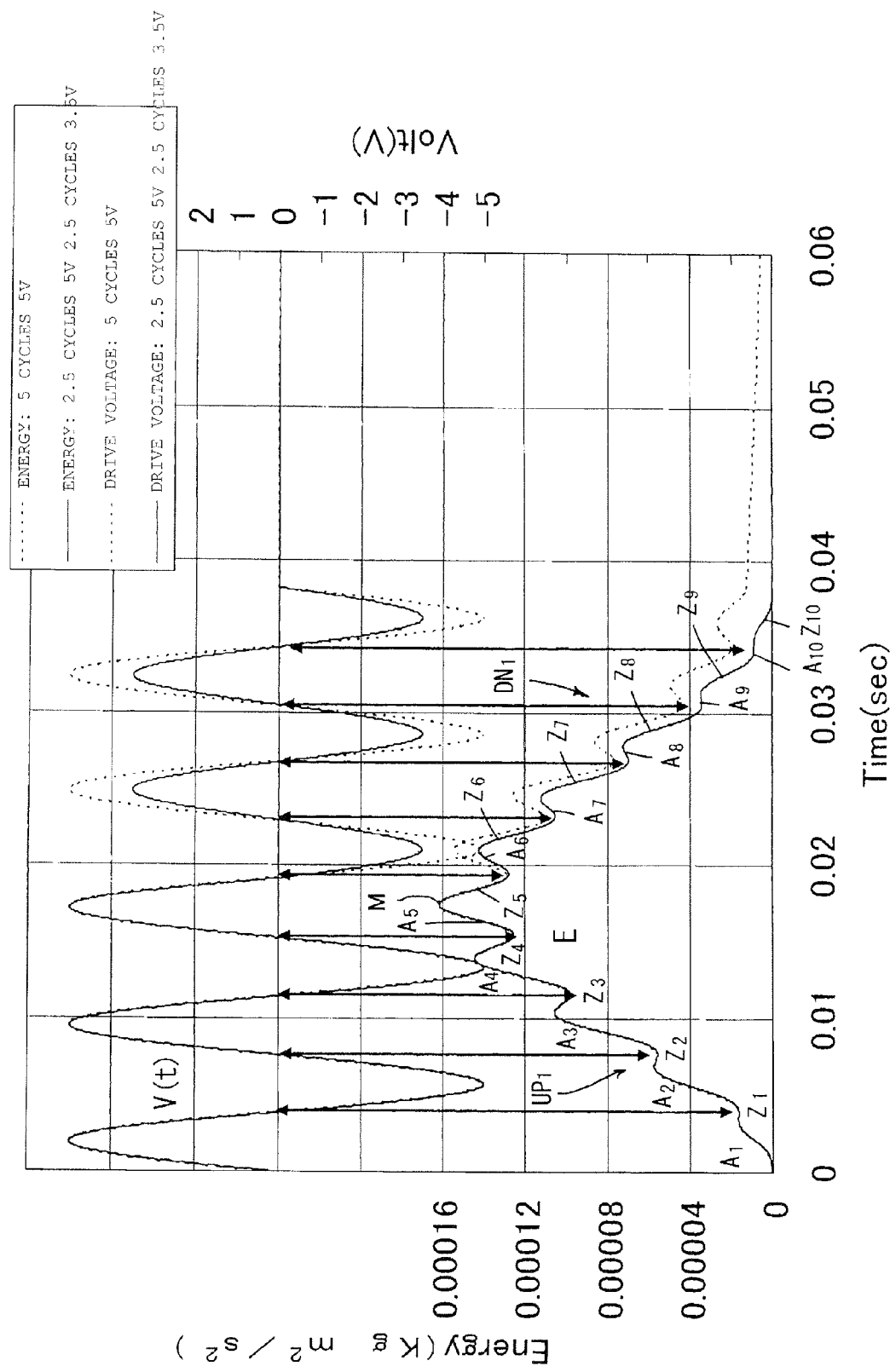
FIG. 13 is a graph showing curves of the trends in the total energy E of a mechanical vibrator in the cases of a 5-cycle drive of an amplitude 5V and amplitudes 5V and 3.5V by a drive voltage V(t) of a frequency "f" of 130.83 Hz in the same vibration generating apparatus.

The broken lines of FIG. 13 show curves of the trends in the total energy E of the mechanical vibrator 3 in the case of a 5-cycle drive of an amplitude 5V by a drive voltage V(t) of a frequency "f" of 130.83 Hz, while the solid lines of FIG. 13 show curves of the trends in the total energy E of the mechanical vibrator 3 in the case of a 2.5-cycle drive of an amplitude 5V by a drive voltage V(t) of a frequency "f" of 130.83 Hz and then a 2.5-cycle drive of an amplitude 3.5V. Note that, the natural frequency ($f_d \approx f_o$) is 157 Hz. As clear from FIG. 13, the cross point (zero point) of the drive voltage V(t) and the minima of the total energy E ($dE/dt=0$, $d^2E/dt^2>0$) correspond. The amplitude 3.5 v starts at the excitation period, so the excitation action is weak and the peak becomes low. Even in the damping period Z, the total energy E becomes lower by that amount. At the end period of the damping dominant period $DN_1$, in the case of 5V, the natural damping becomes protracted, but if 3.5V, the amplitude quickly converges to zero.

Figure 14:
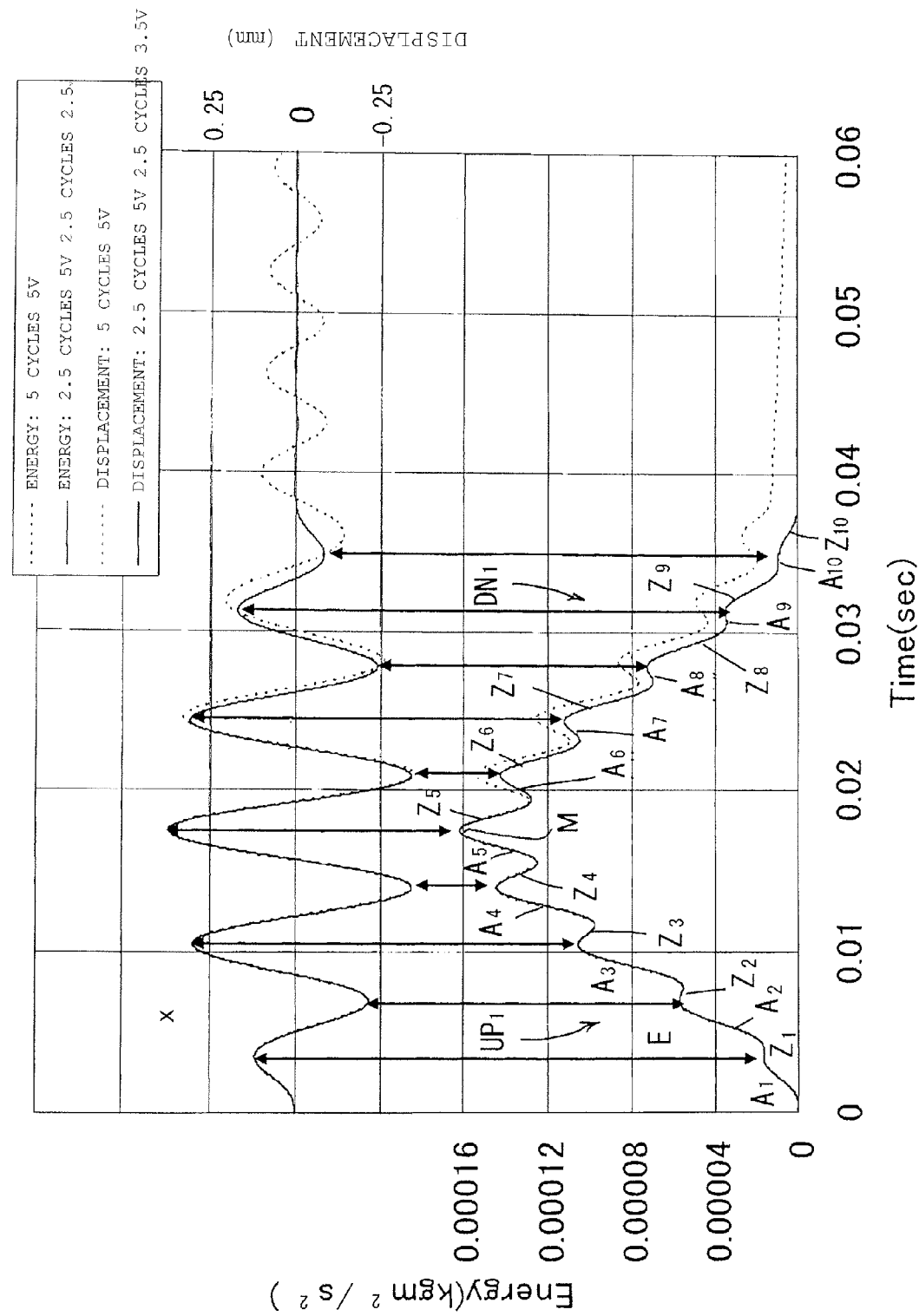
FIG. 14 is a graph showing curves of the trends in a displacement "x" of a mechanical vibrator and a total energy E of the mechanical vibrator in the cases of a 5-cycle drive of an amplitude 5V and amplitudes 5V and 3.5V by a drive voltage V(t) of a frequency "f" of 130.83 Hz in the same vibration generating apparatus.

The broken lines of FIG. 14 show the curves of the trends of the displacement "x" of the mechanical vibrator 3 and the total energy E in the case of a 5-cycle drive of an amplitude 5V by a drive voltage V(t) of a frequency "f" of 130.83 Hz, while the solid lines of FIG. 14 show the curve of the trend of the displacement "x" of the mechanical vibrator 3 and the total energy E in the case of a 2.5-cycle drive of an amplitude 5V by a drive voltage V(t) of a frequency "f" of 130.83 Hz then a 2.5-cycle drive of an amplitude 3.5V. Note that, the natural frequency ($f_d \approx f_o$) is 157 Hz. As clear from FIG. 14, the peak ($dx/dt=0$) of the vibration displacement "x" and the maxima of the total energy E ($dE/dt=0$, $d^2E/dt^2<0$) correspond. In the end period of the latter 2.5 cycles, a difference is seen between the amplitude 5V and the amplitude 3.5V. If the amplitude of the drive voltage V(t) at an excitation period A at the damping dominant period $DN_1$ is large, the excitation action is strong, so the displacement "x" ends up being increased. If viewing the displacement at 5V (broken line) and the displacement at 3.5V (solid line) well, the displacement at 3.5V (solid line) is low in voltage value, so the phase becomes somewhat retarded, but the excitation action in the excitation period A can be weakened, so as a result quickly converges to the stopping point.

(Bipolar Square Wave Continuous Drive System)

Figure 15:
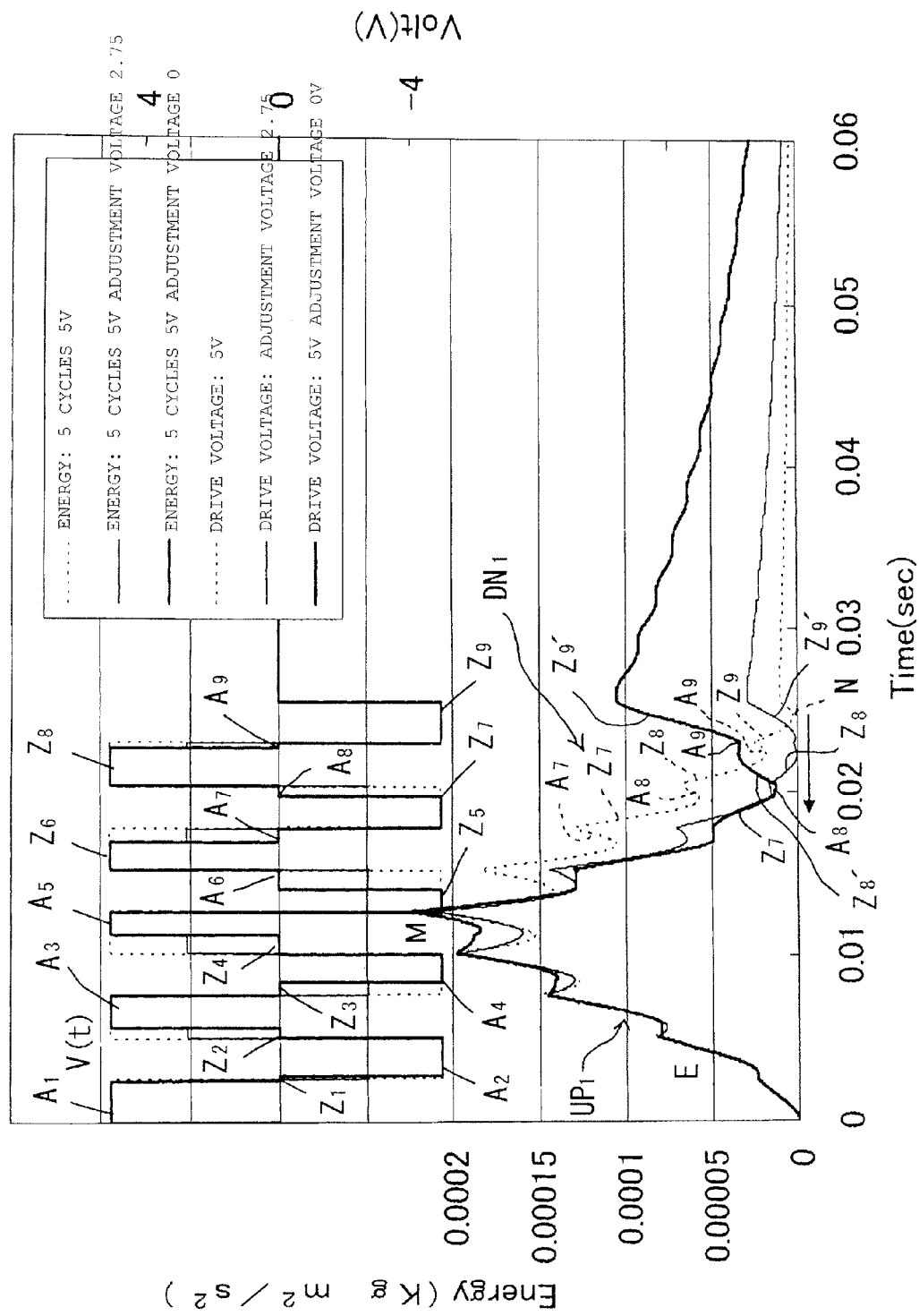
FIG. 15 is a graph showing curves of the trends in the total energy E of a mechanical vibrator in the case of a 5-cycle drive of a square wave of an amplitude 5V by a drive voltage V(t) of a frequency "f" of 196.25 Hz and including also in the case of selective drive by an adjustment voltage of 2.75V or 0V in the same vibration generating apparatus.
Figure 16:
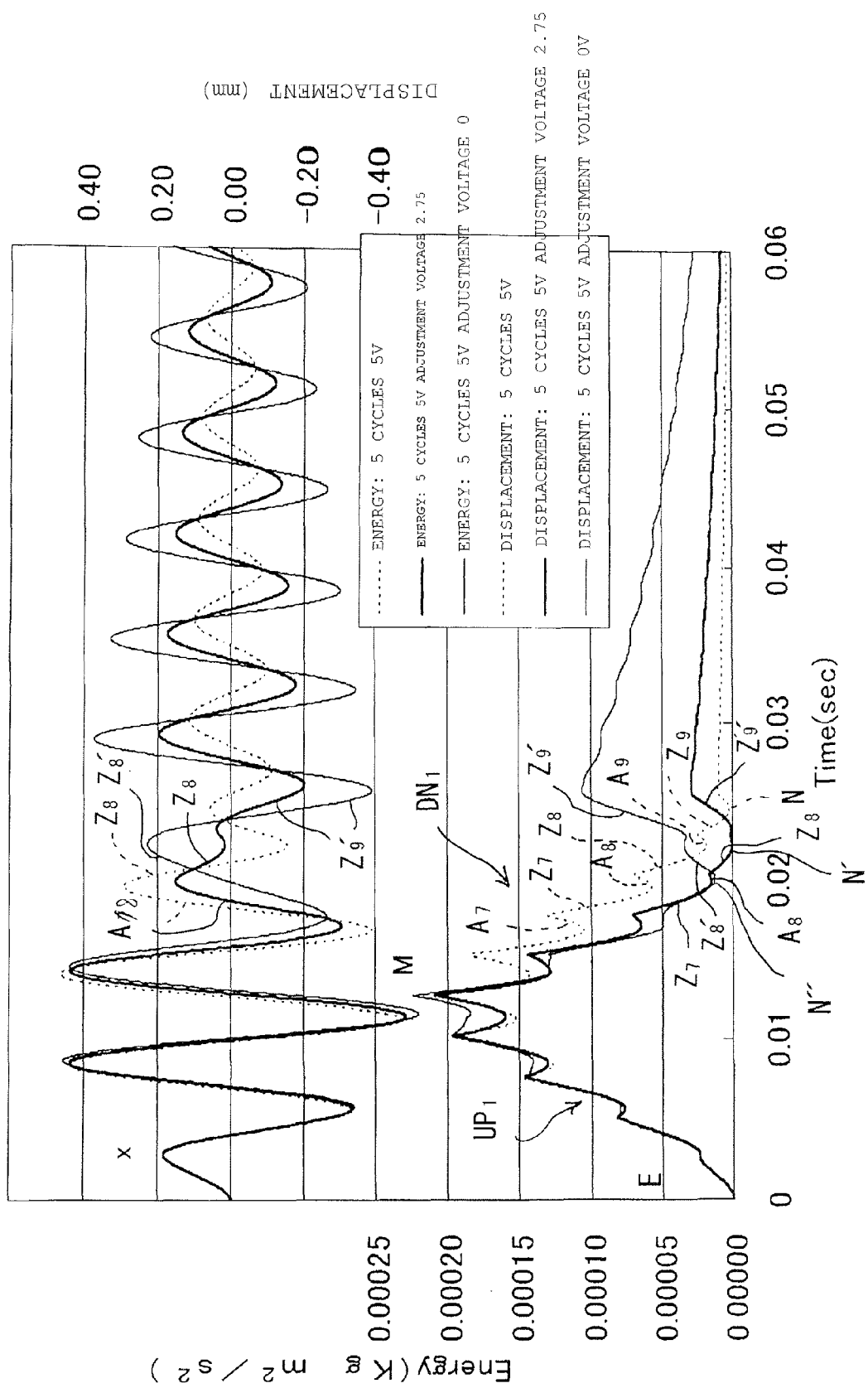
FIG. 16 is a graph showing curves of the trends in a displacement "x" and the total energy E of a mechanical vibrator in the case of a 5-cycle drive of a square wave of an amplitude 5V by a drive voltage V(t) of a frequency "f" of 196.25 Hz including also in the case of selective drive by an adjustment voltage of 2.75V or 0V in the same vibration generating apparatus.

The broken lines of FIG. 15 show curves of the trends in the total energy E of a mechanical vibrator in the case of a 5-cycle drive system of a bipolar square wave of an amplitude 5V by a drive voltage V(t) of a frequency "f" of 196.25 Hz, the fine lines of FIG. 15 show curves of the trends in the total energy E of a mechanical vibrator in the case of selective drive by the adjustment voltage 2.75V for example the period of a damping period Z of the excitation dominant period $UP_1$ and an excitation period A of the damping dominant period $DN_1$ in the above drive system, and the bold lines of FIG. 15 show curves of the trends in the total energy E of a mechanical vibrator in the case of selective drive by the adjustment voltage 0V for example the period of the damping period Z of the excitation dominant period $UP_1$ and the excitation period A of the damping dominant period $DN_1$ in the above drive system. Further, the broken lines of FIG. 16 show the curves of the trends in the displacement "x" and total energy E in a 5-cycle drive system of an alternating square wave of an amplitude 5V by a drive voltage V(t) of a frequency "f" of 196.25 Hz, the bold lines of FIG. 16 show the curves of the trends in the displacement "x" and total energy E in the case of selective drive by an adjustment voltage of 2.75V for exactly a period of the damping period Z of the excitation dominant period $UP_1$ and the excitation period A of the damping dominant period $DN_1$ in the above drive system, and the fine lines of FIG. 16 show the curves of the trends in the displacement "x" and the total energy E in the case of selective drive by an adjustment voltage of 0V for exactly a period of the damping period Z of the excitation dominant period $UP_1$ and an excitation period A of the damping dominant period $DN_1$ in the above drive system.

The drive voltage V(t) of FIG. 15 is not a bipolar sine wave like in FIG. 8, but a bipolar square wave, so the broken line of the total energy E of FIG. 15 falls in smoothness near the extreme value compared with the broken line of FIG. 9 and becomes a bent line. The selective drive of the adjustment voltage 2.75V or 0V in the period forming the damping period Z of the excitation dominant period $UP_1$ and the excitation period A of the damping dominant period $DN_1$ performs control to apply these to the damping periods $Z_1$ to $Z_4$ and excitation periods $A_6$ to $A_9$ instead of 5V in the amplitude 5V square wave drive system, so as shown in FIG. 16, compared with the time of the broken line, a delay in phase cumulatively appears in the displacement. At the damping periods $Z_1$ to $Z_4$ of the excitation dominant period $UP_1$, the damping force weakens, so compared with the time of the broken line, the phase of the displacement "x" becomes retarded. Further, in the excitation periods $A_6$ to $A_9$ of the damping dominant period $DN_1$, the excitation force weakens, so compared with the time of the broken line, again the phase of the displacement "x" becomes retarded. With the adjustment voltage 2.75V, in the damping period $Z_8$, the voltage is high and the damping action is too strong compared with the fine vibration, so before the displacement "x" returns to the displacement origin, excitation occurs in the opposite direction, the phase is further retarded, and basically the period becoming the damping period $Z_9$ becomes the excitation period $Z'_9$. At the damping period $Z_8$, there is a velocity zero point near the displacement origin, so it is desirable to stop the drive here. The minima N in the case of the broken line is present in the damping period $Z_9$. With the adjustment voltage 2.75V, the minima N' appears early in the damping period $Z_8$. With the adjustment voltage 0V, the result becomes natural damping (free run), so the phase of the displacement "x" is further retarded from the time of the adjustment voltage 2.75V. For this reason, in the past, the periods forming the damping periods $Z_8$, $Z_9$ become the excitation periods $Z_8'$ $Z_9'$. Therefore, the minima N" appears at the excitation period $A_8$ even earlier than the time of the adjustment voltage 2.75V. The magnitude of the size of the minima is N≈<N'<N". N" has to wait for some natural damping until entering the insensitive zone, but N and N' are in the insensitive zone.

(Biased Acceleration Generation Drive System)

In the above bipolar drive system, as shown in FIG. 8, FIG. 11, FIG. 12, FIG. 14, and FIG. 16, the displacement "x" crosses the displacement origin, alternately swings between positive and negative, and draws a continuous wave with alternates by 1 cycle or more, so for example, as shown in FIG. 10, the peak of acceleration alternately appears in both the positive and negative directions of the reciprocating amplitude and is sensed as one beat in the pushing and pulling directions. That is, acceleration pushing in one direction and acceleration pulling in the opposite direction form a pair resulting in bidirectional acceleration vibration. As opposed to this, the method of utilizing the beat vibration phenomenon in the transition state of damping system non-resonance type forced vibration so as to generate a unipolar waveform with a perceptive nature by a strong acceleration in one direction and weak acceleration in other directions.

As an extreme example of the beat vibration of the equation (5), when the beat period $T_B=1/|f_d-f|$ and the period $/1;2$ $(f_d+f)$ of the basic wave are equal, there are the following two cases:

if $f_d<f$, $f=3f_d$
if $f<f_d$, $f=f_d/3$

The drive is stopped at the valley point of the second valley of the beat wave in the same way as above.

Figure 17A:
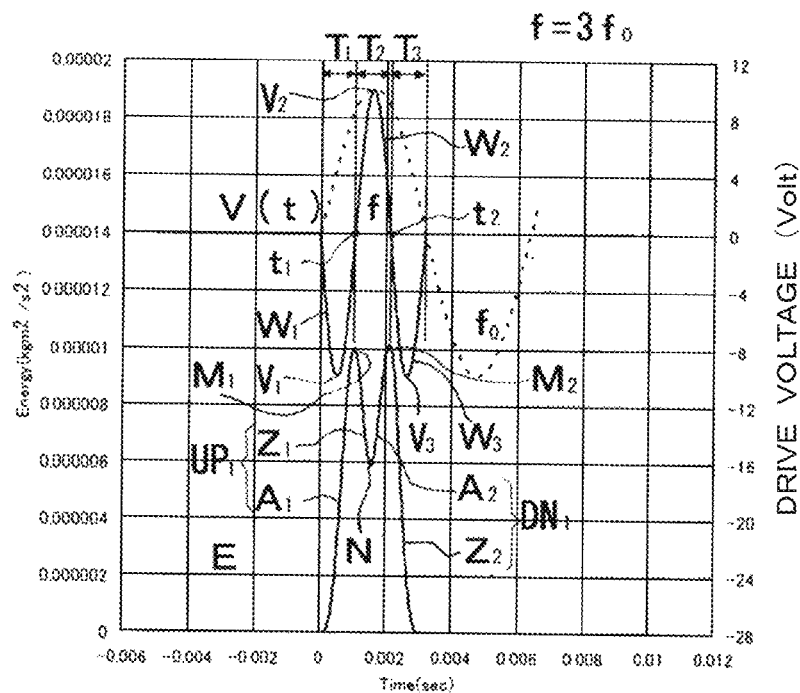
Figure 17B:
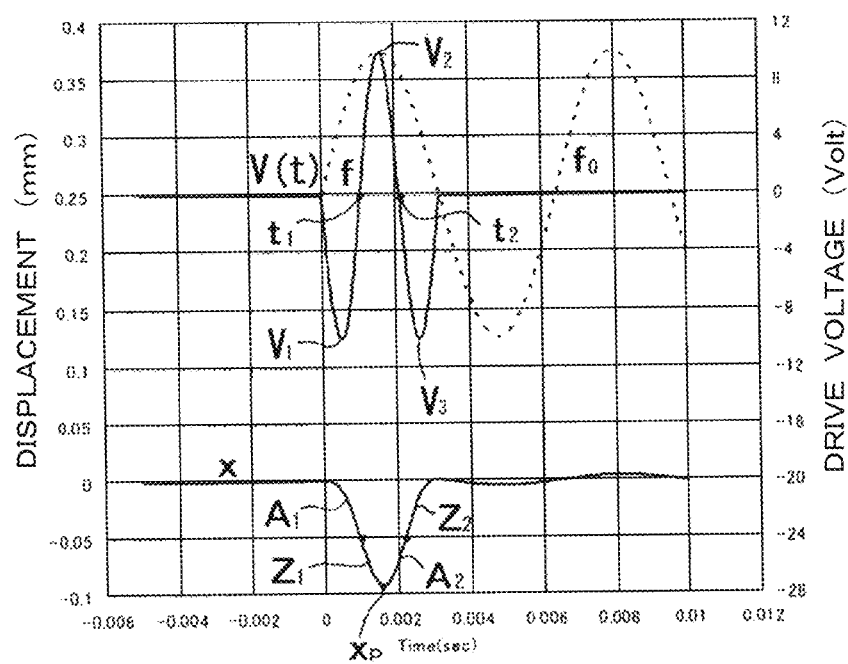
FIG. 17B is a graph showing the trend in the displacement "x" for this 1.5-cycle drive.

Now, using as an example the case of $f=3f_d\approx3f_o$, FIG. 17A shows the trend in the total energy E with respect to a 1.5-cycle drive of a drive voltage V(t) of 471 Hz, while FIG. 17B shows the unipolar waveform of the trend of the displacement "x" with respect to the above drive. The 471 Hz drive voltage V(t) corresponds to the case of a number of cycles of 1.5 of Table 1. The forced vibration frequency "f"=471 Hz is a non-resonant frequency of 3 times the natural frequency $f_o$=157 Hz or extremely fast. The 1.5-cycle waveform of this drive voltage V(t) is an alternating wave (bipolar pulse) comprised of a negative polarity first sine half wave $W_1$, a positive polarity second sine half wave $W_2$, and a negative polarity third sine half wave $W_3$ (bipolar pulse). The waveheight values $V_1$ to $V_3$ are all absolute values of 10V. The first half cycle $T_1$, second half cycle $T_2$, and third half cycle $T_3$ are 471 Hz half cycles (½f) and equal. The curve of the total energy E is comprised of the first excitation period $A_1$, first damping period $Z_1$, second excitation period $A_2$, and second excitation period $Z_2$, the first maxima $M_1$ and the second maxima $M_2$ correspond to the point of time of the zero point of the drive voltage V(t) (cross point ($t_1$, $t_2$)), and the minima N corresponds to the point of time of the waveheight value $V_2$ of the second sine half wave $W_2$ or the point of time of the turning point of the displacement "x" (peak ($x_p$)). The period up to the end of the first sine half wave $W_1$ is the first excitation period $A_1$, the period up to the waveheight value $V_2$ of the second sine half wave $W_2$ is the first damping period $Z_1$, the period up to the end of the second sine half wave $W_2$ is the second excitation period $A_2$, and the period up to the end of the third sine half wave $W_3$ is the second damping period $Z_2$. This can be expressed as the center peak recessed mode <$A_1|Z_1·A_2|Z_2$>. The first excitation dominant period $UP_1$ is comprised of the first excitation period $A_1$ and first damping period $Z_1$, and the first damping dominant period $DN_1$ is comprised of the second excitation period $A_2$ and second damping period $Z_2$. This is the simplest beat vibration of the "damping turning".

Figure 18A:
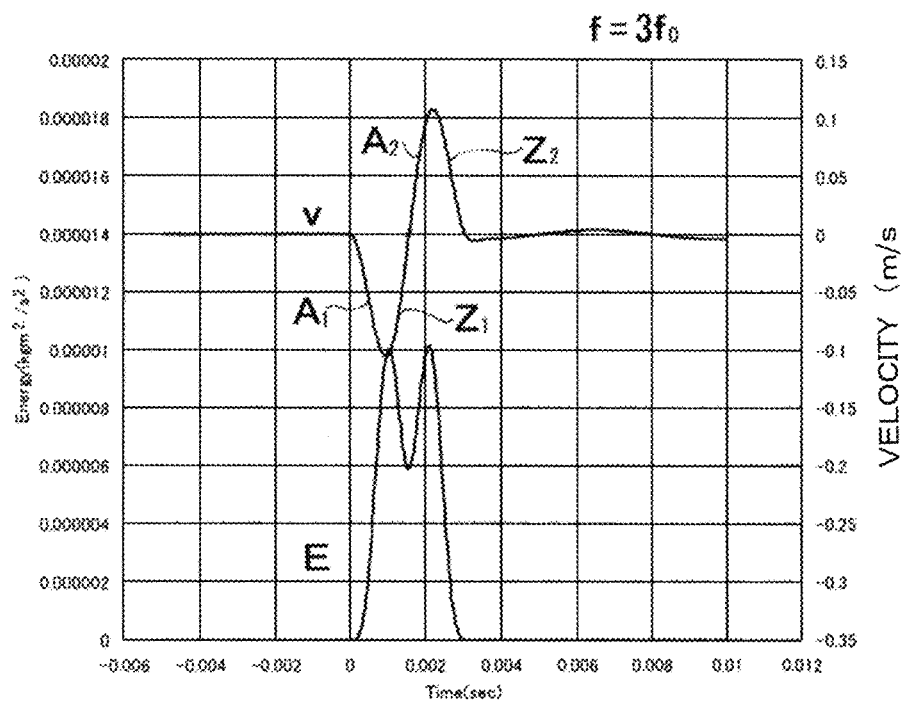
Figure 18B:
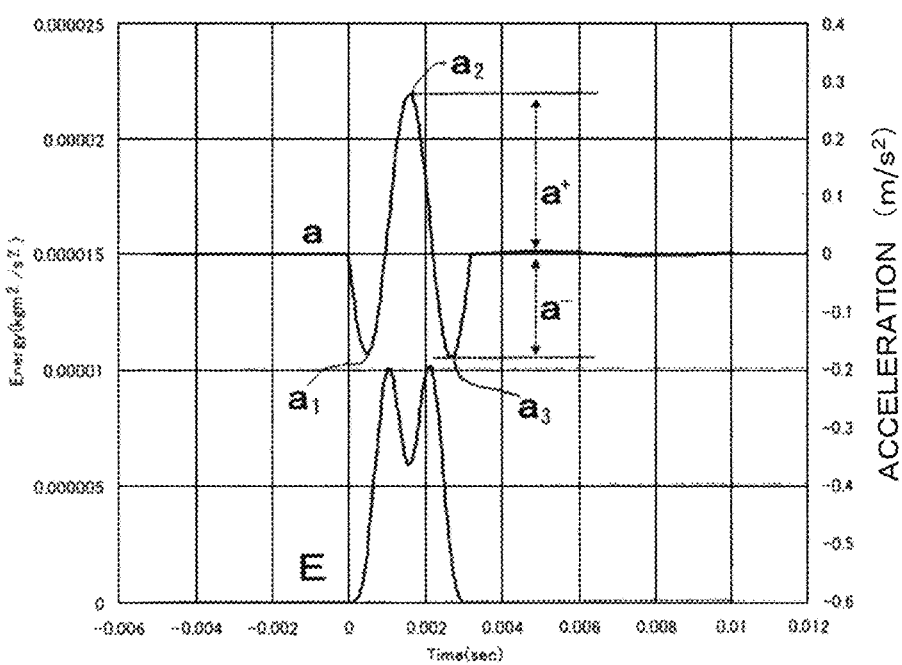
FIG. 18B is a graph showing the trends in the acceleration "a" and the total energy E for this drive.

FIG. 18A shows the trends in the velocity "v" and total energy E with respect to 1.5-cycle drive of the drive voltage V(t) of 471 Hz, while FIG. 18B shows the trends in the acceleration "a" and total energy E with respect to the above drive. The first peak $a_1$ of the acceleration "a" corresponds to the waveheight value $V_1$ of the first sine half wave $W_1$, the second peak $a_2$ corresponds to the waveheight value $V_2$ of the second sine half wave $W_2$, and the third peak $a_3$ corresponds to the waveheight value $V_3$ of the third sine half wave $W_3$. The first peak $a_1$ and the third peak $a_3$ appear at opposite directions of the intermediate second peak $a_2$, the acceleration ratio $a^+/a^-=1.54$, and the second peak $a_z$ becomes stronger. At this center peak recessed mode $<A_1|Z_1 \cdot A_2|Z_2>$, at the first excitation period $A_1$, a rising edge part of a unipolar waveform which slowly swings in one direction is formed, at a first damping period $Z_1$, the swing is suppressed from the inflection point corresponding to the first cross point $t_1$ to form a rising peak, the swing returns in the other direction at the second excitation period $A_2$ after the turning point $x_p$ to form a trailing peak, and the swing is suppressed from the inflection point corresponding to the second cross point $t_2$ at the second damping period $Z_2$ to form a trailing edge and returns to the displacement origin. Here, to compress the first peak $a_1$ and the third peak $a_3$ and expand the second peak $a_2$, it is sufficient to set the drive voltage V(t) so as to satisfy the conditions:

$$V_1, V_3 < V_2 \text{ and/or } T_2 < T_1, T_3 \qquad (17)$$

Figure 19A:
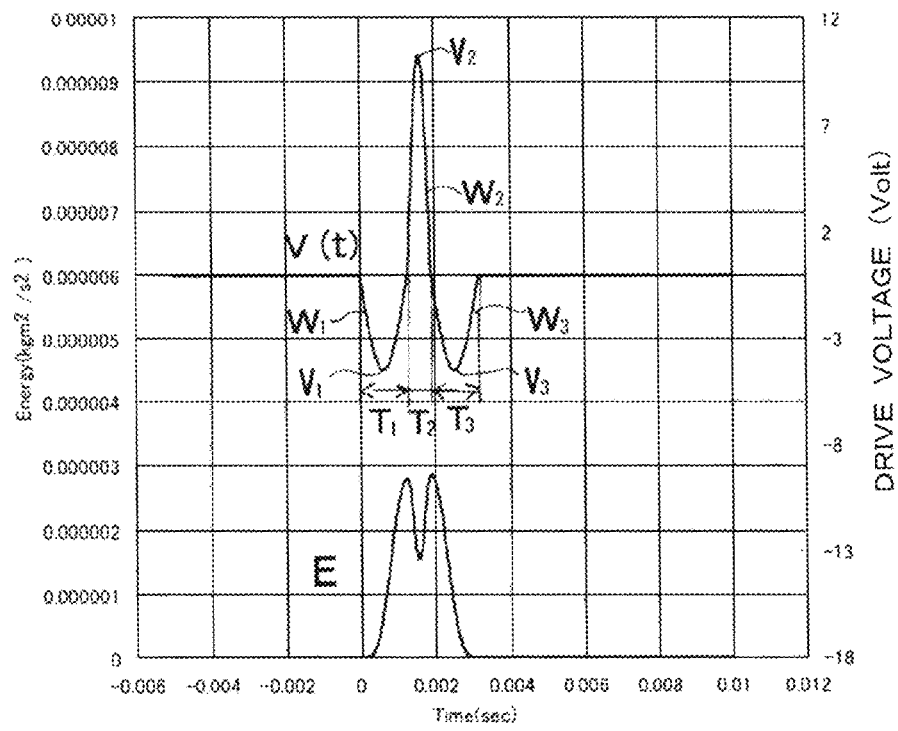
Figure 19B:
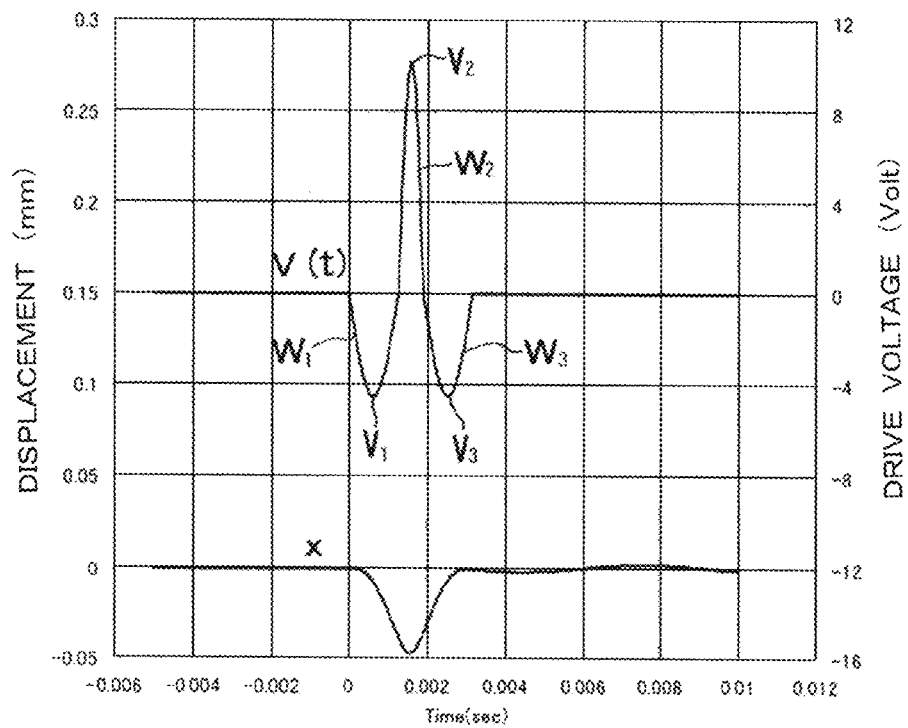
FIG. 19B is a graph showing a half wave of the trend in displacement "x" for this deformed wave.

As an example of the case of $f=3f_d \approx 3f_o$, FIG. 19A shows the trend in the total energy E with respect to a 1.5-cycle deformed wave of the drive voltage V(t), while FIG. 19B shows the trend in the displacement "x" with respect to this 1.5-cycle deformed wave, that is, a unipolar waveform. In this 1.5-cycle deformed wave, the waveheight value $V_2$ of the second sine half wave $W_2$ remains 10V, and the waveheight value $V_1$ of the first sine half wave $W_1$ and the waveheight value $V_3$ of the third sine half wave $W_3$ are lowered to 4.5V. If making "f" 471 Hz, the first half cycle $T_1$ of the first sine half wave $W_1$:second half cycle $T_2$ of the second sine half wave $W_2$:third half cycle $T_3$ of the third sine half wave $W_3=3/5f:3/10f:3/5f=2:1:2$, the frequency of the first sine half wave $W_1$ and the third sine half wave $W_3$ corresponds to 392.5 Hz, and the frequency of the second sine half wave $W_2$ corresponds to 785 Hz.

Figure 20A:
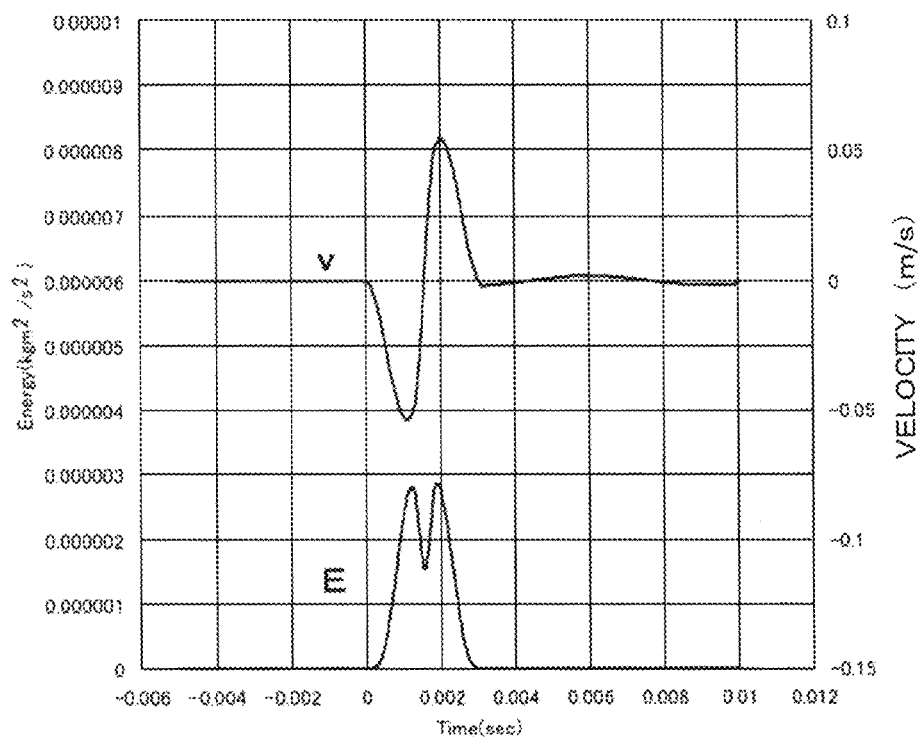
Figure 20B:
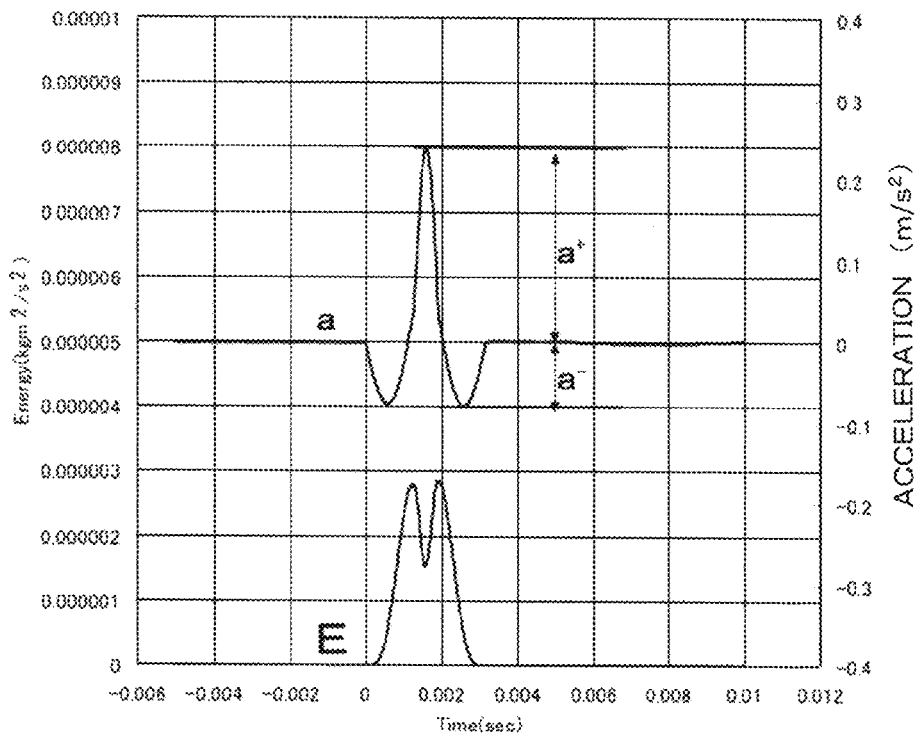
FIG. 20B is a graph showing the trends in the acceleration "a" and the total energy E for this deformed wave of 1.5 cycles.

FIG. 20A shows the trends in the velocity "v" and the total energy E with respect to the above 1.5-cycle deformed wave of the drive voltage V(t), while FIG. 20B shows the trends in the acceleration "a" and the total energy E with respect to the 1.5-cycle deformed wave. The acceleration ratio $a^+/a^-$ becomes 3.16 or an acceleration ratio of 2 times the case of FIG. 18B and can be sufficiently detected as one-directional acceleration vibration. The voltage ratio is increased about 2-fold and the frequency ratio is increased 2-fold, so the acceleration ratio becomes about a ½ power of the product of the voltage ratio and frequency ratio. Note that if intermittently generating this 1.5-cycle deformed wave several times, each time the above one-directional acceleration appears.

Figure 21A:
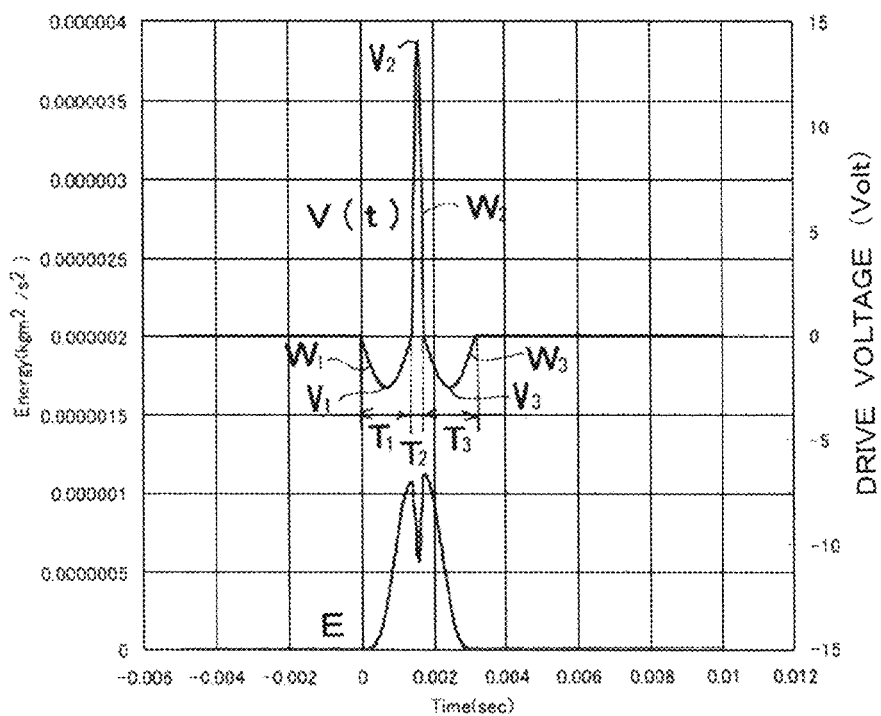
Figure 21B:
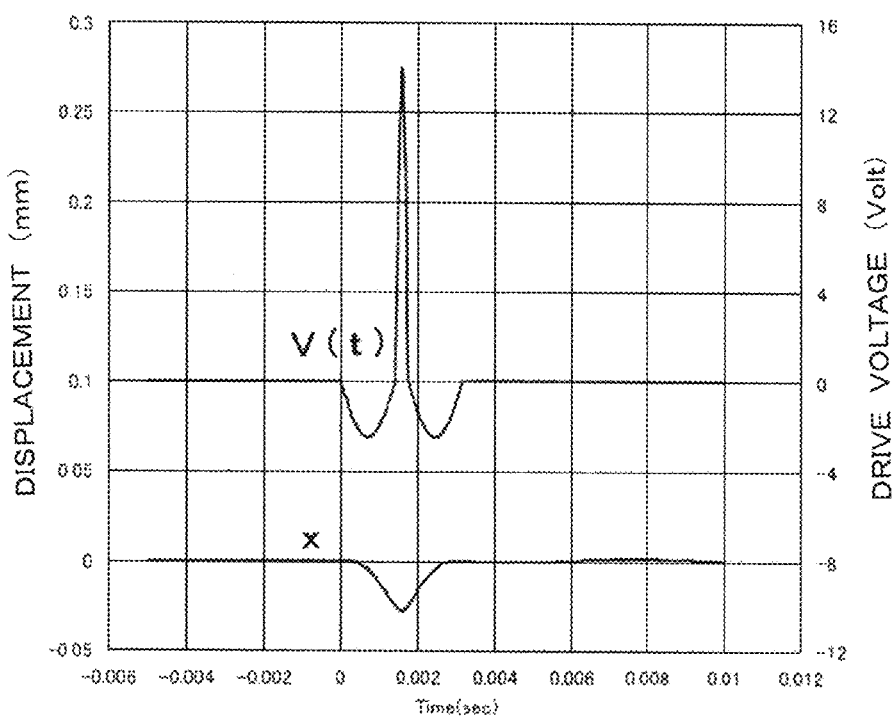
FIG. 21B is a graph showing a half wave of the trend in the displacement "x" for this other 1.5-cycle deformed wave.

As an example of the case where $f=3f_d \approx 3f_o$, FIG. 21A shows the trend in the total energy E with respect to another 1.5-cycle deformed wave of the drive voltage V(t), while FIG. 21B shows a unipolar waveform showing the trend of the displacement "x" with respect to this other 1.5-cycle deformed wave. In this other 1.5-cycle deformed wave, the waveheight value $V_2$ of the second sine half wave $W_2$ is a high 14V, and the waveheight value $V_1$ of the first sine half wave $W_1$ and the waveheight value $V_3$ of the third sine half wave $W_3$ are low 3V. If making "f" 471 Hz, the ratio of the first half cycle $T_1$ of the first sine half wave the second half cycle $T_2$ of the second sine half wave $W_2$:the third half cycle $T_3$ of the third sine half wave $W_3=27/40f:3/20f:27/40f=9:2:9$, the frequency of the first sine half wave $W_1$ and the third sine half wave $W_3$ corresponds to 348.8 Hz, and the frequency of the second sine half wave $W_2$ corresponds to 1570 Hz.

Figure 22A:
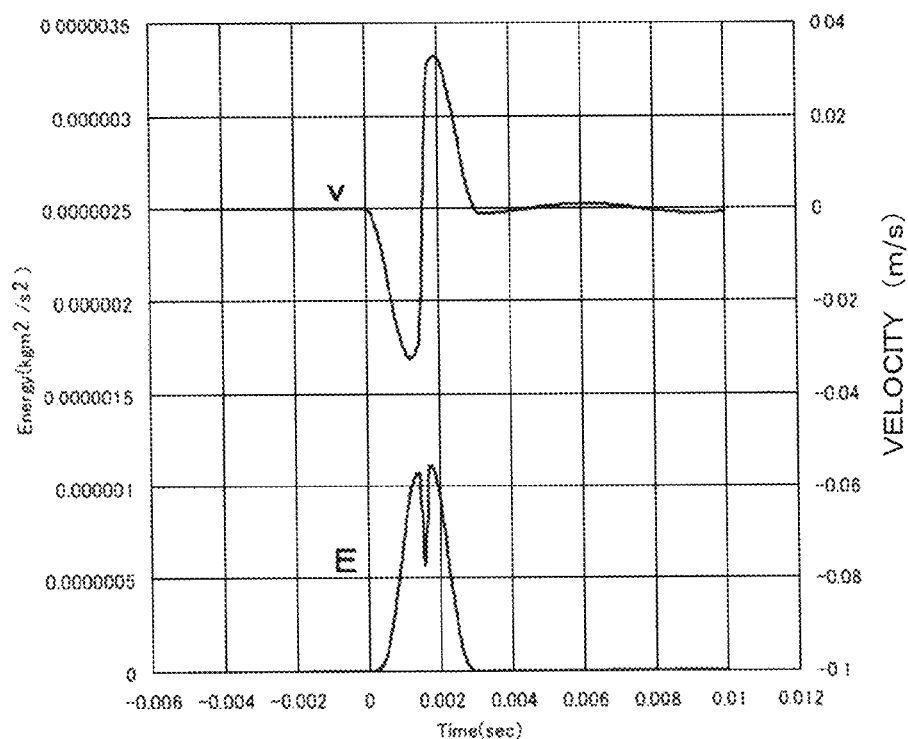
Figure 22B:
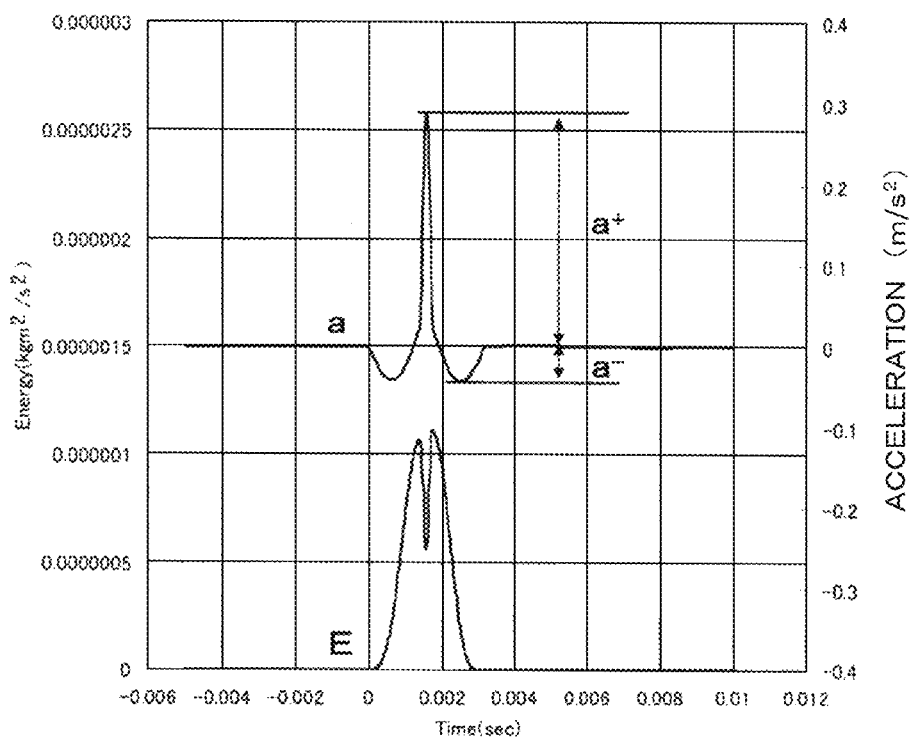
FIG. 22B is a graph showing the trends in the acceleration "a" and the total energy E for this other 1.5-cycle deformed wave.

FIG. 22A shows the trends in the velocity "v" and the total energy E with respect to another 1.5-cycle deformed wave of the drive voltage V(t), while FIG. 22B shows the trends in the acceleration "a" and total energy E with respect to this other 1.5-cycle deformed wave. The acceleration ratio $a^+/a^-$ becomes 6.63 or an acceleration voltage of about 4 times the case of FIG. 18B and can be sufficiently detected as one-directional acceleration vibration. Note that the voltage ratio is increased about 4-fold and the frequency ratio is increased 4-fold, so the acceleration ratio becomes about a ½ power of the product of the voltage ratio and frequency ratio. Note that if intermittently generating this 1.5-cycle deformed wave several times, each time the above one-directional acceleration appears.

Figure 23A:
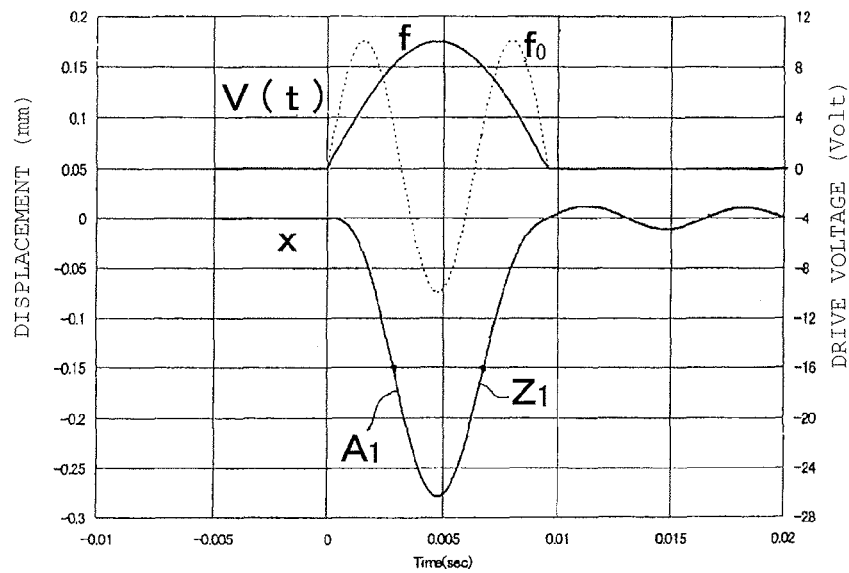
Figure 23B:
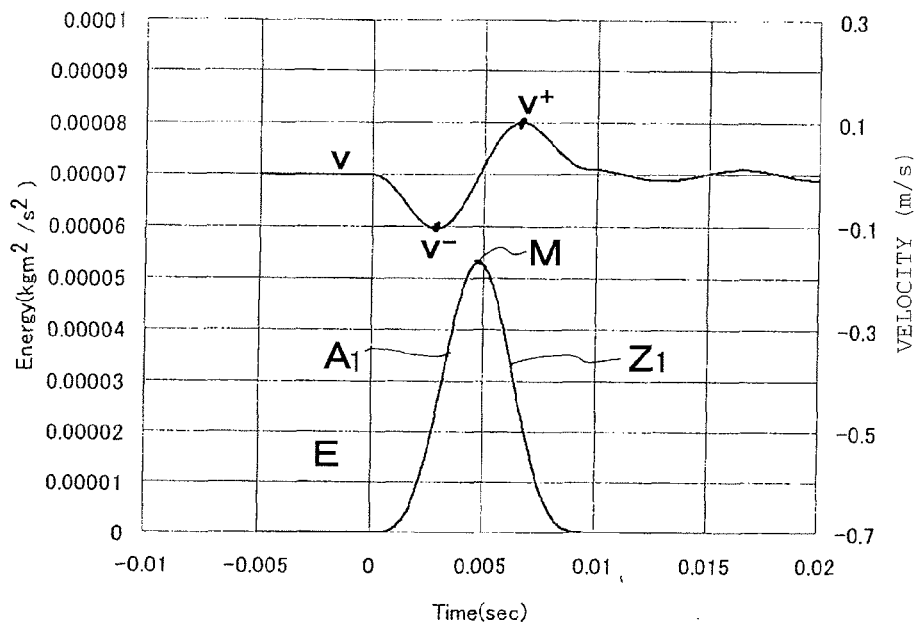
FIG. 23B is a graph showing the velocity "v" and the total energy E for this 0.5-cycle waveform.
Figure 24:
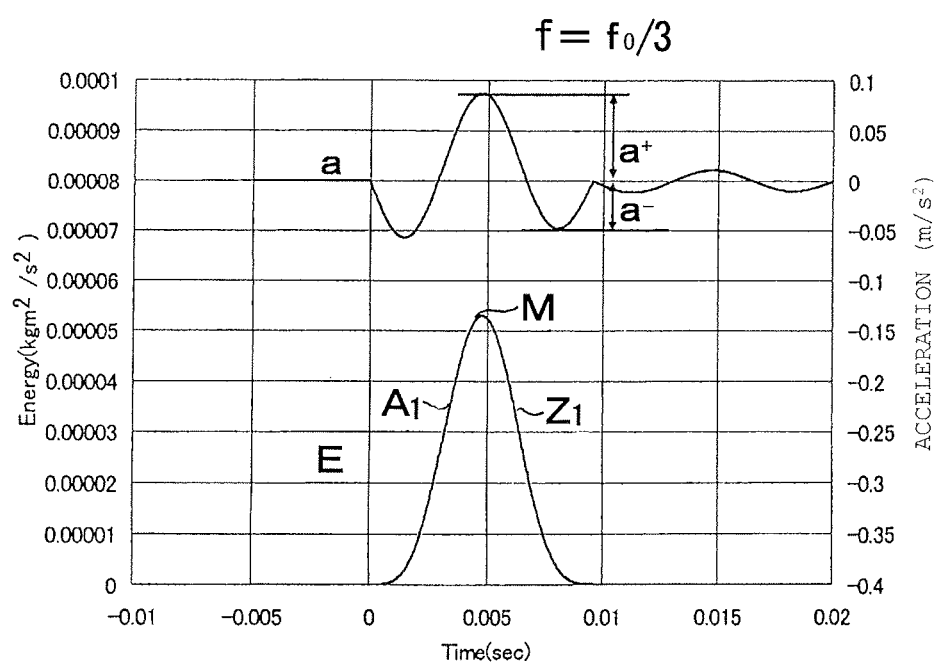
FIG. 24 is a graph showing the acceleration "a" and total energy E for the same 0.5-cycle waveform.

Next, as an example of the case where $f=f_d/3=f_o/3$, FIG. 23A shows the trend in displacement "x" for a 0.5-cycle deformed wave of the drive voltage V(t), while FIG. 23B shows the velocity "v" and total energy with respect to this 0.5-cycle sine waveform. FIG. 24 shows the acceleration "a" and total energy E with respect to this 0.5-cycle sine waveform. The forced vibration frequency "f"=52.33 Hz is a nonresonant frequency of ⅓ of the natural frequency $f_o$=157 Hz and extremely slow. In the case of FIG. 17, f and $f_o$ are reversed in relationship (conjugate relationship). The curve of the total energy E is comprised of a center peak projecting mode $<A_1 \cdot Z_1>$ comprised of the first excitation period $A_1$ and first damping period $Z_1$. The first excitation period $A_1$ alone forms the excitation dominant period, further, the first damping period $Z_1$ alone forms the damping dominant period. This is the simplest beat vibration of the "excitation turning". The only maxima M corresponds to the point of time of the turning point of the displacement "x". In the first half of the rise of the drive voltage V(t), the velocity "v" increases in the negative direction and reaches the first peak $v^-$ at a phase of about 60 degrees from the rising edge. At the latter half of the rising edge of the drive voltage V(t), the velocity "v" decelerates and returns to zero at the phase of 90 degrees from the rising edge. At the first half of the trailing edge of the drive voltage V(t), the velocity "v" increases in the positive direction and reaches the second peak $v^+$ at a phase of about 60 degrees from the trailing edge. At the latter half of the trailing edge of the drive voltage V(t), the velocity "v" decelerates and returns to zero at the phase of 90 degrees from the trailing edge. Until the first peak "v" and until the velocity zero from the second peak $v^+$, peaks appear in the negative direction of the acceleration "a" and a peak of a positive direction of the acceleration "a" from the first peak $v^-$ to the second peak $v^+$. The acceleration ratio $a^+/a^-$ is 1.620. Strong acceleration can be obtained in one direction in the same way as the case of FIG. 18. However, in this example, even after the point of time of completion of 0.5 cycle passes, the displacement "x" vibrates by natural damping. Further, the velocity "v" and acceleration "a" also vibrate. The period from the point of time of ¼ cycle of the drive voltage V(t) becomes the damping period $Z_1$, but around the end of this damping period $Z_1$, the displacement "x" becomes small. Despite this, the value of the drive voltage V(t) is high, so right before the completion of the 0.5 cycle, the next excitation period ends up being entered and the displacement origin is overshot somewhat.

Figure 25A:
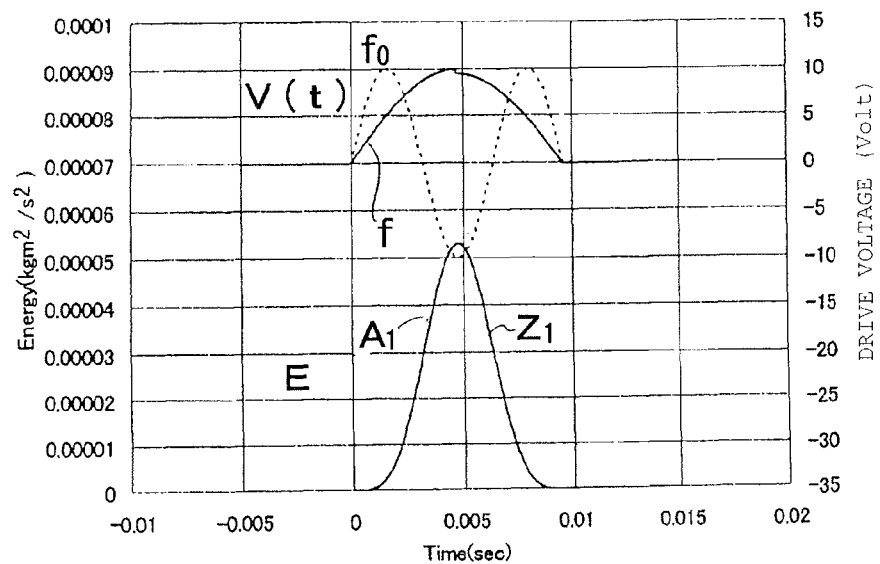
Figure 25B:
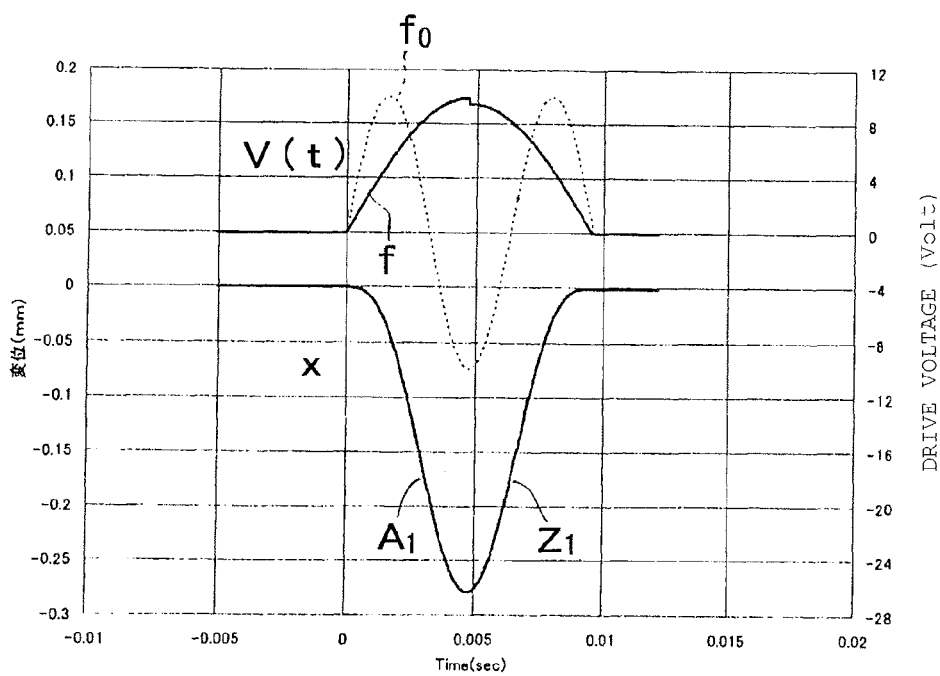
FIG. 25B is a graph showing this 0.5-cycle deformed wave and the trend in the displacement "x" with respect to this waveform.
Figure 26A:
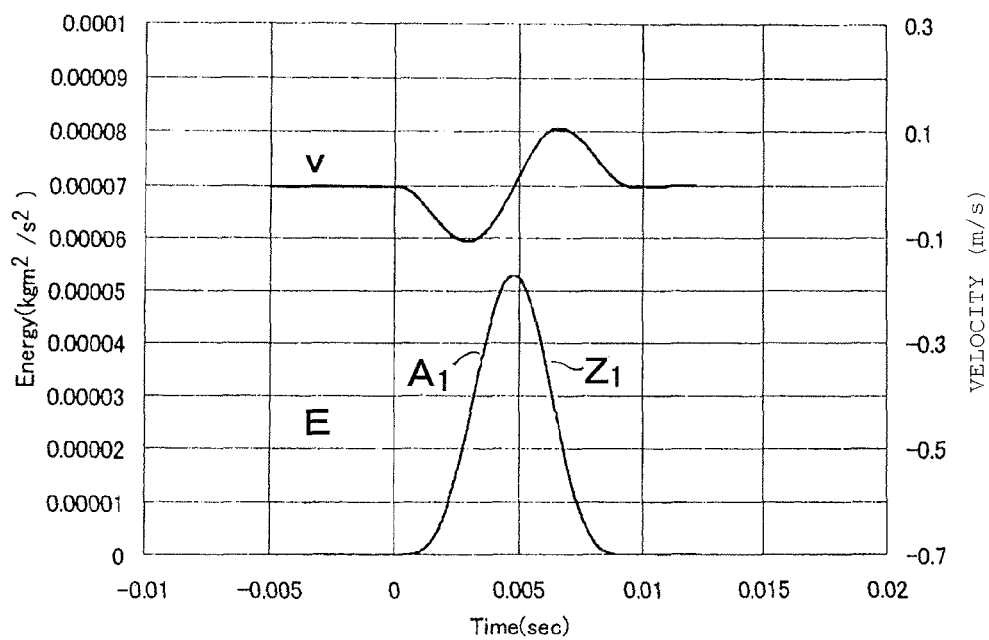
Figure 26B:
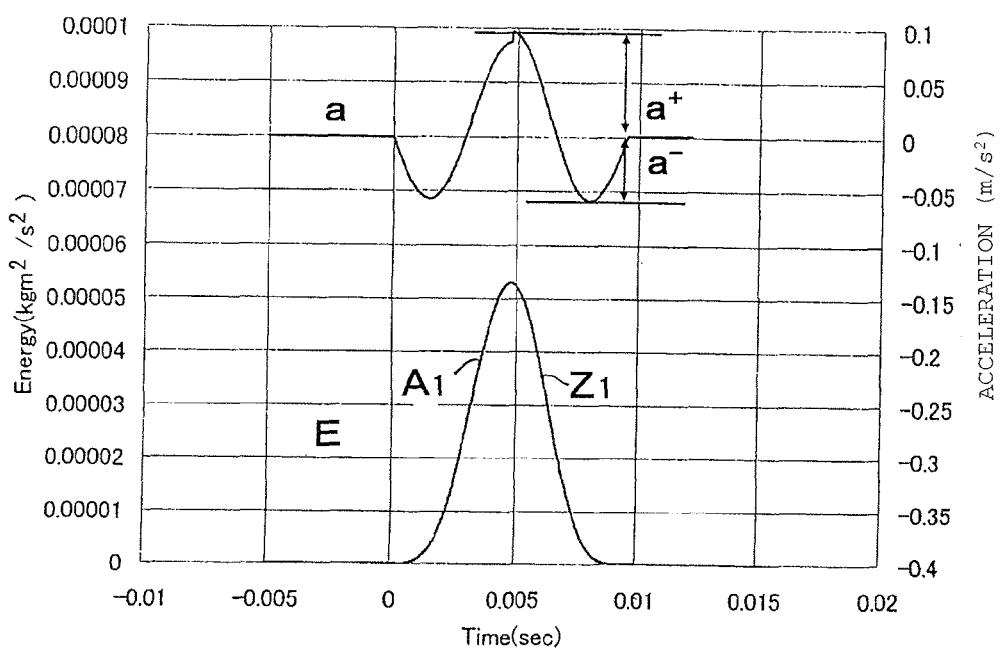
FIG. 26B is a graph showing the trends in the acceleration "a" and the total energy E for this 0.5-cycle deformed wave.

FIG. 25A shows the 0.5-cycle sine deformed wave of the drive voltage V(t) and the trend in the total energy E with respect to this waveform, while FIG. 25B shows the 0.5-cycle sine deformed wave and the displacement "x" with respect to this waveform. Further, FIG. 26A shows the trends in the velocity v and the total energy E with respect to the 0.5-cycle sine deformed wave of the drive voltage V(t), while FIG. 26B shows the trends in the acceleration "a" and the total energy E with respect to this 0.5-cycle sine deformed wave. In the 0.5-cycle sine deformed wave of the drive voltage V(t) of this example, the waveheight value of the rising side of the first excitation period $A_1$ at the phase 90° is 10V, but the waveheight value at the trailing side of the first damping period $Z_1$ at the phase 90° is set exactly 0.5V lower at 9.5V. The damping action in the first damping period $Z_1$ is several percent weaker, so at the time of completion of 0.5 cycle, the displacement "x" and acceleration "a" converge to zero. Further, the acceleration ratio $a^+/a^-$ becomes 1.685.

The drive voltage V(t) is a sine wave of a unipolar waveform, but in general, the drive voltage V(t) may be a unipolar pulse comprised of the front edge of a monotonous increase by the phase difference π/2 and the back edge of a monotonous decrease by the phase difference π/2. By setting the phase difference of the initial rising front edge in the front edge longer than the phase difference of the end rising front edge in the front edge and setting the phase difference of the initial trailing back edge in the back edge shorter than the phase difference of the trailing end back edge in the back edge, the acceleration ratio $a^+/a^-$ can be made higher than 1.685.

(Unipolar Square Wave Continuous Drive System)

Figure 27:
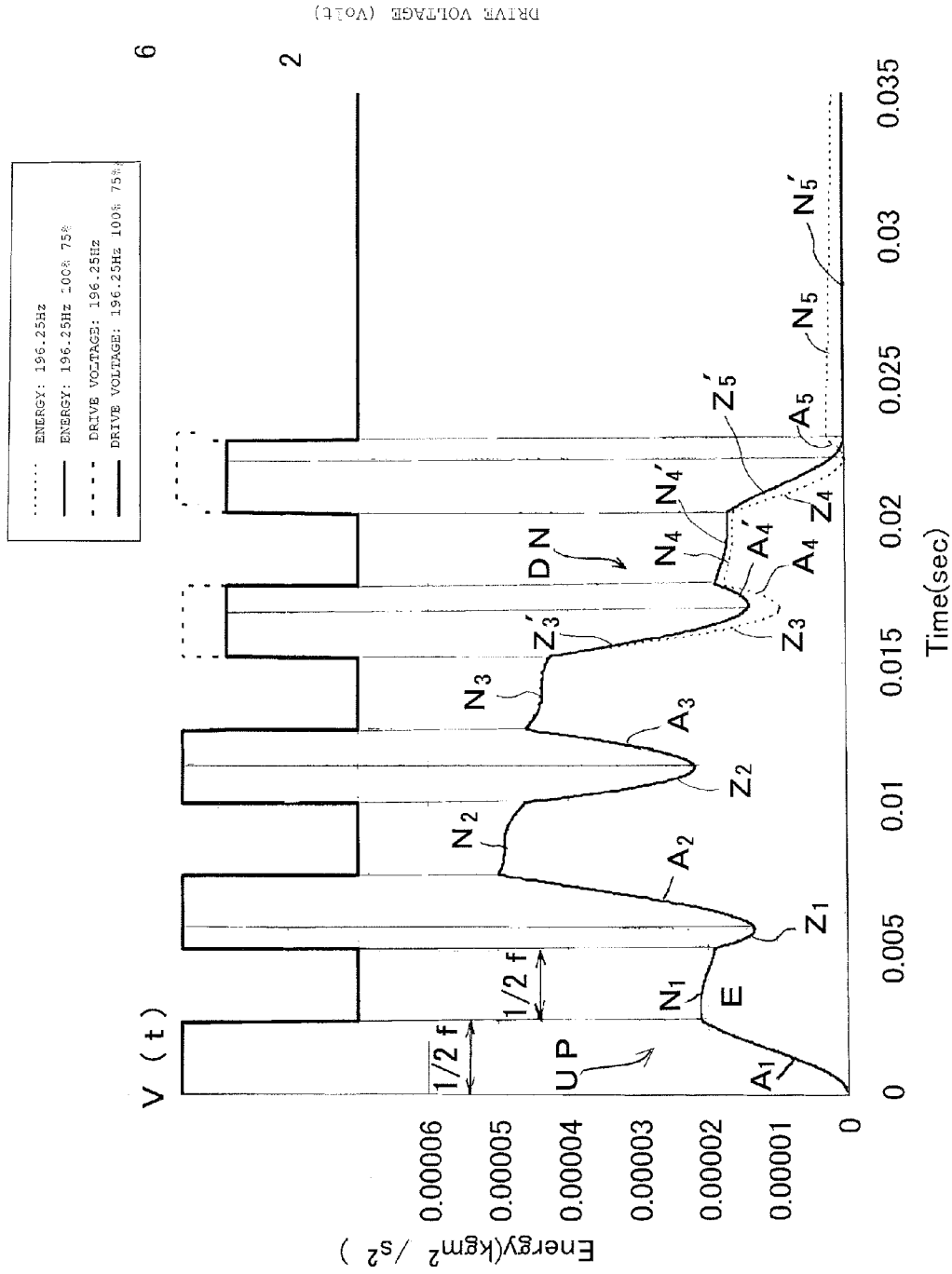
FIG. 27 is a graph showing the case of a 5-cycle drive system of a unipolar square wave of an amplitude 5V and amplitudes 5V and 3.75V by a drive voltage V(t) of a frequency "f" of 196.25 Hz in the same vibration generating apparatus and the trend in the total energy E of the mechanical vibrator 3 in this case.

FIG. 27 shows the case of a 5-cycle drive system of a unipolar square wave of an amplitude 5V by a drive voltage V(t) of a frequency "f" of 196.25 Hz and the curve of the trend of the total energy E of the mechanical vibrator 3 in this case. In particular, for the final 2 cycles in this 5-cycle drive, the trends in amplitude 5V drive and the total energy E shown by the broken lines and the 3.75V amplitude drive of 75% of 5V and the total energy E shown by the solid lines are shown. This drive system is the unipolar square wave with a frequency "f" higher than the natural frequency $f_o$, but the initial amplitude 5V period (half period $/1;2f$) of the drive voltage V(t) is the first excitation period $A_1$, and the next amplitude 0V period (half period ½f) is the first natural damping period $N_1$. At the 2nd cycle amplitude 5V period (half period ½f), after the shortest first damping period $Z_1$, a second excitation period $A_2$ occurs. Before the damping period $Z_1$, the natural damping period $N_1$ of the half period ½f is inserted.

Figure 28:
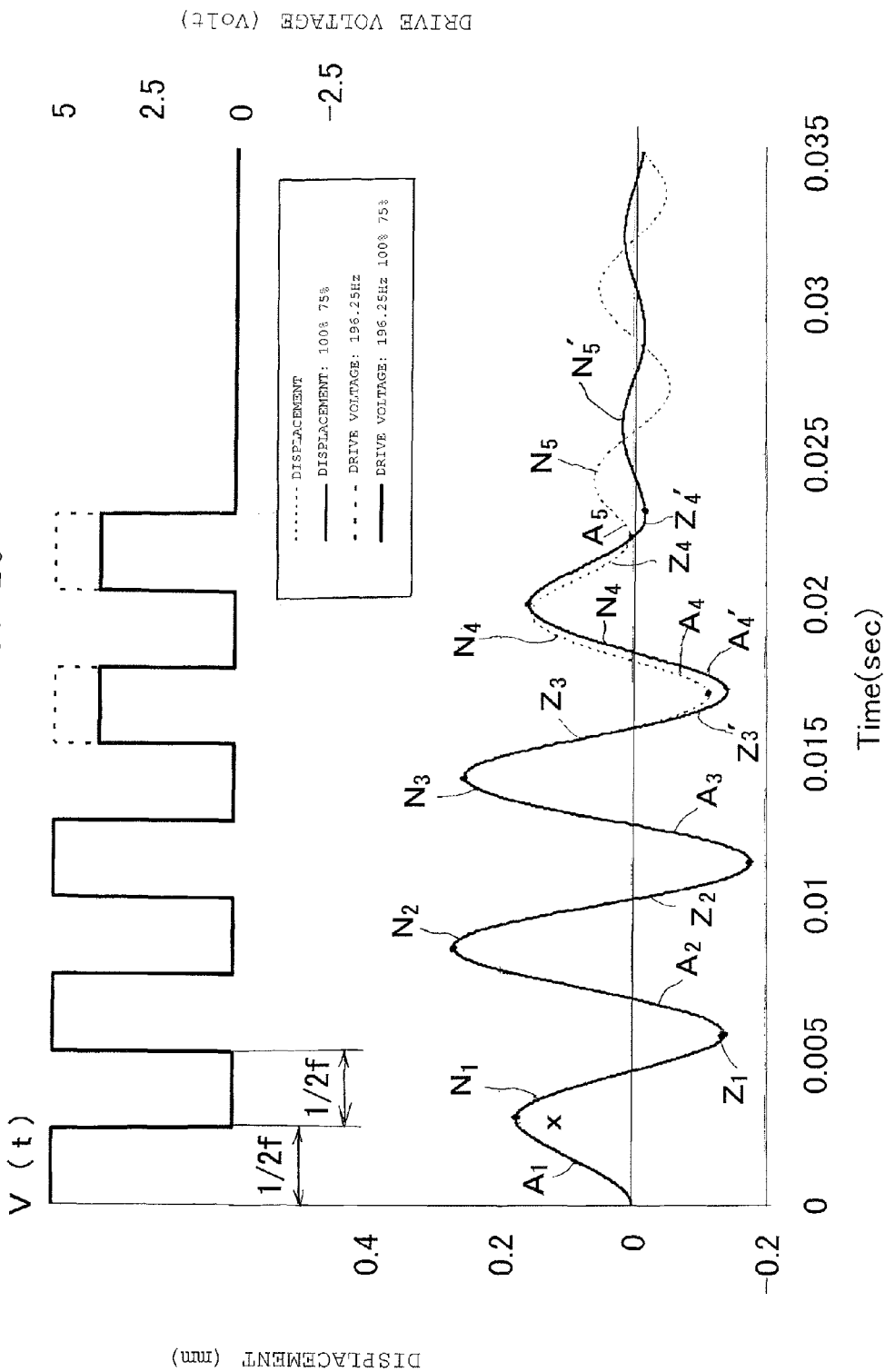
FIG. 28 is a graph showing the case of a 5-cycle drive system of a unipolar square wave of an amplitude 5V and amplitudes 5V and 3.75V by a drive voltage V(t) of a frequency "f" of 196.25 Hz in the same vibration generating apparatus and the trend in the displacement "x" of the mechanical vibrator 3 in this case.

FIG. 28 shows the case of a 5-cycle drive system of a unipolar square wave of an amplitude 5V by a drive voltage V(t) of a frequency "f" of 196.25 Hz and the displacement "x" of the mechanical vibrator 3 in this case. In particular, for the final 2 cycles in this 5-cycle drive, the trends in amplitude 5V drive and the displacement "x" shown by the broken lines and the 3.75V amplitude drive of 75% of 5V and displacement "x" shown by the solid lines are shown. In the first natural damping period $N_1$, the amplitude falls to the amplitude 0V of the drive voltage V(t), the initial turning point of the displacement "x" is passed, then the amplitude rises to the amplitude 5V of the drive voltage V(t). Here, if expressing the rise to the amplitude 0V of the drive voltage V(t) or the rise from the amplitude 0V by "||", the non-resonant forced vibration (beat vibration) of the amplitude 5V of all of the 5 cycles is expressed by the center peak recessed mode $<A_1\|N_1 \cdot N_1\|Z_1 \cdot A_2\|N_2 \cdot N_2\|Z_2 \cdot A_3\|N_3 \cdot N_3\|Z_3 \cdot A_4\|N_4 \cdot N_4\|Z_4 \cdot A_5>$.

Further, the final 2 cycles are the amplitude 3.75V drive and are expressed as ... $\|Z_3' \cdot A_4'\|N_4' \cdot N_4'\|Z_4'>$. Note that, the times of the damping period are $Z_1 < Z_2 < Z_3 < Z_4$, while the times of the excitation period are $A_5 < A_4 < A_3 < A_2 < A_1 = ½f$. The excitation turning and damping turning of the natural damping are alternately repeated, but as the time of completion of 5 cycles is approached, the damping period becomes longer, so the damping action becomes strong and the total energy E becomes near zero. If the final 5th cycle is also an amplitude 5V drive, the damping action in the fourth damping period $Z_4$ is too strong, so turning of the displacement "x" occurs and the next fifth excitation period $A_5$ ends up being entered, but in the case of the amplitude 3.75V, the damping action at the fourth damping period $Z_4'$ can be eased and the period can be extended, so the 5th cycle can be completed in the fourth damping period $Z_4'$ and the total energy at the time of stopping vibration can be minimized.

In this example, rather than bipolar waveform drive, unipolar waveform drive is used for periodic application of the amplitude zero period, so in the damping dominant period DN, in addition to the damping periods $Z_3$, $Z_4$ ($Z_3'$, $Z_4'$)/the natural damping periods $N_4$, $N_5$ ($N_4'$, $N_5'$) are also added as the damping action, the sharpness of the stopping of vibration is good, and a sharp haptic effects can be exhibited.

Figure 29:
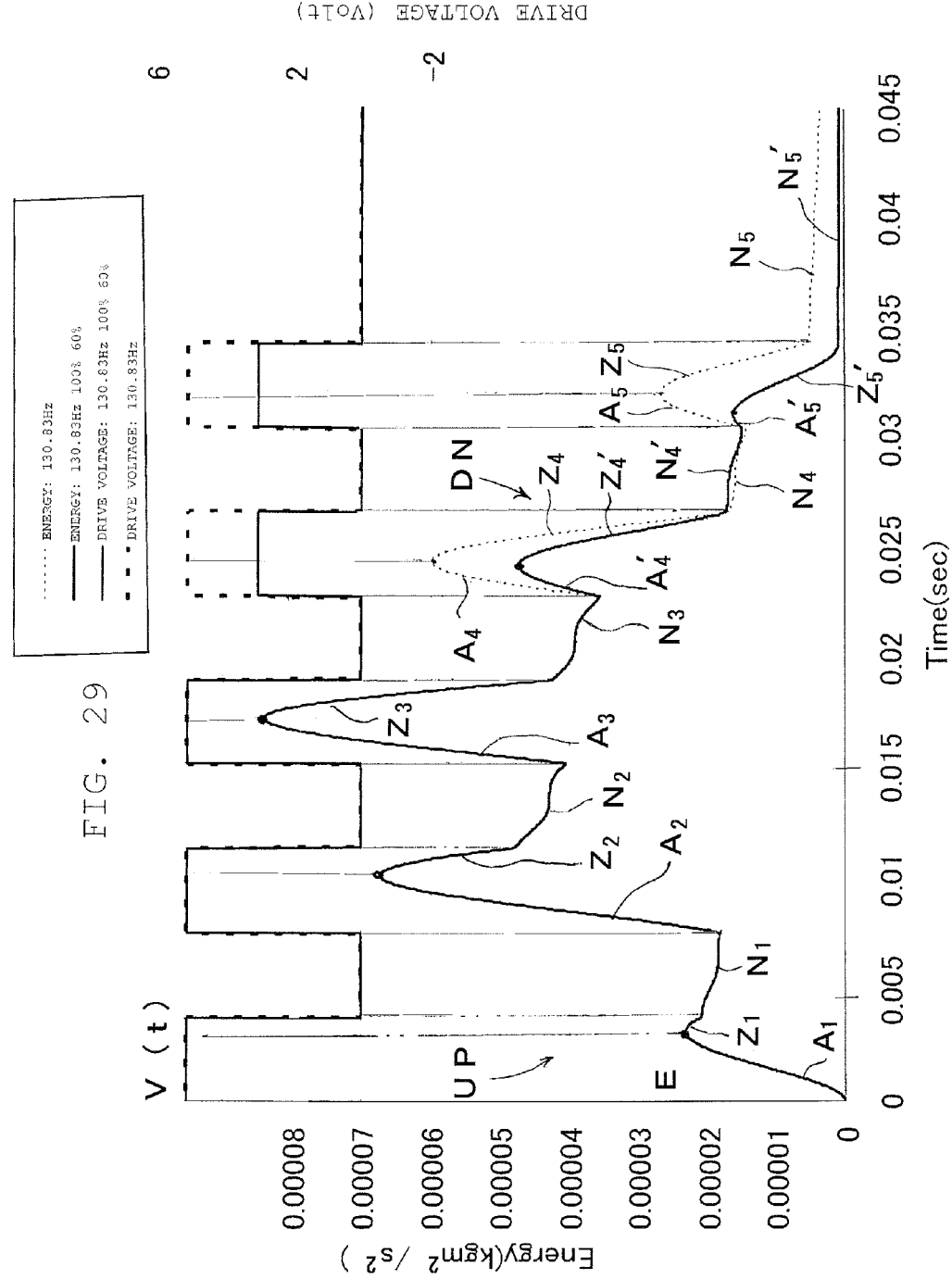
FIG. 29 is a graph showing the case of a 5-cycle drive system of a unipolar square wave of an amplitude 5V and amplitudes 5V and 3V by a drive voltage V(t) of a frequency "f" of 130.83 Hz in the same vibration generating apparatus and the trend in the total energy E of the mechanical vibrator 3 in this case.

FIG. 29 shows the case of the 5-cycle drive system of a unipolar square wave of an amplitude 5V by a drive voltage V(t) of a frequency "f" of 130.83 Hz and the curve of the trend in the total energy E of the mechanical vibrator 3 in this case. In particular, for the final 2 cycles of the 5-cycle drive, the amplitude 5V drive and the total energy E trend shown by the broken lines and the 3V amplitude drive of 60% of 5V and the total energy E trend shown by the solid lines are shown. This drive system is a unipolar square wave of a frequency "f" lower than the natural frequency $f_0$, but in the initial amplitude 5V period (half period ½f) of the drive voltage V(t), the first excitation period $A_1$ and shortest first damping period $Z_1$ occur. The next amplitude 0V period (half period ½f) becomes the first natural damping period $N_1$. At the 2nd cycle amplitude 5V period (half period ½f), the second excitation period $A_2$ and the second damping period $Z_2$ occur. Before the excitation period $A_2$, the half period ½f natural damping period $N_1$ is inserted.

Figure 30:
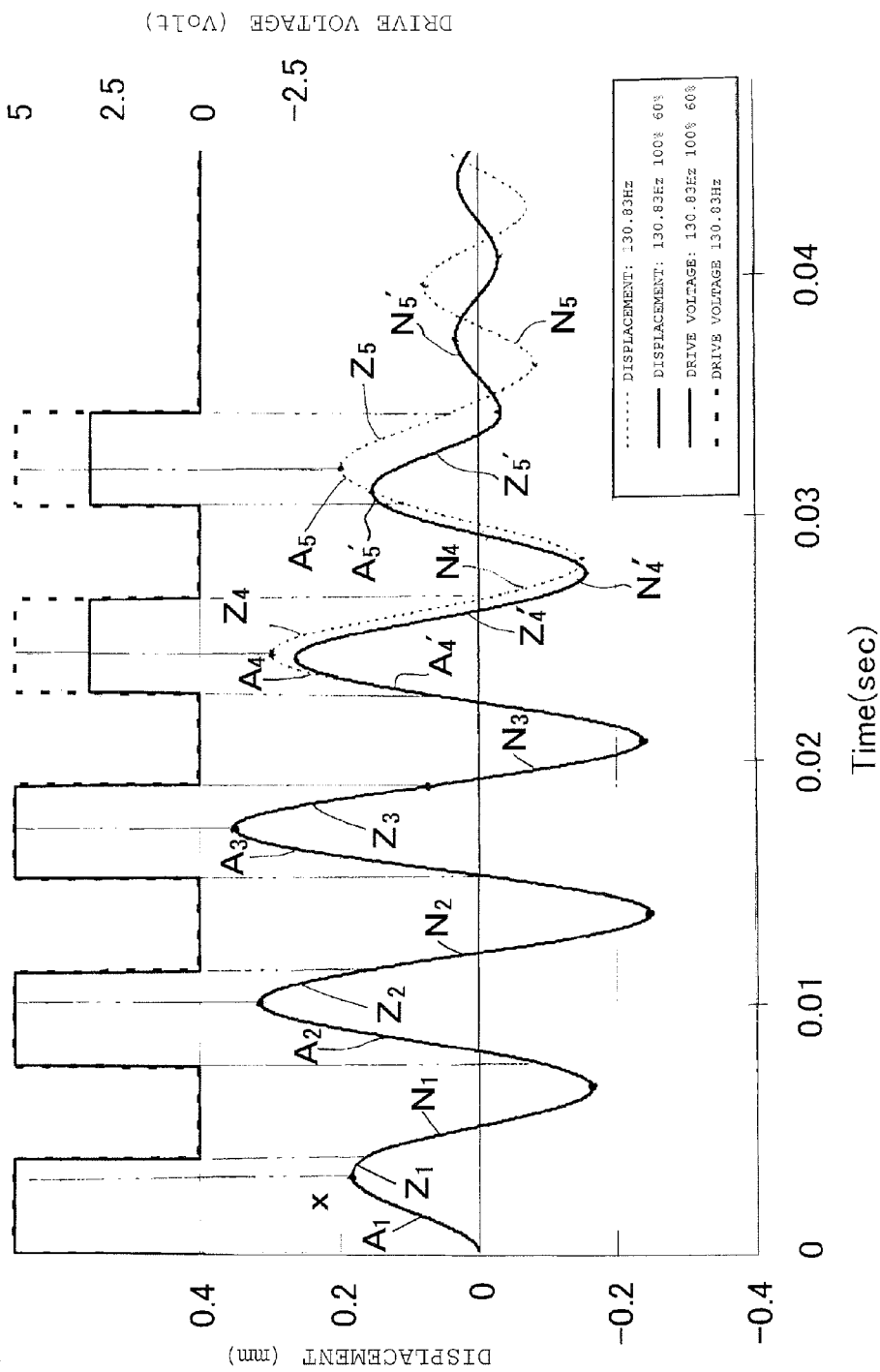
FIG. 30 is a graph showing the case of a 5-cycle drive system of a unipolar square wave of an amplitude 5V and amplitudes 5V and 3V by a drive voltage V(t) of a frequency "f" of 130.83 Hz in the same vibration generating apparatus and the trend in the displacement "x" of the mechanical vibrator 3 in this case.

FIG. 30 shows the case of a 5-cycle drive system of a unipolar square wave of an amplitude 5V by a drive voltage V(t) of a frequency "f" of 130.83 Hz and the displacement "x" of the mechanical vibrator 3 in this case. In particular, for the final 2 cycles in this 5-cycle drive, the trends in amplitude 5V drive and the displacement "x" shown by the broken lines and the 3V amplitude drive of 60% of 5V and displacement "x" shown by the solid lines are shown. After the initial turning point of the displacement "x" is passed, the drive voltage V(t) falls to the amplitude 0V, but the first natural damping period $N_1$ falls, then passes through the second turning point of the displacement "x", then rises to the amplitude 5V of the drive voltage V(t). In all of the 5 cycles, the non-resonant forced vibration (beat vibration) by the amplitude 5V drive is expressed in the center peak projecting mode as $<A_1 \cdot Z_1\|N_1 \cdot N_1\|A_2 \cdot Z_2\|N_2 \cdot N_2\|A_3 \cdot Z_3\|N_3 \cdot N_3\|N_4 \cdot Z_4 \cdot N_4\|N_4\|A_5 \cdot Z_5>$. Further, when the final 2 cycles are amplitude 3V drive, this is expressed as ... $\|A_4' \cdot Z_4'\|N_4' \cdot N_4'\|A_5' \cdot Z_5'>$. Note that, the times of the damping periods become $Z_1 < Z_2 < Z_3 < Z_4$, while the times of the excitation periods become $A_4 < A_3 < A_2 < A_1$. Excitation turning and natural damping turning are alternately repeated, but as the completion of the 5 cycles is approached, the damping period becomes long and the total energy E becomes close to zero. In the final 5th cycle as well, in the case of an amplitude 5V drive, the excitation action of the fifth excitation period $A_5$ is too strong, so the displacement "x" turns by a still high energy, then the fifth damping period $Z_5$ is entered, but in the case of the amplitude 3V, the excitation action of the fifth excitation period $A_5'$ is weak. It is possible to use the damping action of the fifth damping period $Z_5'$ by that extent, so the fifth damping period $Z_5'$ can be completed at the 5th cycle and the total energy at stopping vibration can be minimized.

In this example as well, not a bipolar waveform drive, but a unipolar waveform drive is used to periodically apply the amplitude zero period, so in the damping dominant period DN, in addition to the damping periods $Z_4$, $Z_5$ ($Z_4'$, $Z_5'$), the natural damping periods $N_4$, $N_5$ ($N_4'$, $N_5'$) are also added as damping actions, the sharpness of stopping of vibration is good, and a sharp haptic effects is exhibited. Further, with unipolar waveform drive, compared with bipolar waveform drive, the power source voltage can be used at the single pole side to double the drive voltage V(t), so the power can be increased at the excitation dominant period.

The above explains the drive system of the present example, but even with a damping system ($\zeta<1$) and excitation dominant period UP, the damping period Z and the excitation period A alternately appear, so the startup power has to be increased compared with the case of the resonance system. In this regard, in the vibration linear actuator shown in FIG. 2 and FIG. 3, the mechanical vibrator 3 is comprised of just the ring-shaped permanent magnet which is magnetized in the thickness direction between the first end face 3a and the second end face 3b. The spring element S is comprised of the first plate spring 6 and second plate spring 7 which support the ring-shaped permanent magnet 3 with respect to the fastening part B reciprocatively displaceable in the thickness direction, the electromagnetic coil L passes through the center hole of the ring-shaped permanent magnet 3 and is supported at the fastening part B, a columnar core (iron core) 8 passing through the electromagnetic coil L is provided, the electromagnetic coil L has a bottom stage toroidal coil $L_1$ and a top stage toroidal coil $L_2$ which is adjacent coaxial to the same which have opposite magnetization polarities, and provision is made of a first ring-shaped pole piece 4 mated with the first end face 3a and having an inner circumferential edge surrounding an outer circumference surface of a top stage toroidal coil $L_2$ and a second ring-shaped pole piece 5 mated with the second end face 3b and having an inner circumferential edge surrounding an outer circumference surface of bottom stage toroidal coil $L_1$.

The magnetization direction of the electromagnetic coil L and the magnetized direction of the mechanical vibrator (ring-shaped permanent magnet) 3 are substantially parallel. Due to the winding direction of the two coil windings, the direction of feed of power to the two coils, and the serial structure or parallel structure of the two coils, the outside terminals of the two coils become the same magnetic poles and the inside terminals become the same magnetic poles, so a reciprocating action occurs due to the magnetic attraction force and repulsion force on the ring-shaped permanent magnet 3. The magnetic flux from the two magnetic poles of the ring-shaped permanent magnet 3 gathers at the inner circumferential edges of the first and second ring-shaped pole piece plates 4, 5, passes through the toroidal coils $L_1$, $L_2$, and forms a short circuit magnetic path through the cylindrical core 8, so the reciprocating action by the electromagnetic force also acts and the startup power is increased. Further, the outer circumference side magnetic flux of the ring-shaped permanent magnet 3 also forms a closed circuit, so it is possible to suppress leakage flux.

Since the first and second ring-shaped pole piece plates 4, 5 for making magnetic flux run through the two coils $L_1$, $L_2$ are provided, the electromagnetic force becomes stronger than the magnetic attraction force and repulsion force and contributes to an increase in the startup power.

(Resonance/Non-resonance Switching Drive System)

Figure 31:
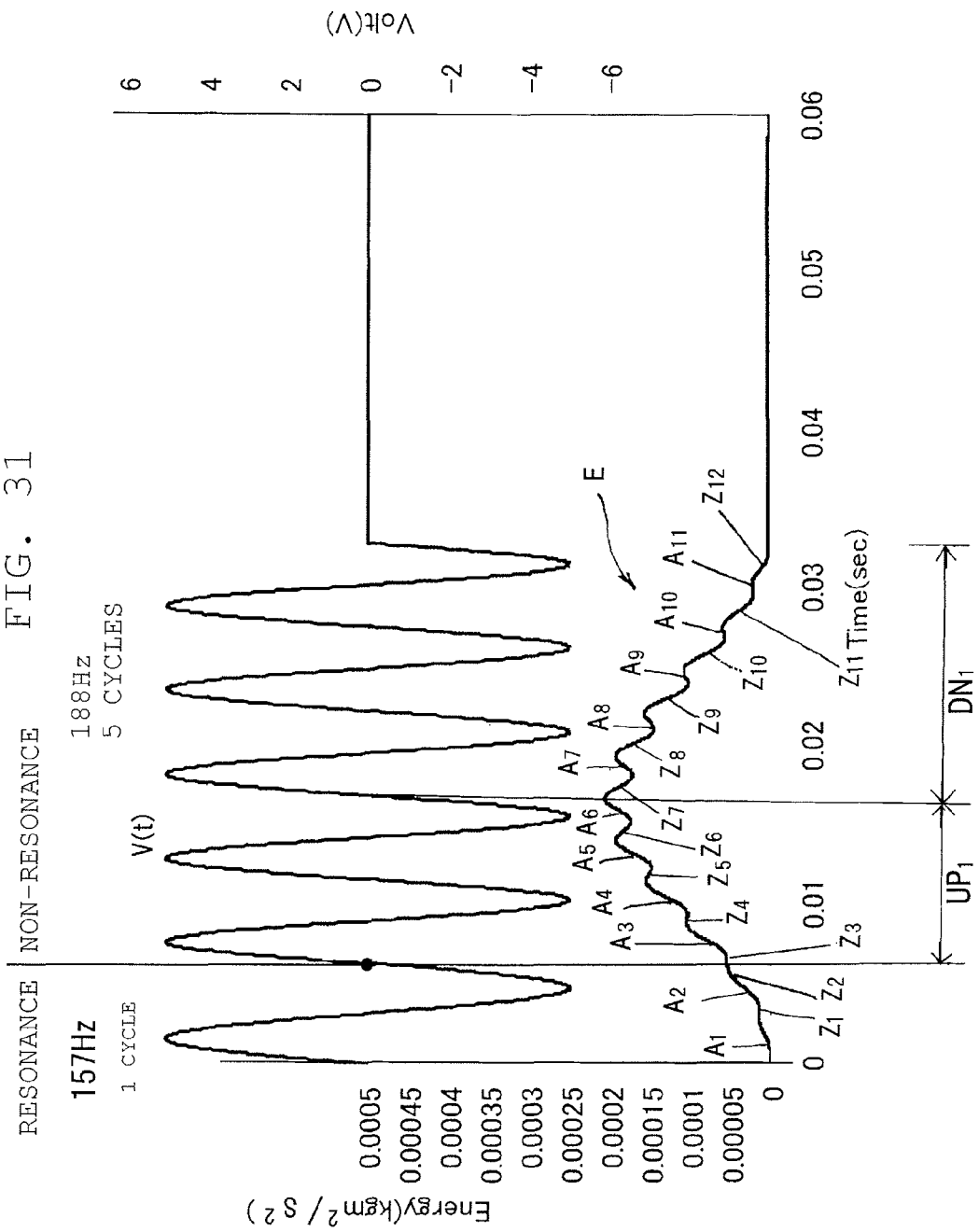
FIG. 31 is a graph showing the waveform of a drive voltage V(t) when making a frequency "f" 157 Hz in 1 cycle and then 188 Hz in 5 cycles and in the same vibration generating apparatus and the trend in the total energy E in this case.
Figure 32:
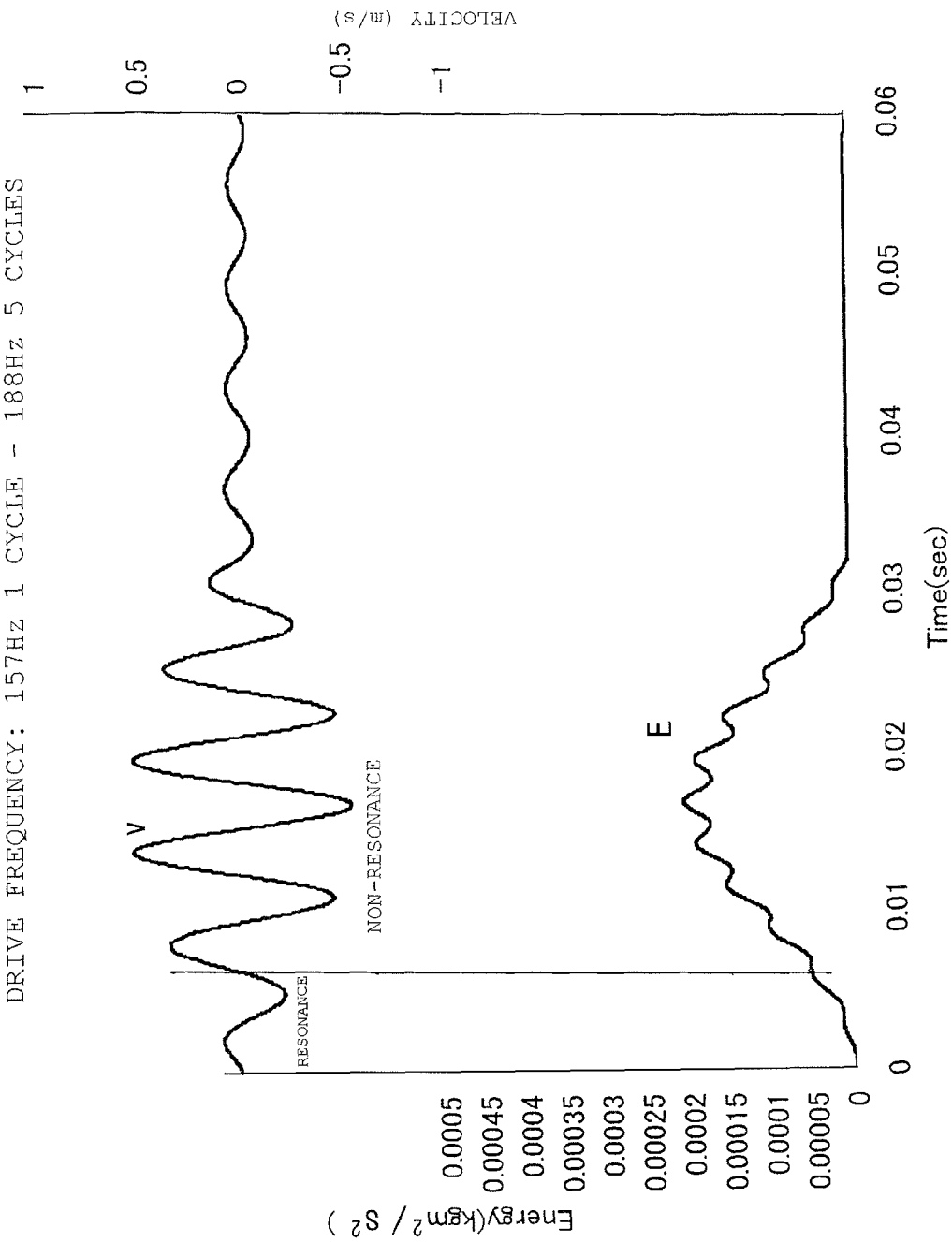
FIG. 32 is a graph which shows curves of the trends in the velocity "v" and the total energy E in the case of the same drive voltage V(t) in the same vibration generating apparatus.
Figure 33:
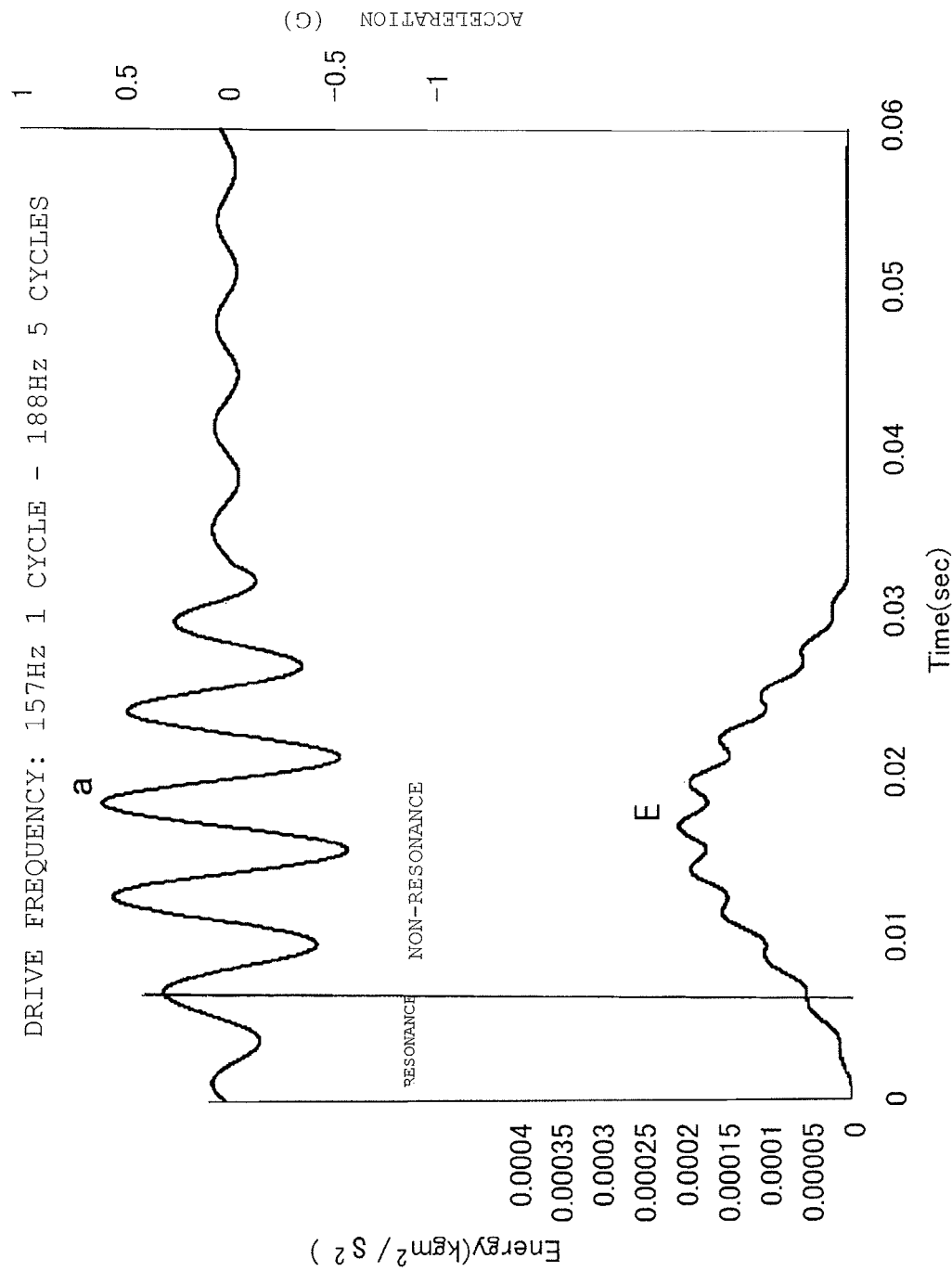
FIG. 33 is a graph which shows curves of the trends in the acceleration "a" and the total energy E in the case of the same drive voltage V(t) in the same vibration generating apparatus.
Figure 34:
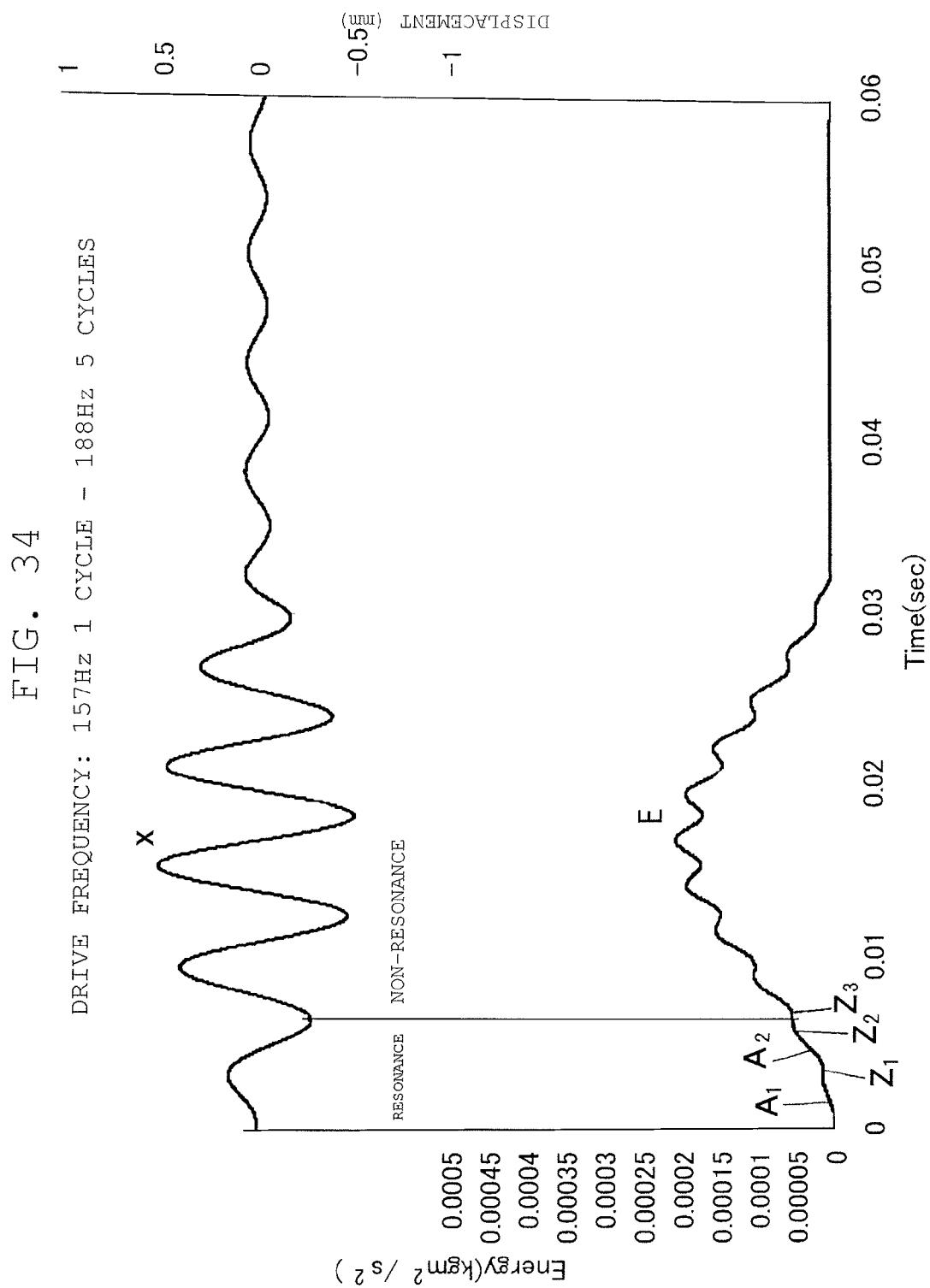
FIG. 34 is a graph which shows curves of the trends in the displacement "x" and the total energy E in the case of the same drive voltage V(t) in the same vibration generating apparatus.

In the above bipolar sine wave drive system, bipolar square wave continuous drive system, biased acceleration generation drive system, and unipolar square wave continuous drive system, the first valley part always arrives, so the sharpness of stopping of vibration is improved, but from the start of the drive start, this is a non-resonant drive beat vibration generating apparatus, so in the excitation dominant period from drive start to the first peak part, the excitation period and the damping period alternately appear, so the more remarkably the damping period is included, the easier it is for the startup power to become insufficient compared with a resonance system. Therefore, below, the frequency of the drive signal is not made the non-resonant frequency right after from the drive start. A resonance/non-resonant drive system in which, first, the frequency of the drive voltage is matched with the damped natural frequency and started as the resonant frequency and then after a predetermined period, it is switched to a non-resonant frequency will be explained FIG. 31 shows the waveform of the drive voltage V(t) when making the drive frequency "f" 157 Hz for 1 cycle (natural frequency $f_o$) then 188 Hz for 5 cycles (non-resonant frequency) and the curve of the trend of the total energy E in that case, FIG. 32 shows curves of the trends in the velocity v and the total energy E in the case of the same drive voltage V(t), FIG. 33 shows curves of the trends in the acceleration "a" and the total energy E in the case of the same drive voltage V(t), and FIG. 34 shows curves of the trends in the displacement "x" and the total energy E in the case of the same drive voltage V(t). In the initial resonant vibration at this damping system (damping ratio $\zeta<1$), unlike the resonant vibration of the non-damping system (damping ratio $\zeta=0$), the phase of the displacement "x" is somewhat retarded from the drive voltage V(t) of the natural frequency 157 Hz. Sooner or later, the retarded phase difference converges to 90° so as will be clear from FIG. 34, at the 157 Hz 1-cycle frequency switching time, the displacement "x" becomes close to 270°. Due to the presence of this close to 90° phase difference, even with 157 Hz initial resonant vibration, there is a short damping period $Z_1$ after the excitation period $A_1$ and a short damping period $Z_2$ after the excitation period $A_2$. The trend is $A_1$, $Z_1$, $A_2$, $Z_2$, but the damping periods $Z_1$ and $Z_2$ are short periods. This is not the trend like the case of a beat vibration where the total energy E can be consumed even temporarily. In actuality, the total energy E is increased proportional to the square of the time. Further, at the point of time of switching frequency of 1 cycle of 157 Hz, the phase of the displacement "x" is retarded close to 90° from that of the drive voltage V(t), so the 188 Hz non-resonant vibration starts from the damping period $Z_3$, the first peak part is reached after the excitation period $A_6$ of the excitation dominant period $UP_1$ of 2 cycles of 188 Hz, this continues until the 3 cycles of the damping period $Z_{12}$ of the damping dominant period $DN_1$, and the total energy E falls to substantially zero at the valley of the second valley part.

In this way, the resonance system ($f_o$) comes first before the non-resonance system ($=f>f_o$), so it is possible to sufficiently secure the startup power. Further, after switching to a beat vibration, the first peak part naturally arrives. There is also a limit effect enabling excessive vibration amplitude to be suppressed. It is therefore possible to prevent breakdown of the mechanical vibrator.

Figure 35:
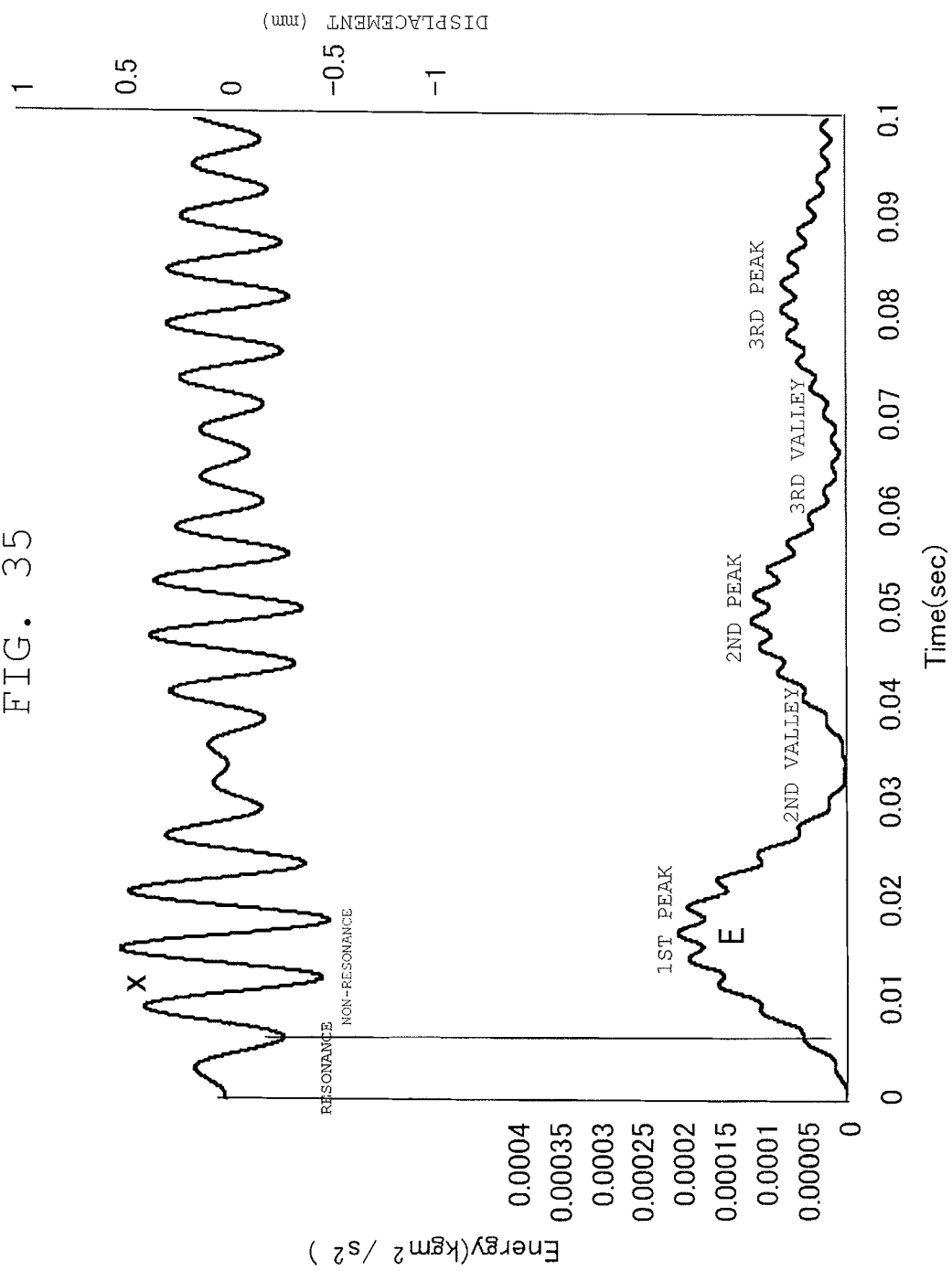
FIG. 35 is a graph showing the displacement "x" and total energy E in the case of a drive voltage V(t) when making a frequency "f" of 157 Hz for 1 cycle and then repeating 188 Hz in the same vibration generating apparatus.
Figure 36:
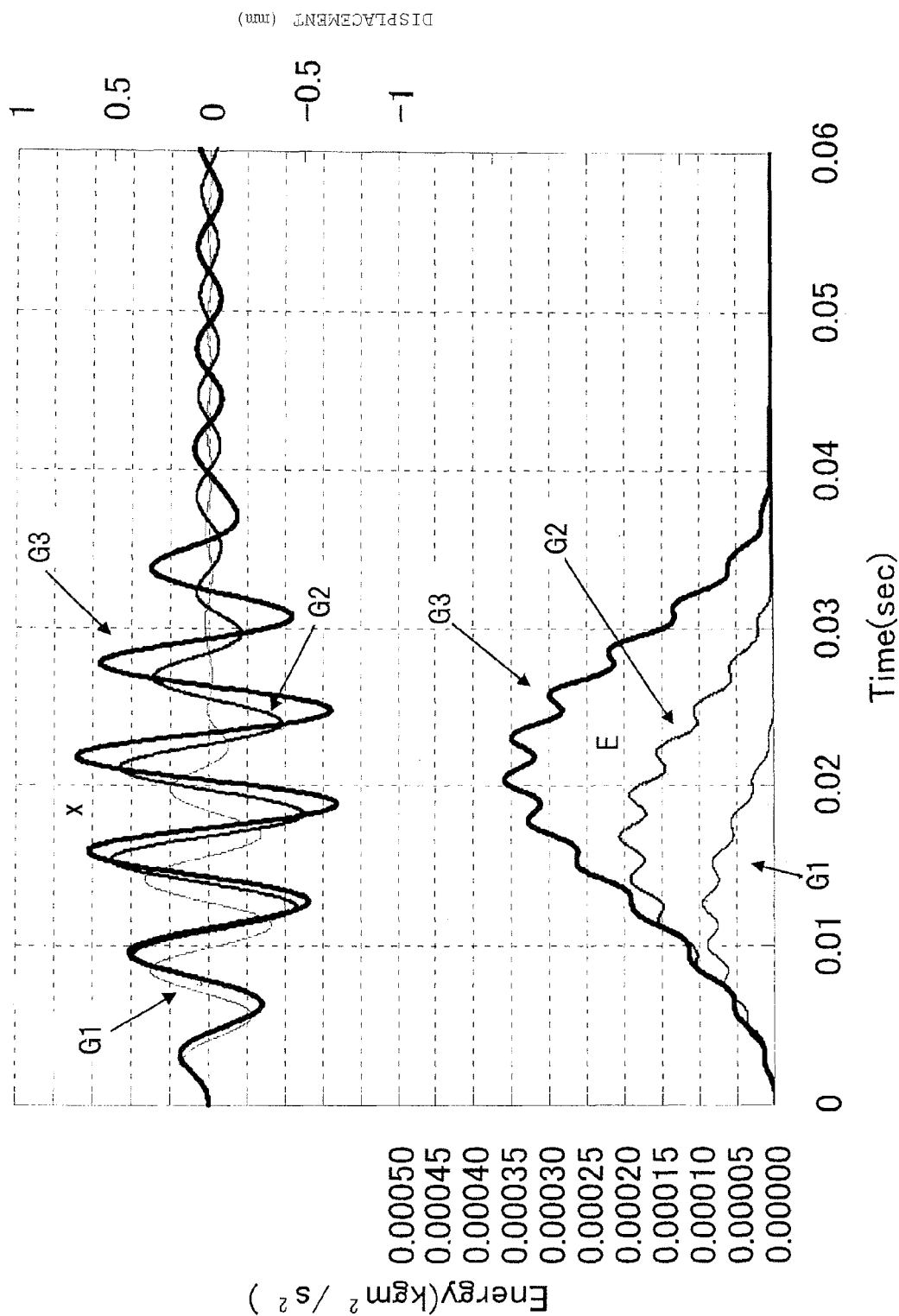
FIG. 36 is a graph showing the displacement "x" and total energy E in the case of a drive voltage V(t) of a non-resonant frequency 196.25 Hz for 5 cycles, the displacement and total energy E in the case of a drive voltage V(t) of 157 Hz for 1 cycle and then 188 Hz for 5 cycles, and the displacement and total energy E in the case of a drive voltage V(t) of 157 Hz for 2 cycles and then 188 Hz for 5 cycles in the same vibration generating apparatus.

FIG. 35 shows the displacement "x" and total energy E in the case of a drive voltage V(t) repeating 1 cycle of a drive frequency "f" of 157 Hz (natural frequency $f_o$) then 188 Hz (non-resonant frequency). The second valley part and on repeat the beat vibration, the peak of the second peak part lower than the peak of the first peak part and the peak of the third peak part lower than the peak of the second peak part appear and the valley of a third valley part higher than the valley of the second valley part appears. The fine lines G1 of FIG. 36 show the displacement "x" and total energy E in the case of a drive voltage V(t) of the non-resonant frequency 196.25 Hz of 5 cycles, the medium lines G2 show the displacement "x" and total energy E in the case of a drive voltage V(t) of a 157 Hz (natural frequency $f_o$) of 1 cycle and a 188 Hz (non-resonant frequency) of 5 cycles, the bold lines G3 show the displacement "x" and total energy E in the case of a drive voltage V(t) of a 157 Hz (natural frequency $f_o$) of 2 cycles and a 188 Hz (non-resonant frequency) of 5 cycles. The fine lines G1 show the beat vibration from the start and an accompanying strong damping period in the excitation dominant period $UP_1$, so the peak of the first peak part is low. The medium lines G2 show drive by 1 cycle of 157 Hz (natural frequency $f_o$) in advance, then switching to 188 Hz (non-resonant frequency), so the peak of the first peak part becomes about 2 times higher than that of the fine lines G1. The bold lines G3 are accompanied with 2-cycles' worth of initial drive of resonance, so the peak of the first peak part becomes close to about 2 times greater than that of the medium lines G2. Note that, the number of cycles of the resonant frequency is preferably made smaller than the subsequent non-resonant frequency. This is because it is possible to suppress any discrepancy from zero of the second valley part and possible to secure sharpness in stopping of vibration.

Figure 37:
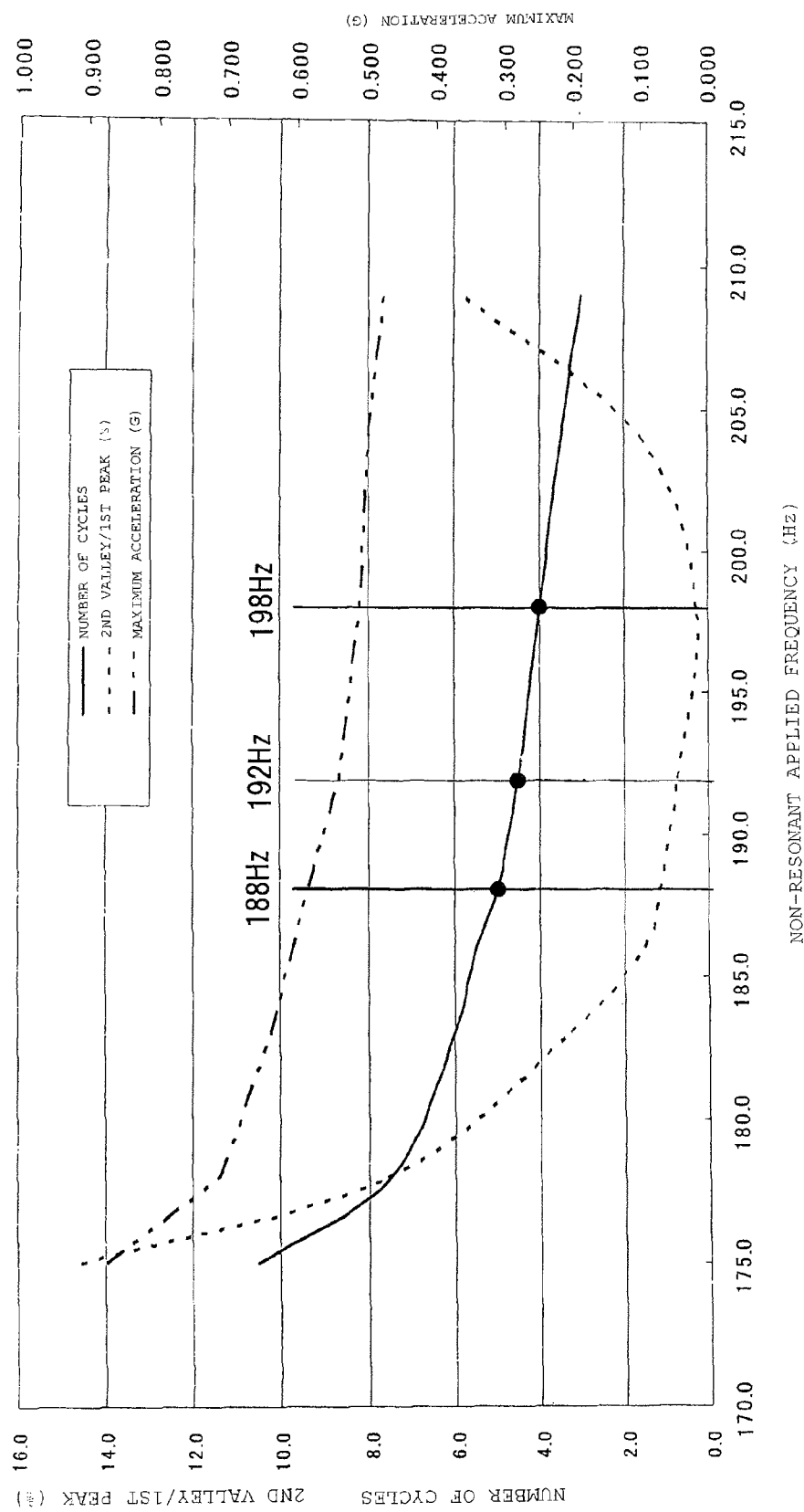
FIG. 37 is a graph showing the number of cycles where vibration stops at the bottom of the second valley part for the value of the non-resonant frequency, the maximum acceleration ($G_{op}$Max), the value of the first peak part, the value of the second peak part, and the second valley part/first peak part (%) in the case of making the frequency "f" 157 Hz for 1 cycle and then a non-resonant frequency ($>f_o$) in the same vibration generating apparatus.

Table 3 shows the number of cycles at which vibration stops at the valley of the second valley part for the value of the non-resonant frequency, maximum acceleration ($G_{op}$Max), peak value of the first peak, peak value of the second peak, and valley value of the second valley part/peak value of the first peak part (%) in the case of making the drive frequency "f" 157 Hz (natural frequency $f_o$) for 1 cycle then the non-resonant frequency ($<f_o$). The graph drawing this is shown in FIG. 37. Note that, in Table 3, for example, the expression "4.63E-04" is an abbreviation for $4.63 \times 10^{-4}$.

TABLE 3

| Non-resonant frequency (Hz) | No. of cycles | Max. acceleration | Energy Value of 1st peak | Value of 2nd valley | 2nd valley/ 1st peak {%} |
|---|---|---|---|---|---|
| 175.0 | 10.5 | 0.873 | 4.63E−04 | 6.75E−05 | 14.58 |
| 178.0 | 7.5 | 0.710 | 3.12E−04 | 2.35E−05 | 7.54 |
| 183.0 | 6.0 | 0.638 | 2.46E−04 | 8.03E−05 | 3.26 |
| 186.0 | 5.5 | 0.608 | 2.19E−04 | 3.36E−05 | 1.53 |
| 188.0 | 5.0 | 0.587 | 2.08E−04 | 2.44E−05 | 1.17 |
| 192.0 | 4.5 | 0.541 | 1.81E−04 | 1.34E−05 | 0.74 |
| 198.0 | 4.0 | 0.512 | 1.60E−04 | 4.48E−05 | 0.28 |
| 204.0 | 3.5 | 0.500 | 1.42E−04 | 2.16E−05 | 1.52 |
| 209.0 | 3.0 | 0.476 | 1.24E−04 | 7.18E−05 | 5.78 |

Figure 38:
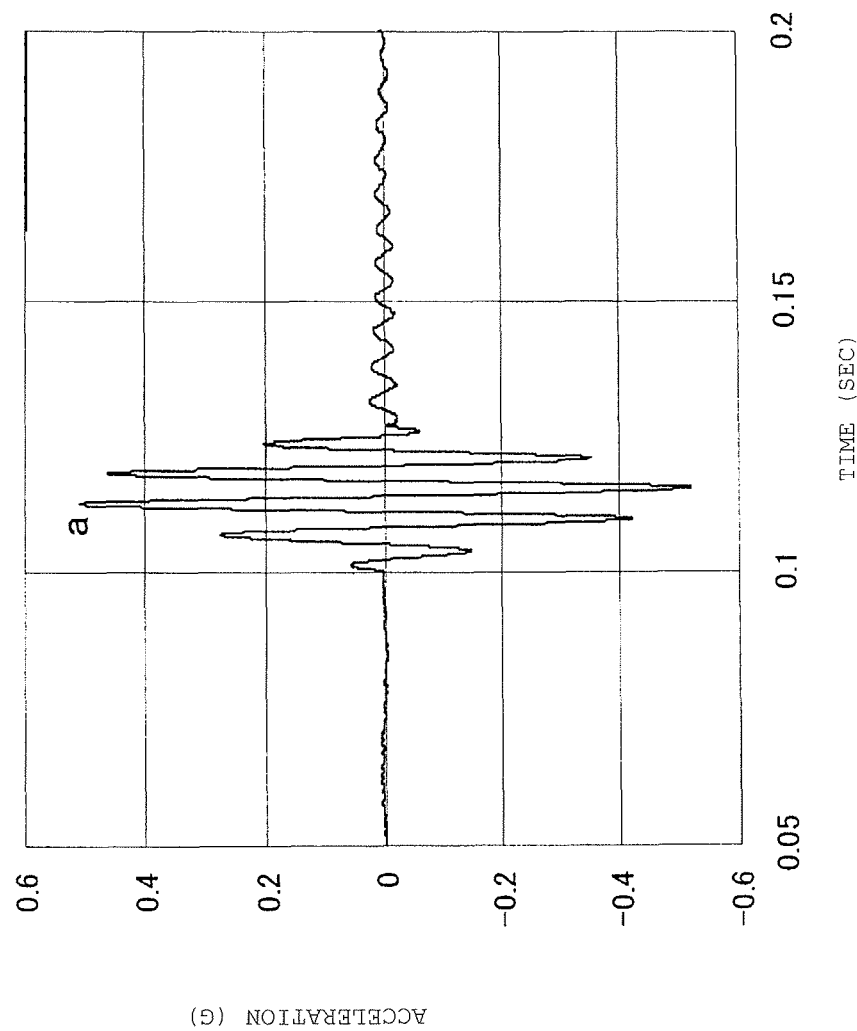
FIG. 38 is a graph showing the acceleration "a" in the case of drive while making the frequency "f" 157 Hz for 1 cycle and then a non-resonant frequency of 198 Hz for 4 cycles in the same vibration generating apparatus.

As clear from FIG. 37, when switching to a non-resonant frequency which is higher than the natural frequency $f_o$, the higher the non-resonant frequency, the more the maximum acceleration ($q_{op}$Max) monotonously decreases, so it is not preferable to select an excessively high non-resonant frequency far from 157 Hz (natural frequency $f_o$), but it was learned that there is an optimal non-resonant frequency where the second valley part/first peak part (%) becomes the minima near zero. The value is in the end the value in the case of the vibration linear actuator of the present embodiment, but is a lower limit value of 188 Hz of 5 cycles, an upper limit value of 198 Hz of 4 cycles, and an intermediate value of 192 Hz of 4.5 cycles. Note that, by way of reference, FIG. 38 shows the acceleration "a" in the case of driving a drive frequency "f" of 1 cycle of 157 Hz (natural frequency $f_o$) then a non-resonant frequency of 198 Hz for 4 cycles.

Figure 39:
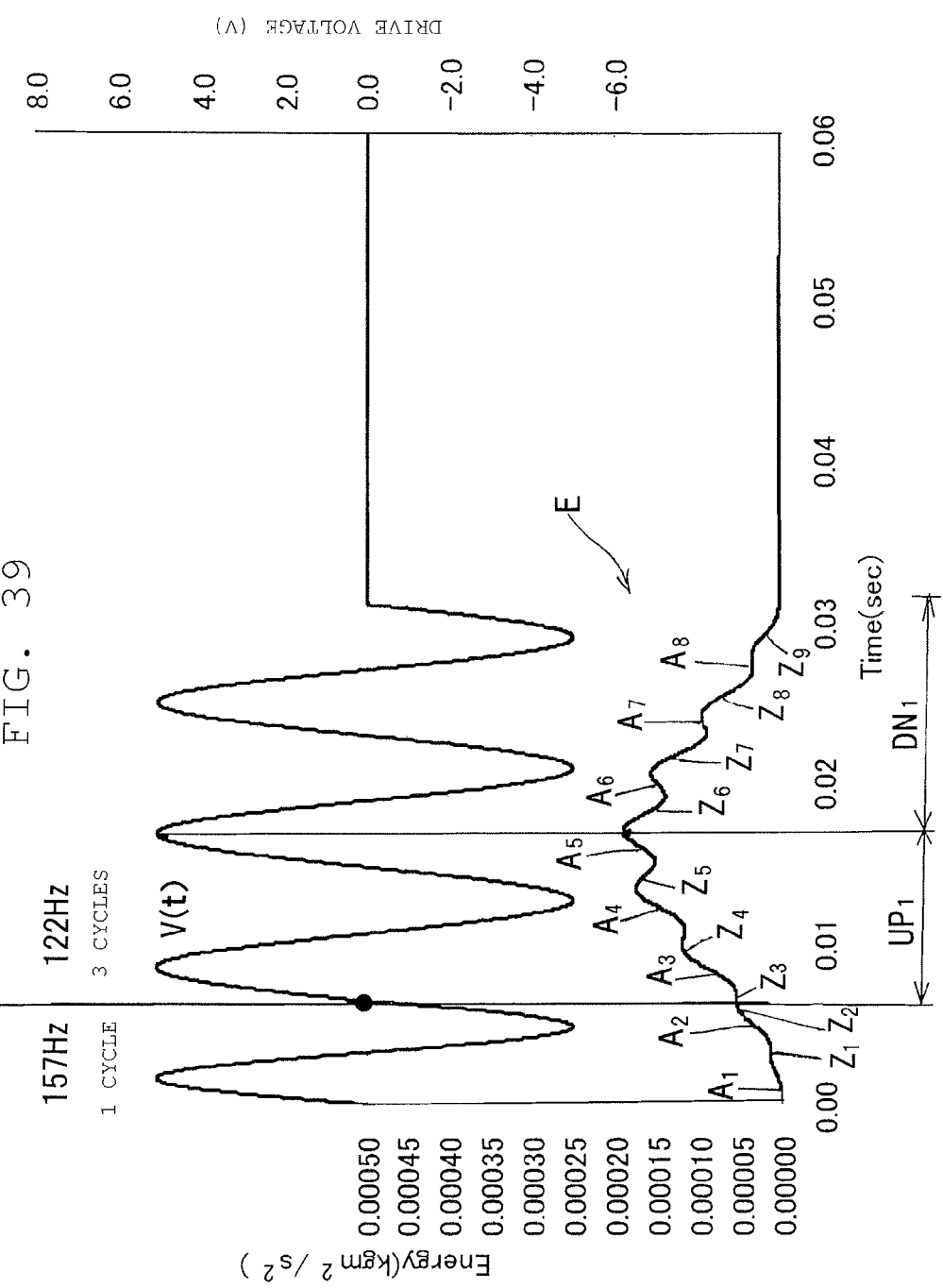
FIG. 39 is a graph showing the curves of the trends in the drive voltage V(t) when making the frequency "f" 157 Hz for 1 cycle and then 122 Hz for 3 cycles in the same vibration generating apparatus and in the total energy E in that case.
Figure 40:
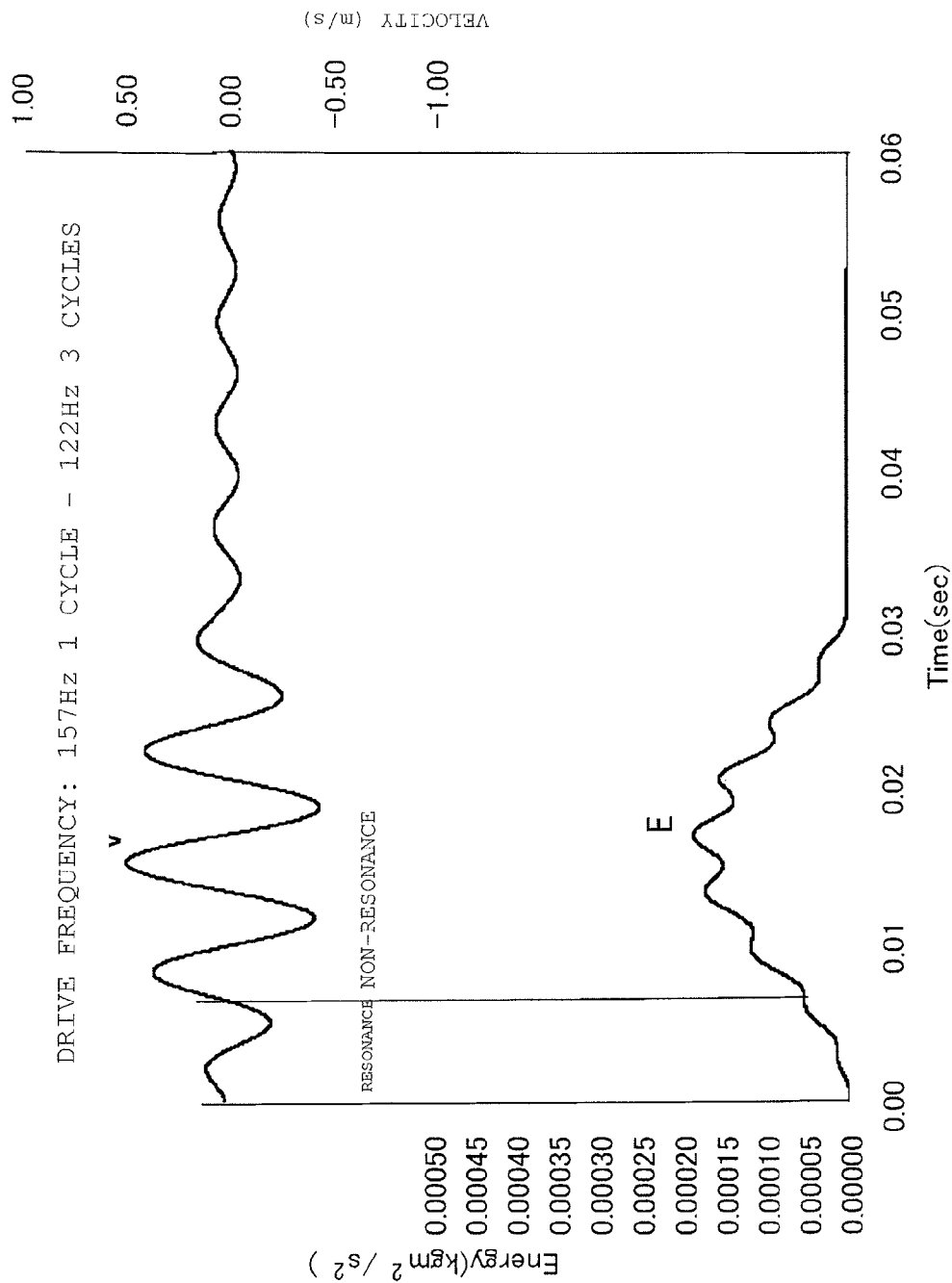
FIG. 40 is a graph showing curves of the trends in the velocity "v" and the total energy E in the case of the same drive voltage V(t) in the same vibration generating apparatus.
Figure 41:
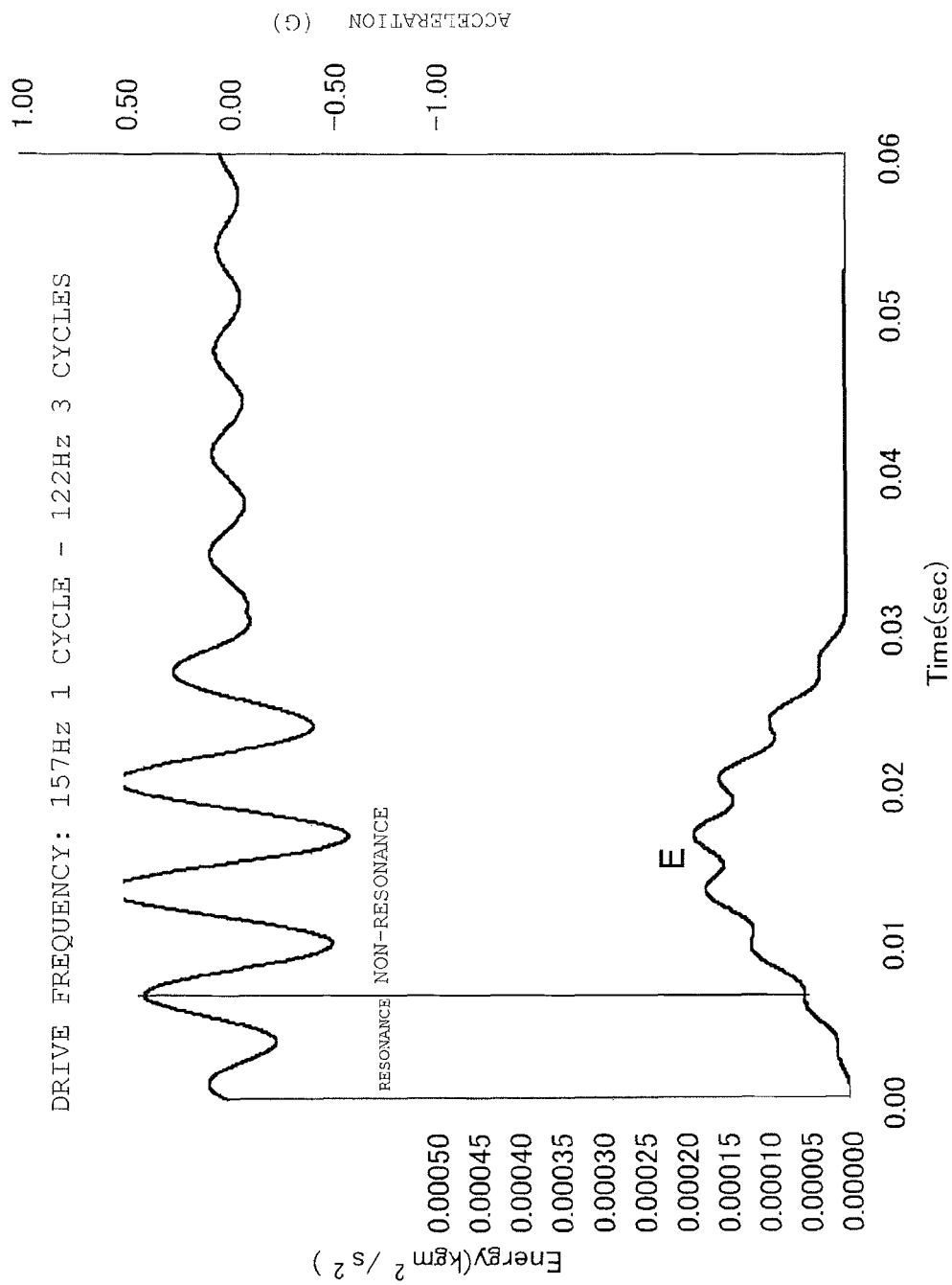
FIG. 41 is a graph showing curves of the trends in the acceleration "a" and the total energy E in the case of the same drive voltage V(t) in the same vibration generating apparatus.
Figure 42:
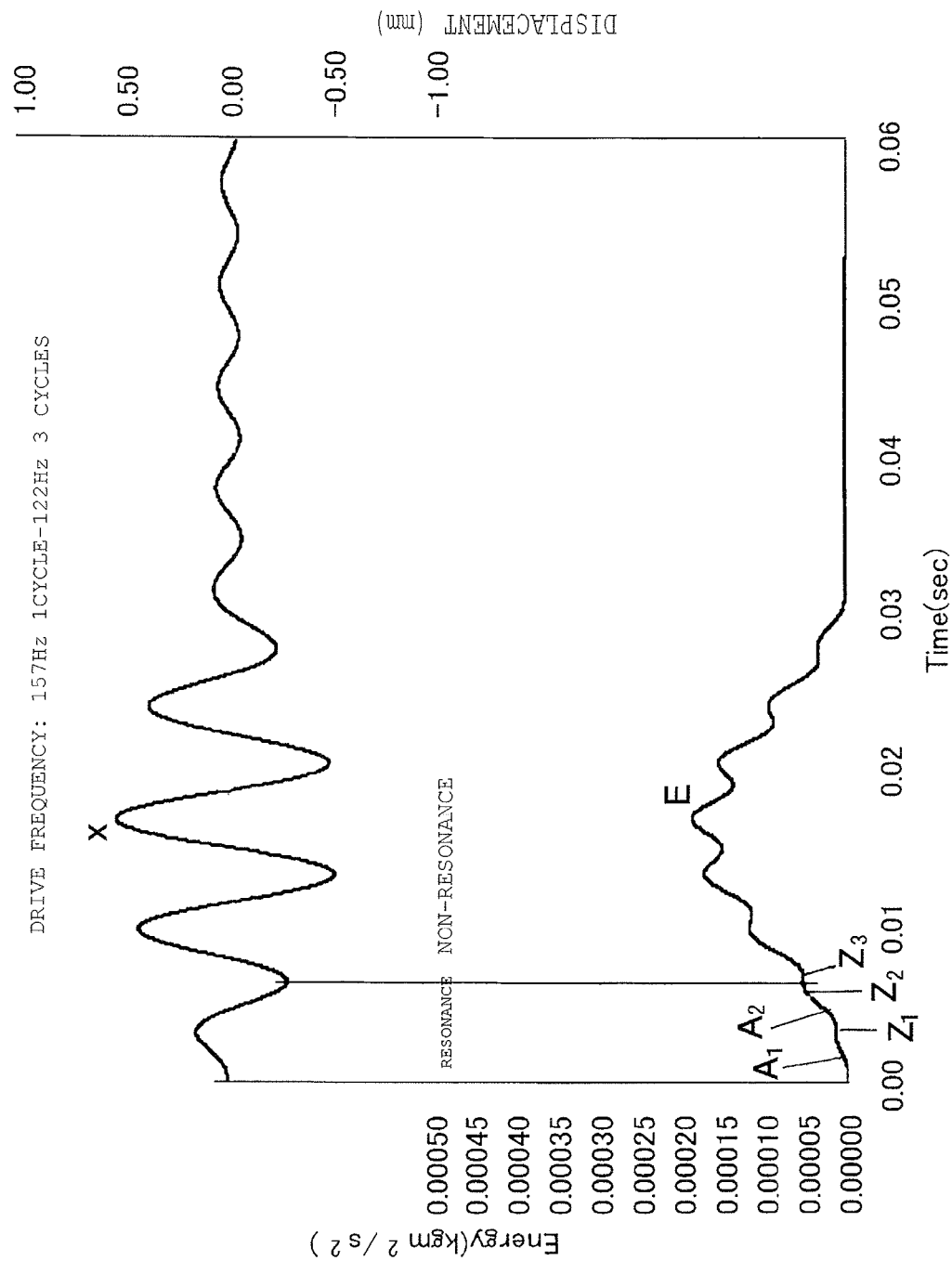
FIG. 42 is a graph showing curves of the trends in the displacement "x" and the total energy E in the case of the same drive voltage V(t) in the same vibration generating apparatus.

FIG. 39 shows the waveform of the drive voltage V(t) when making the drive frequency "f" 1 cycle of 157 Hz (natural frequency $f_o$) then 3 cycles of 122 Hz (non-resonant frequency) and a curve of the trend of the total energy E in that case, FIG. 40 shows the curves of the trends of the velocity "v" and the total energy E in the case of the drive voltage V(t), FIG. 41 shows the curves of the trends of the acceleration "a" and the total energy E in the case of the drive voltage V(t), and FIG. 42 shows the curves of the trends of the displacement "x" and the total energy E in the case of the same drive voltage V(t). Even in the resonant vibration of this damping system (damping ratio $\zeta<1$), unlike the resonant vibration of a non-damping system, the phase of the displacement "x" is somewhat retarded from the drive voltage V(t) of the natural frequency 157 Hz and the retarded phase difference converges to 90°, so as clear from FIG. 42, the displacement "x" becomes close to 270° at the point of time of switching of the frequency of 1 cycle of 157 Hz. Due to the existence of this phase difference, even with a 157 Hz initial resonant drive operation, a weak damping period $Z_1$ after the excitation period $A_1$ and a weak damping period $Z_2$ after the excitation period $A_2$ arise. The trend becomes $A_1$, $Z_1$, $A_2$, and $Z_2$, but the damping periods $Z_1$, $Z_2$ are short periods. They do not cause the consumption of the total energy E even temporarily like with the case of a beat vibration. The total energy E is strengthened proportionally to the square of the time. Further, at the time of switching of a frequency of 1 cycle's worth of 157 Hz, the phase of the displacement "x" becomes retarded close to 90° from that of the drive voltage V(t), so the 122 Hz non-resonant drive operation starts from the damping period $Z_3$, proceeds through the excitation period A6 of the excitation dominant period $UP_1$, reaches the first peak part by 2 cycles worth of 188 Hz, then continues up to the damping period $Z_8$ of the 3-cycles' worth of the damping dominant period $DN_1$. At the bottom of the second valley part, the total energy E falls to substantially zero.

In this way, there is a resonance system ($f_o$) before the non-resonance system ($=f<f_o$), so the startup power can be sufficiently secured. Further, after switching to the beat vibration, the first peak part automatically arrives. There is a limit effect enabling suppression of excessive vibration amplitude. Further, it is possible to prevent breakdown of the mechanical vibrator.

Figure 43:
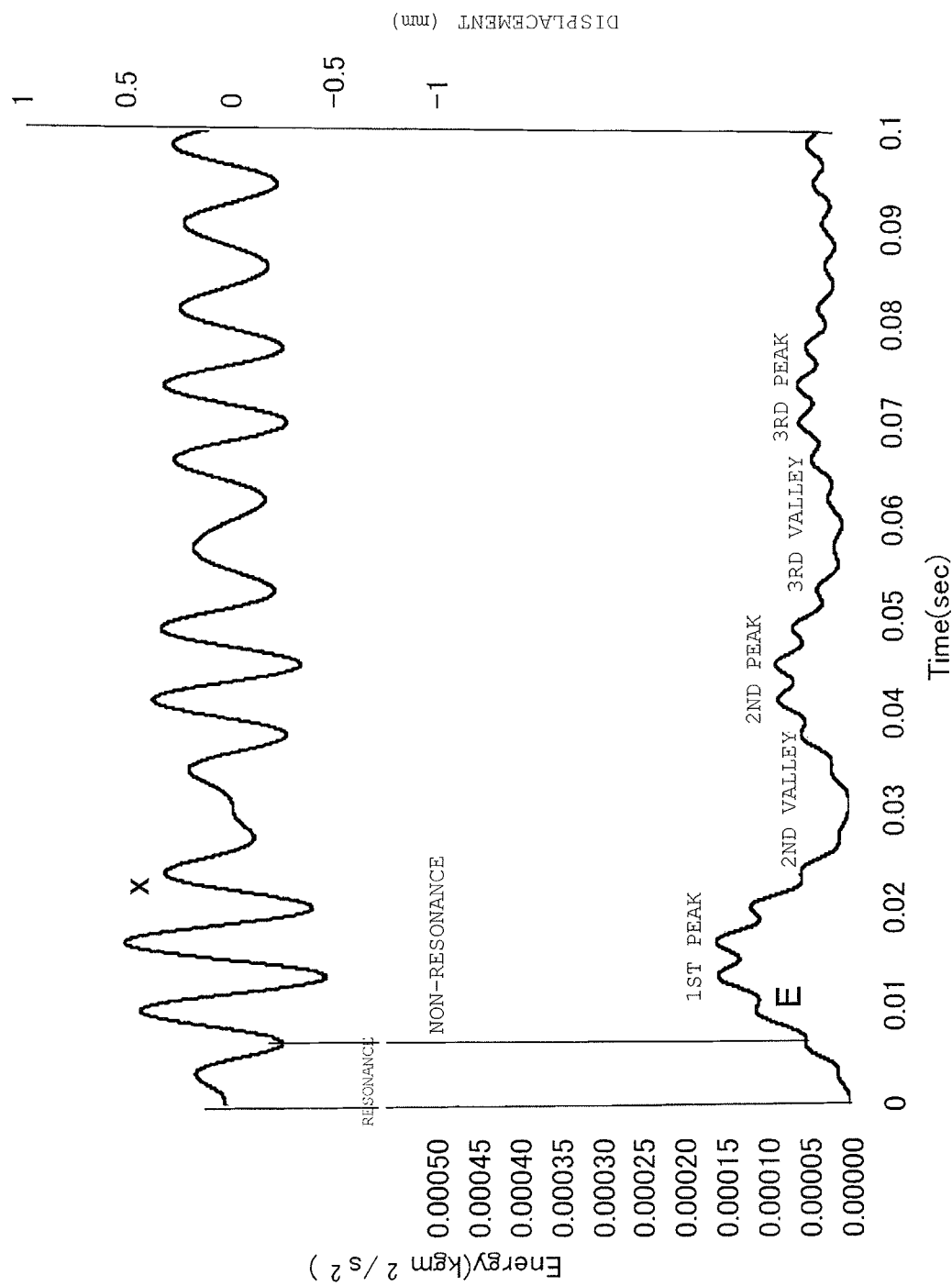
FIG. 43 is a graph showing the displacement "x" and total energy E in the case of a drive voltage V(t) making a frequency "f" of 157 Hz for 1 cycle an then repeating 122 Hz in the same vibration generating apparatus.
Figure 44:
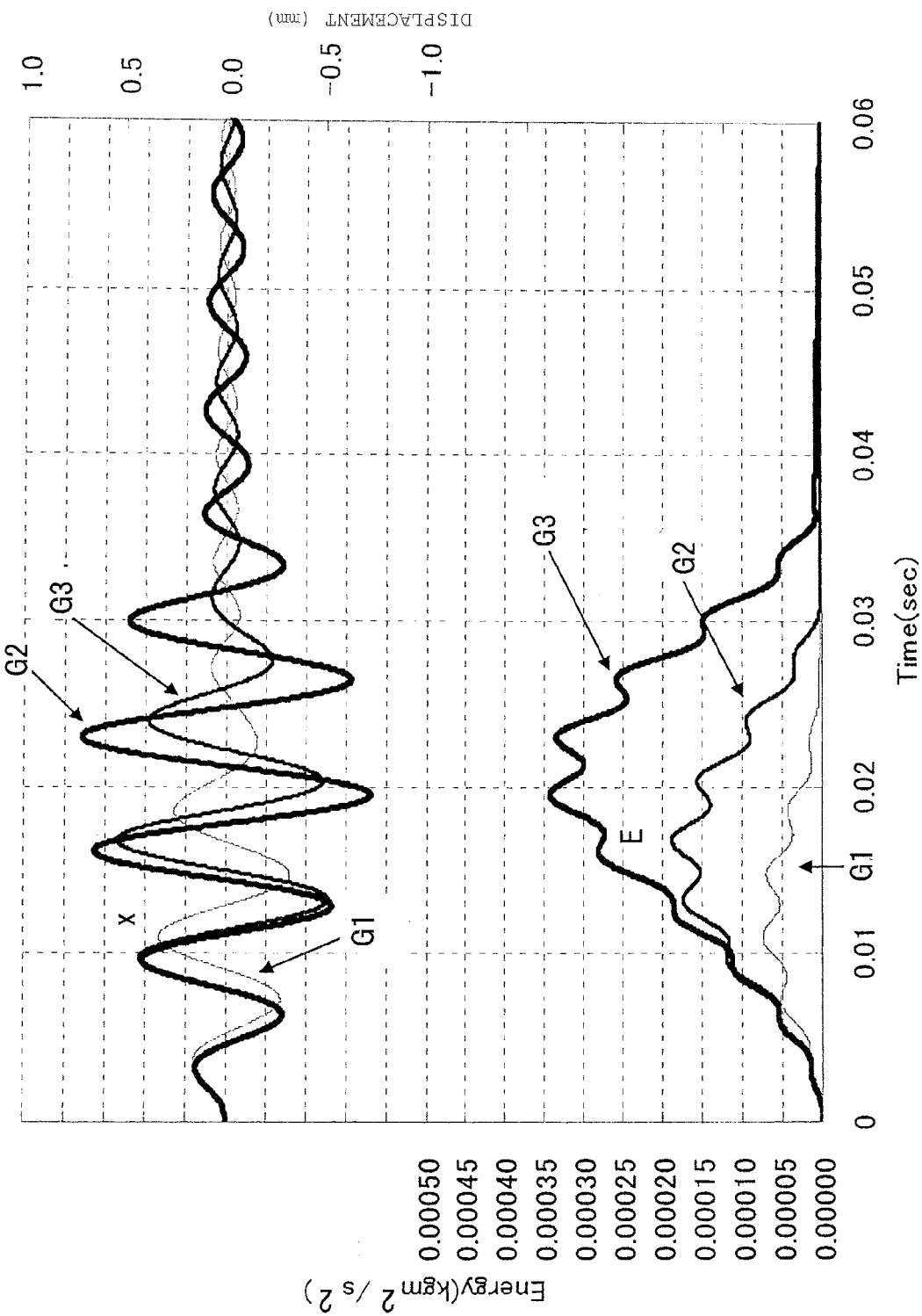
FIG. 44 is a graph showing the displacement "x" and total energy E in the case of a drive voltage V(t) of a non-resonant frequency 117.75 Hz for 3 cycles, the displacement and total energy E in the case of a drive voltage V(t) of 157 Hz for 1 cycle and then 122 Hz for 3 cycles, and the displacement and total energy E in the case of a drive voltage V(t) of 157 Hz for 2 cycles and then 122 Hz for 3 cycles in the same vibration generating apparatus.

FIG. 43 shows the displacement "x" and total energy E in the case of a drive voltage V(t) repeating a drive frequency "f" of 157 Hz (natural frequency $f_o$) for 1 cycle then 122 Hz (non-resonant frequency). From the second valley part on, the beat vibration is repeated, so a peak of the second peak part lower than the peak of the first peak part and a peak of a third peak part lower than the peak of the second peak part appear, while a bottom of a third valley part higher than the bottom of the second valley part appears. The fine lines G1 of FIG. 44 show the displacement "x" and the total energy E in the case of 3 cycles of a drive voltage V(t) of the non-resonant frequency 117.75 Hz, the medium lines G2 show the displacement and total energy E in the case of a drive voltage V(t) of 1 cycle of 157 Hz (natural frequency $f_o$) then 3 cycles of 1122 Hz (non-resonant frequency), and the bold lines G3 show the displacement "x" and total energy E in the case of a drive voltage V(t) of 2 cycles of 157 Hz (natural frequency $f_o$) then 3 cycles of 122 Hz (non-resonant frequency). The fine lines G1 show the beat vibration from the start and a strong damping period preceding in the excitation dominant period, so the peak of the first peak part is low. The medium lines G2 show drive by 1 cycle of 157 Hz (natural frequency $f_o$) in advance, then switching to 122 Hz (non-resonant frequency), so the peak of the first peak part becomes about 2 times higher than that of the fine lines G1. The bold lines G3 are accompanied with 2-cycles' worth of initial drive of resonance, so the peak of the first peak part becomes close to about 2 times greater than that of the medium lines G2. Note that, the number of cycles of the resonant frequency is preferably made smaller than the subsequent non-resonant frequency. This is because it is possible to suppress any discrepancy from zero of the second valley part and possible to secure sharpness in stopping of vibration.

Table 4 shows the number of cycles at which vibration stops at the valley of the second valley part for the value of the non-resonant frequency, maximum acceleration ($G_{op}$Max), peak value of the first peak, peak value of the second peak, and valley value of the second valley part/peak value of the first peak part (%) in the case of making the drive frequency "f" 157 Hz (natural frequency $f_o$) for 1 cycle then the non-resonant frequency ($<f_o$). The graph is FIG. 45. Note that, in Table 4, for example, the indication "1.31E-04" is an abbreviation for $1.31 \times 10^{-4}$.

TABLE 4

| Non-resonant frequency (Hz) | No. of cycles | Max. acceleration | Energy Value of 1st peak | Value of 2nd peak | 2nd valley/ 1st peak {%} |
|---|---|---|---|---|---|
| 107.0 | 1.5 | 0.338 | 1.31E−04 | 1.79E−05 | 13.67 |
| 113.0 | 2.0 | 0.349 | 1.36E−04 | 1.62E−06 | 1.18 |
| 122.0 | 3.0 | 0.4 | 1.74E−04 | 7.63E−07 | 0.44 |
| 127.0 | 3.5 | 0.429 | 2.05E−04 | 9.02E−07 | 0.44 |
| 129.5 | 4.0 | 0.464 | 2.19E−04 | 1.90E−06 | 0.87 |
| 132.0 | 4.5 | 0.501 | 2.49E−04 | 4.80E−06 | 1.93 |
| 133.7 | 5.0 | 0.515 | 2.59E−04 | 1.03E−05 | 3.97 |
| 138.0 | 6.5 | 0.595 | 3.32E−04 | 2.51E−05 | 7.57 |

Figure 45:
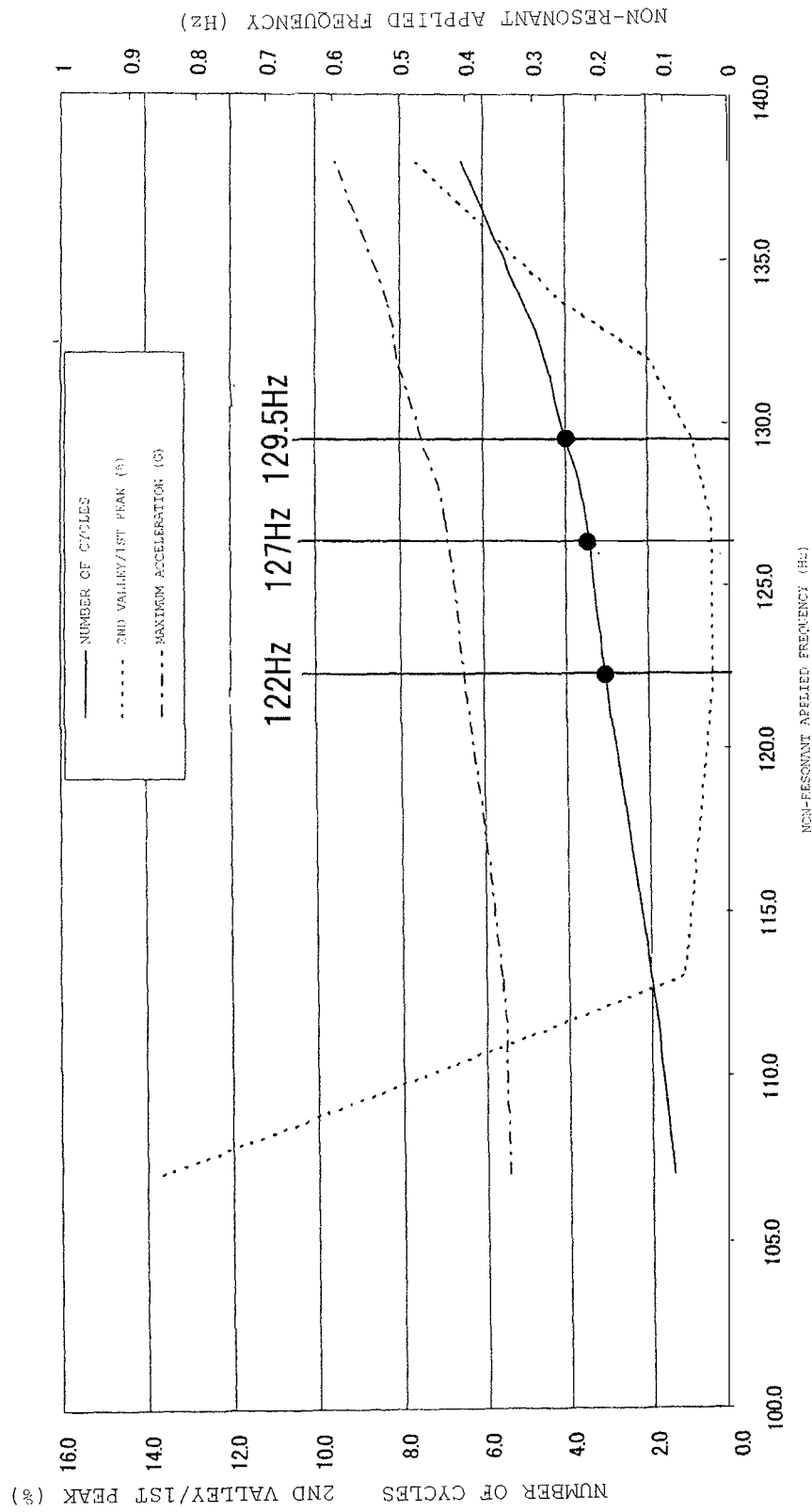
FIG. 45 is a graph showing the number of cycles where vibration stops at the bottom of the second valley part for the value of the non-resonant frequency, the maximum acceleration ($G_{op}$Max), the value of the first peak part, the value of the second peak part, and the second valley part/first peak part (%) in the case of making the frequency "f" 157 Hz for 1 cycle and then a non-resonant frequency ($<f_o$) in the same vibration generating apparatus.

As clear from FIG. 45, when switching to a non-resonant frequency which is lower than the natural frequency $f_o$, the lower the non-resonant frequency becomes, the more the maximum acceleration ($G_{op}$Max) monotonously decreases, so it is not preferable to select an excessively low non-resonant frequency which is far from 157 Hz (natural frequency $f_o$). There is a non-resonant frequency where the second valley part/first peak part (%) becomes the minima near zero. These values are the values of the present example of the vibration linear actuator, but there are 3 cycles of the lower limit value 122 Hz, 4 cycles of the upper limit value 129.5 Hz, and 3.5 cycles of the intermediate value of 127 Hz. Note that, for reference, FIG. 46 shows the acceleration "a" in the case of driving by a drive frequency "f" of 157 Hz (natural frequency $f_o$) for 1 cycle and then a non-resonant frequency of 129.5 Hz for 4 cycles.

Note that, the above drive system for switching between resonance/non-resonance is a bipolar sine wave continuous drive system, but the present invention may also be a bipolar square wave continuous drive system or unipolar square was continuous drive system. Various variations may be employed.

The invention claimed is:

1. A vibration generating apparatus including a damping system having a damping ratio $\zeta < 1$ to support a mechanical vibrator with respect to a fastening part through a spring element, and a magnetizing means generating a dynamic magnetic field to vibrate said mechanical vibrator without contact, said mechanical vibrator generating a beat vibration by making the frequency of a drive voltage applied to said magnetizing means, from a drive start or middle of drive, to be a non-resonant frequency out of a damped natural frequency of said mechanical vibrator, wherein:

said vibration generating apparatus comprises a forced vibration control means controlling to stop application of said drive voltage, in a beat wave defining an amplitude of said beat vibration, at a second valley part after a first peak part from the side of said drive start, and a frequency of said drive voltage is substantially ⅓ of said damped natural frequency and wherein said drive voltage applied to said magnetizing means is a sine half wave.

2. The vibration generating apparatus as set forth in claim 1, wherein said forced vibration control means suppresses an amplitude of said drive voltage at said second valley part before stopping application of said drive voltage.

3. The vibration generating apparatus as set forth in claim 1, wherein said forced vibration control means suppresses an amplitude of said drive voltage of a period falling from said first peak part to said second valley part more than an amplitude of said drive voltage of a period rising from said first valley part to said first peak part.

4. The vibration generating apparatus as set forth in claim 1, wherein said drive voltage applied to said magnetizing means has a repeating waveform of a unipolar voltage.

5. The vibration generating apparatus as set forth in claim 1, wherein said forced vibration control means sets the frequency of said drive voltage so that a beat period of a beat wave of said beat vibration and a period of a basic wave of said beat vibration become substantially equal.

6. The vibration generating apparatus as set forth in claim 1, wherein said forced vibration control means outputs a frequency of said drive voltage across a certain period from said drive start as a resonant frequency matched with said damped natural frequency, then switches to said non-resonant frequency.

7. The vibration generating apparatus as set forth in claim 1, wherein the number of cycles of the damped natural frequency is smaller than the number of cycles of said non-resonant frequency.

8. The vibration generating apparatus as set forth in claim 1, wherein said mechanical vibrator has a ring-shaped permanent magnet which is magnetized in a thickness direction spanning a first end face and a second end face, said spring element is a suspension spring means supporting said ring-shaped permanent magnet displaceably in said thickness direction with respect to said fastening part, said electromagnetic coil passes through a center hole of said ring-shaped permanent magnet and is supported at said fastening part, a core is provided passing through the inside of said electromagnetic coil, said electromagnetic coil has a first toroidal coil and an adjoining coaxial second toroidal coil with opposite magnetization polarities, and provision is made of a first ring-shaped pole piece mated with said first end face and having an inner circumferential edge surrounding an outer circumference surface of said first toroidal coil and a second ring-shaped pole piece mated with said second end face and having an inner circumferential edge surrounding an outer circumference surface of said second toroidal coil.

\* \* \* \* \*